(12) United States Patent
Forbis et al.

(10) Patent No.: US 12,181,126 B2
(45) Date of Patent: *Dec. 31, 2024

(54) ARTIFICIAL LIGHT CONFIGURED FOR DAYLIGHT EMULATION

(71) Applicant: General Lighting Company, Inc., Brookfield, CT (US)

(72) Inventors: Michael Forbis, Northville, MI (US); Jonathan King Mapel, San Francisco, CA (US)

(73) Assignee: GENERAL LIGHTING COMPANY, INC., Brookfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,313

(22) Filed: Mar. 9, 2023

(65) Prior Publication Data

US 2023/0296216 A1    Sep. 21, 2023

Related U.S. Application Data

(63) Continuation of application No. 17/834,140, filed on Jun. 7, 2022, now Pat. No. 11,746,971, which is a
(Continued)

(51) Int. Cl.
| | |
|---|---|
| *F21S 8/02* | (2006.01) |
| *F21V 3/00* | (2015.01) |
| *F21V 9/02* | (2018.01) |
| *F21V 29/74* | (2015.01) |
| *F21V 29/89* | (2015.01) |
| *H05B 45/20* | (2020.01) |
| *H05B 47/10* | (2020.01) |

(Continued)

(52) U.S. Cl.
CPC .............. *F21S 8/026* (2013.01); *F21V 3/00* (2013.01); *F21V 9/02* (2013.01); *F21V 29/74* (2015.01); *F21V 29/89* (2015.01); *H05B 45/20* (2020.01); *H05B 47/19* (2020.01); *F21S 2/00* (2013.01); *F21Y 2115/10* (2016.08); *F21Y 2115/15* (2016.08)

(58) Field of Classification Search
CPC ........ H05B 45/10; H05B 45/20; H05B 47/10; H05B 47/155; H05B 47/16; H05B 47/19; F21V 9/02; F21V 14/00; F21V 29/74; F21V 29/89; F21S 8/02; F21S 8/026; F21S 19/005
See application file for complete search history.

(56) References Cited

U.S. PATENT DOCUMENTS

| | | | | |
|---|---|---|---|---|
| 2006/0170376 A1* | 8/2006 | Piepgras | .............. | H05B 47/105 315/295 |
| 2011/0242810 A1* | 10/2011 | Lopez Querol | ....... | F21S 19/005 362/249.02 |

(Continued)

*Primary Examiner* — Thai Pham
(74) *Attorney, Agent, or Firm* — Leason Ellis LLP

(57) ABSTRACT

A lighting system configured for daylight emulation. The system includes a plurality of light sources for generating a daylight-emulating output light spectrum. The system also includes a controller for dynamically controlling at least one of the intensity, directionality and color temperature to emulate sun position for at least one of a geography and time of day. The system further includes a networking facility that facilitates data communication with at least one external resource.

12 Claims, 47 Drawing Sheets

Related U.S. Application Data continuation of application No. 17/559,118, filed on Dec. 22, 2021, now Pat. No. 11,592,152, which is a continuation of application No. 15/846,795, filed on Dec. 19, 2017, now Pat. No. 11,242,965, which is a continuation of application No. 15/380,707, filed on Dec. 15, 2016, now Pat. No. 9,894,729.

(60) Provisional application No. 62/326,330, filed on Apr. 22, 2016, provisional application No. 62/267,656, filed on Dec. 15, 2015.

(51) Int. Cl.
*H05B 47/19* (2020.01)
*F21S 2/00* (2016.01)
*F21Y 115/10* (2016.01)
*F21Y 115/15* (2016.01)

(56) References Cited

U.S. PATENT DOCUMENTS

| | | | | |
|---|---|---|---|---|
| 2013/0069532 A1* | 3/2013 | Lanham | ............... | H05B 47/11 |
| | | | | 315/158 |
| 2013/0155643 A1* | 6/2013 | Meyer | ............... | F21V 7/30 |
| | | | | 362/2 |
| 2014/0117877 A1* | 5/2014 | Mapel | ............... | H05B 45/20 |
| | | | | 315/294 |
| 2014/0292206 A1* | 10/2014 | Lashina | ............... | H05B 47/155 |
| | | | | 315/149 |
| 2016/0258209 A1* | 9/2016 | Berman | ............... | E06B 9/32 |
| 2018/0252374 A1* | 9/2018 | Keller | ............... | F21S 19/005 |

\* cited by examiner

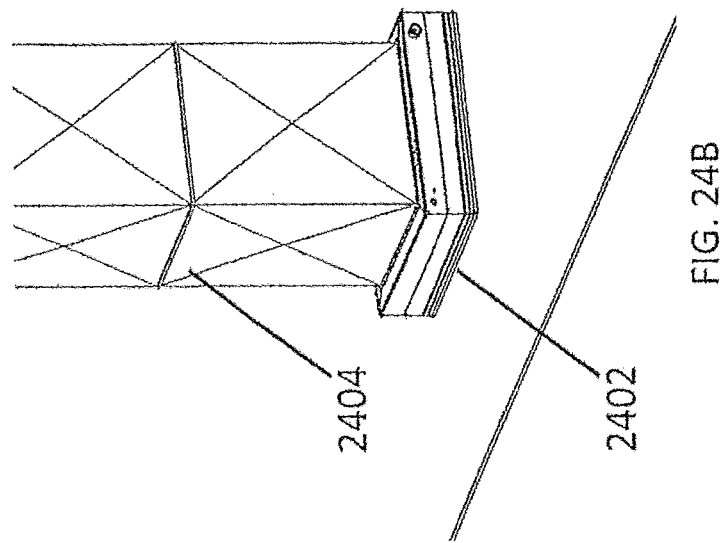
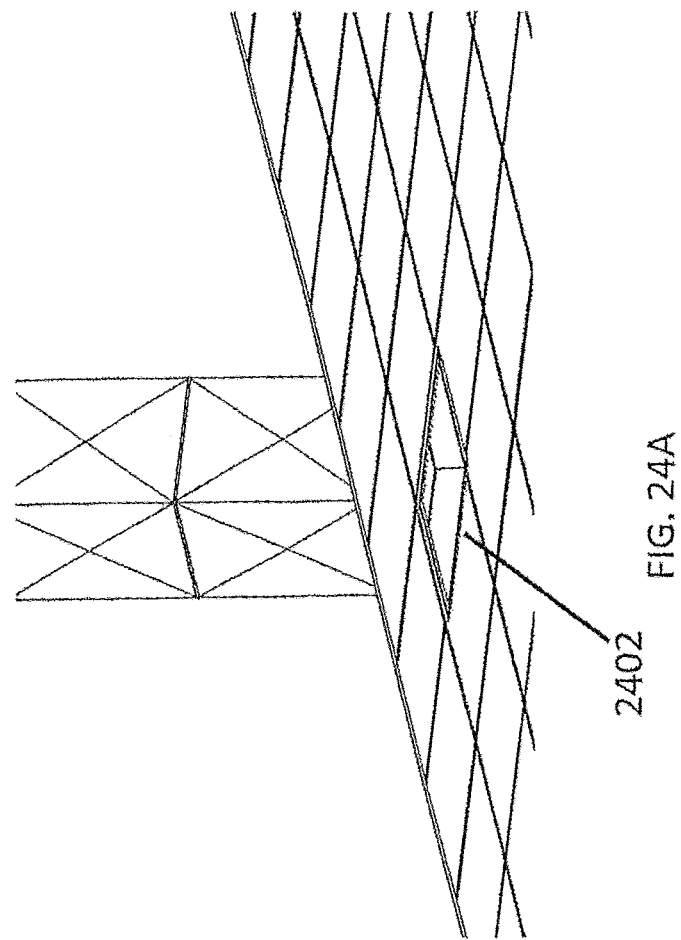
FIG. 24A
FIG. 24B

ARTIFICIAL LIGHT CONFIGURED FOR DAYLIGHT EMULATION

CROSS-REFERENCE TO RELATED APPLICATIONS

This application is a continuation of U.S. application Ser. No. 17/834,140 filed Jun. 7, 2022, which is a continuation of U.S. application Ser. No. 17/559,118 filed Dec. 22, 2021, now U.S. Pat. No. 11,592,152, which is a continuation of U.S. application Ser. No. 15/846,795 filed Dec. 19, 2017, now U.S. Pat. No. 11,242,965, which is a continuation of U.S. application Ser. No. 15/380,707 filed Dec. 15, 2016, now U.S. Pat. No. 9,894,729, which claims the benefit of U.S. Application No. 62/267,656 filed Dec. 15, 2015 and U.S. Application No. 62/326,330 filed Apr. 22, 2016, all of which are hereby incorporated by reference in their entirety.

BACKGROUND

Field

The present disclosure relates to an artificial light, configured for daylight emulation, including generating a dynamic, daylight quality spectrum based on tuning at least one of intensity, color temperature and directionality based on at least one of geographic location and time of day, as well as devices for and methods of using them.

Description of the Related Art

Embodiments of artificial lights disclosed herein may provide significant advantages over existing devices, including without limitation higher efficiencies, fewer components, improved materials, improved optical properties, and better color rendition, leading to several characteristic effects, including without limitation increased sales per square foot, higher employee productivity, shorter recovery times after surgical procedures, reduced employee absenteeism, and increased occupant satisfaction. These and other advantages will be recognized by the person of ordinary skill in the art, given the benefit of this disclosure.

There is a need for an artificial light configured for daylight emulation to increase sales of retail environments, improve employee productivity and reduce employee absenteeism, shorten recovery times after surgical procedures and increase occupant satisfaction.

Studies linking natural day lighting to increased sales per square foot, higher employee productivity, reduced recovery times after surgical procedures, increased test scores, reduced employee absenteeism, and increased occupant satisfaction demonstrate a clear value in incorporating natural light delivery systems into a wide range of building interiors.

Often, natural daylighting may not be readily incorporated into building interiors for a range of reasons. Interiors may not have direct roof access such, as one or more floors in multi-story building. Interiors may be far from the building facades, such that direct incidence of daylight remains low during the majority of the day. Logistical challenges relating to human and capital equipment relocation during retrofits may preclude infrastructural improvements. Total retrofit costs associated with installation labor, materials, human resource relocation, and/or capital equipment relocation may preclude infrastructure improvements. Additionally, the owner may not directly benefit from the natural lighting retrofits, such as may be the case in rented commercial, industrial, or residential interiors, complicating ownership arrangements and financial responsibility. Additionally, infrastructural improvements may affect liabilities associated with other building systems, such as warranties on roofing systems, water damage policies, and heating, ventilation, and cooling systems. For buildings under construction, natural daylighting systems typically incur higher costs, which may be avoided to reduce up front construction costs if it is not believed by the building owner that higher rents may be gained from the inclusion of the system.

There exists a range of building environments in which the inclusion of additional natural daylighting would affect a beneficial outcome related to user activity but which physical, financial, or logistical constraints preclude the inclusion of such. For such environments, there is a need for lighting systems which can be included which present an emulation of natural daylighting systems. Such daylight emulation systems may similarly affect a beneficial outcome, such as increased sales per square foot, higher employee productivity, reduced recovery times after surgical procedures, increased test scores, reduced employee absenteeism, and increased occupant satisfaction in building interiors for which the inclusion of real natural daylighting is prohibited.

SUMMARY

The methods and systems provided herein include an artificial light, configured for daylight emulation, including capabilities for generating a dynamic, daylight quality spectrum based on tuning at least one of intensity, color temperature and directionality based on at least one of geographic location and time of day.

The methods and systems provided herein include an artificial light, configured for daylight emulation, including capabilities for generating a dynamic, daylight quality spectrum with color temperature tuned to sun position based on geography and time of day.

The methods and systems provided herein include an artificial light, configured for daylight emulation, including capabilities for generating a dynamic, daylight quality spectrum with intensity tuned to sun position based on geography and time of day.

The methods and systems provided herein include an artificial light, configured for daylight emulation, including capabilities for generating a dynamic, daylight quality spectrum with direction of light tuned to sun position based on geography and time of day.

The methods and systems provided herein include an artificial light, configured for daylight emulation, including capabilities for a dynamic, daylight quality spectrum with at least one of intensity, directionality and color temperature tuned to sun position based on at least one of geography and time of day and based on emulating a weather condition such as a cloud cover condition, a cloud thickness condition, a snow condition, a rain condition, an air pollution condition, fog conditions, or the like.

The methods and systems provided herein include an artificial light, configured for daylight emulation, including capabilities for generating a dynamic, daylight quality spectrum with at least one of intensity, directionality and color temperature tuned to sun position based on at least one of geography and time of day and based on emulating an environmental condition, such as an albedo condition, a reflectivity condition, an opacity condition, a color condition, a building material condition, a shadow condition, or the like.

The methods and systems provided herein include an artificial light, configured for daylight emulation, including capabilities for generating a dynamic, daylight quality spectrum with at least one of intensity, directionality and color temperature tuned to sun position based on at least one of geography and time of day, with spatial tuning to manage the position of at least one of a bright spot, a shadow and a reflection based on a factor in the environment where the artificial light provides illumination, such as a workspace location, a desktop location, a display screen location, a TV screen location, an art location, a mirror location, an eye-level location, a reading location, or the like.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light is configured with a form factor that resembles an architectural feature, such as a skylight, a window, a transom, a sliding door, a mirror, or the like. A window might be a transom, a paned window, a pane-less window, a clerestory window, or the like.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light has a networking facility that facilitates data communication with at least one external resource.

The methods and systems provided herein include an artificial light, configured for daylight emulation, including capabilities for a dynamic, daylight quality spectrum with at least one of intensity, directionality and color temperature tuned to sun position based on at least one of geography and time of day, wherein the light has a networking facility that facilitates uploading of data to at least one external resource.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light has a networking facility that facilitates downloading of data from at least one external resource.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light uses an optical mixing chamber to provide a broad spectrum from a plurality of light sources that each of a narrower spectrum emission of selected colors and color temperatures.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light has a networking facility that facilitates receipt of environmental sensor data from at least one external resource and a processing facility for modulating the output of the light based on the environmental data, wherein the environmental sensor data is from a sensor, such as a light sensor, weather sensor, barometer, moisture sensor, temperature sensor, heat flux sensor, or the like.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light has a networking facility that facilitates accessing a geo-location facility for identifying the geo-location of the light.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light has a networking facility that facilitates accessing a geo-location facility for identifying the geo-location of the light and a processing facility for determining the azimuth of the sun at the geo-location at a point in time.

The methods and systems provided herein include an artificial light, configured for daylight emulation, including capabilities for generating a dynamic, daylight quality spectrum, wherein the light has a networking facility that facilitates accessing a geo-location facility for identifying the geo-location of the light and a processing facility for determining the azimuth of the sun at the geo-location at a point in time and automatically tuning the intensity, directionality and color temperature based on the azimuth and geo-location of the sun at the position.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light mixes light from multiple sources to provide a range of color temperatures spanning from 3000 K or less to 6000 K or more with a color rendering index (CRI) greater than 85.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light has a chromatic diffuser for diffusing the output of the light. In embodiments, the diffuser provides a Raleigh scattering effect to produce a sky-like color of the light.

The methods and systems provided herein include a kit, which may include at least one artificial light engine that is configured for daylight emulation, including generating a dynamic, tunable daylight quality spectrum and a facility for forming a housing for the light engines that is configured for integration with an architectural feature, such as a cove, a recess, a column, a spandrel wall section, a curtain wall section, a clearstory, roof monitors, a light well, a translucent ceiling element, barrel or arch vaulted ceilings, or the like. In embodiments, the facility for forming the housing is an extrusion facility.

The methods and systems provided herein include a kit that may include an artificial light source, configured for daylight emulation, including generating a dynamic, tunable daylight quality spectrum and a glazing facility for covering the artificial light source, wherein the light source and glazing facility are configured to dispose the light source in proximity to an architectural feature. In embodiments, the architectural feature may be any of the items noted throughout this disclosure.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light is further adapted to provide display of an effect, such as a video effect, animation effect, color-changing effect, light show, indicator signal, or the like.

The methods and systems provided herein include an artificial light, configured for daylight emulation, including capabilities for generating a dynamic, daylight quality spectrum with at least one of intensity, directionality and color temperature tuned to sun position based on at least one of geography and time of day, wherein the light is configured to induce a biological effect, such as a circadian effect, a sleep inducing effect, an alertness inducing effect, a stimulating effect, a relaxing effect, a phototherapeutic effect, a mood enhancing effect, or the like.

The methods and systems provided herein include an artificial light, configured for daylight emulation, including capabilities for generating a dynamic, tunable daylight quality spectrum, the light configured in a form factor adapted to fit into the space of a standard ceiling tile and to create the appearance of a skylight. In embodiments, the light is configured in at least one of a two-foot-by-two-foot configuration, a two-foot-by-four-foot configuration, and a four-foot-by-four-foot configuration.

Also provided herein are methods and systems for designing a configuration for housing an artificial light engine that includes a processor and that is capable of generating a dynamic, tunable daylight quality spectrum, including designing an architectural feature, shaping a space of the architectural feature to house the light engines, and inserting the light engines into the space.

The methods and systems provided herein include an artificial light, configured for daylight emulation, including capabilities for generating a dynamic, tunable daylight quality spectrum, the light configured to provide an additional virtual effect to a lighting effect, where the virtual effect is selected from the group consisting of an image effect, a sound effect, a smell effect and a feel effect that simulates an effect of at least one of a skylight and a window.

The methods and systems provided herein include an artificial light, configured for daylight emulation, including capabilities for generating a dynamic, tunable daylight quality spectrum, the light configured to provide an additional imagery effect to a lighting effect, where the imagery effect is selected from the group consisting of a sky image, a cloud image, and a landscape image.

The methods and systems provided herein include an artificial light, configured for daylight emulation, including capabilities for generating a dynamic, tunable daylight quality spectrum, the light configured to provide a sound effect to a lighting effect, where the sound effect is configured to emulate the sound transmitted through at least one of a skylight and a window, wherein the sound effect is selected from the group consisting of a sound of crashing waves, a sound of wind, a sound of insects, a sound of a machine, a sound of music, and a sound of a communication.

The methods and systems provided herein include an artificial light, configured for daylight emulation, including capabilities for generating a dynamic, tunable daylight quality spectrum, the light configured to provide an additional smell effect to a lighting effect, where the smell is configured to emulate a smell coming through at least one of a skylight and a window, where the smell is selected from the group consisting of a plant smell, a clean air smell, an ocean air smell, and a cut grass smell.

The methods and systems provided herein include an artificial light, configured for daylight emulation, including capabilities for generating a dynamic, tunable daylight quality spectrum, the light configured to provide a feel effect in addition to a lighting effect, where the feel effect is configured to emulate a feeling transmitted through at least one of a window and a skylight, wherein the feel effect is selected from the group consisting of a feeling of warmth that emulates transmitted sunlight and a feeling of dynamic airflow.

Aspects and embodiments of the disclosed technology are directed to systems and devices that employ lighting sources to emulate the lighting and visual appearance of natural daylighting systems and components.

Disclosed is a natural light emulation system having a number of lighting assemblies controlled by a controller. Each lighting assembly has a multi-sided enclosure surrounding a light well. There are several light engines that generate light for at least one side of the light well. There are a number of light modification elements with at least one being associated with a light engine. At least one controller operates the light engines of at least one lighting assembly according to either user input or a calculated algorithm to emulate natural lighting radiating in a specific direction.

In another embodiment, a natural light emulation system is described having at least one lighting assembly. The lighting assembly has a multi-sided enclosure surrounding a light well with a plurality of light engines for generating light from at least one side of the light well. There is also optionally a number of light modification elements, with at least one associated with one of the light engines.

At least one controller is adapted to operate the light engines causing them to emulate at least two of the following light parameters: the direction of incident light, the spectrum of incident light and the intensity of incident light.

The system of the current application may also be described as a natural light emulation system with a plurality of light groups wherein each of the light groups has at least one lighting assembly. The light assembly includes a multi-sided enclosure surrounding a light well and a number of light engines for generating light from at least one side of the light well.

There are a number of light modification elements, with at least one light modification element being associated with one of the light engines.

At least one controller is adapted to operate the lighting assemblies of at least one light group causing all lighting assemblies of the group to emulate incident light received from an incident direction, with a coordinated spectrum and with a coordinated intensity.

BRIEF DESCRIPTION OF THE FIGURES

The disclosure and the following detailed description of certain embodiments thereof may be understood with reference to the following figures:

FIG. 24A illustrates a first perspective view of an installation of a daylight emulation system associated with a ventilation duct feature. FIG. 24B illustrates a second perspective view of an installation of a daylight emulation system associated with a ventilation duct feature.

DETAILED DESCRIPTION

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having", as used herein, are defined as comprising (i.e., open transition).

Figure 1:
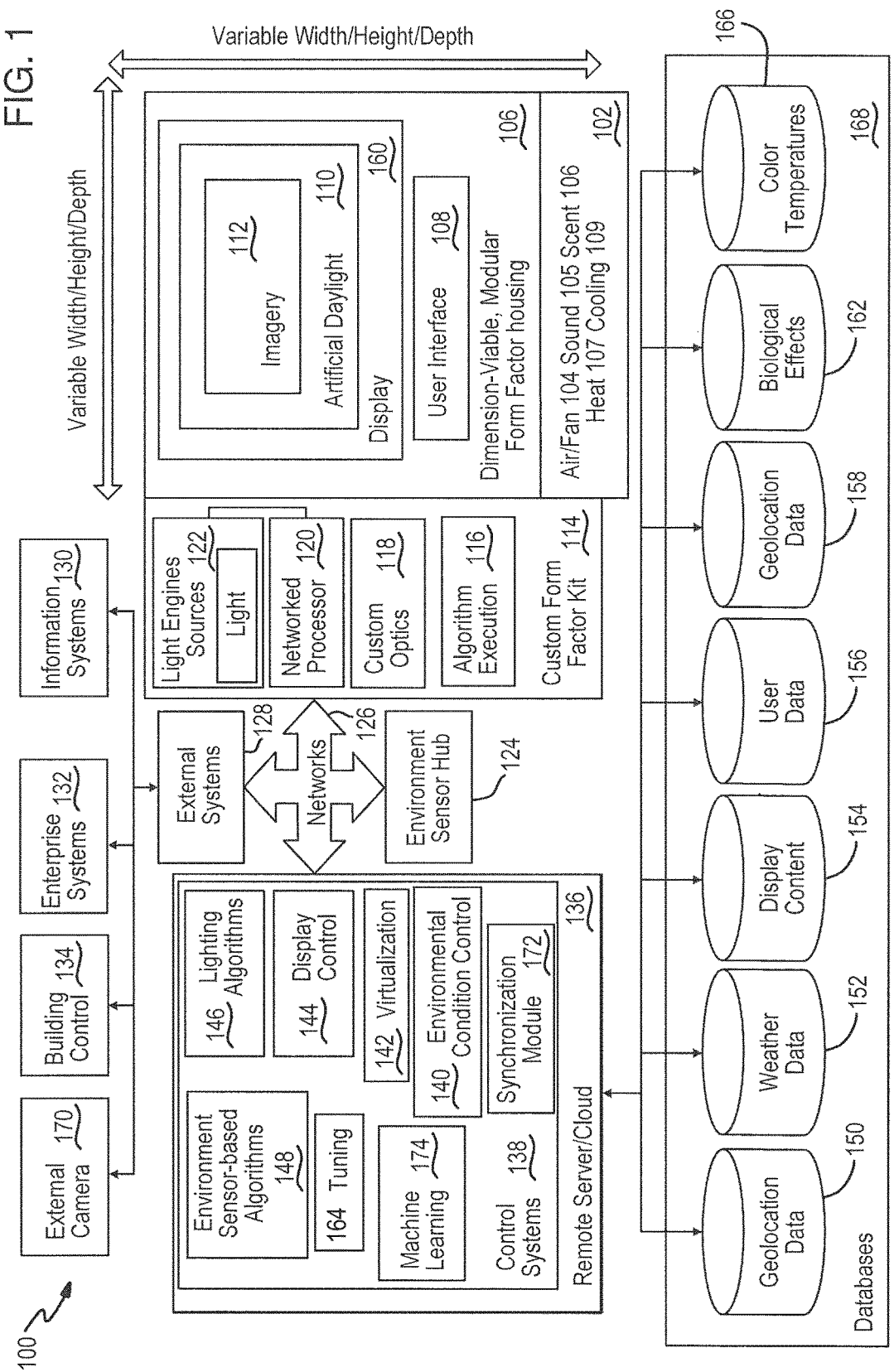
FIG. 1 is an illustration of one embodiment of an artificial light configured for daylight emulation.

FIG. 1 shows various components and sub-systems that may be employed, arranged, and configured in various embodiments of an artificial lighting system configured for daylight emulation 100 (which is referred to in some cases in this disclosure simply as the "lighting system," the "system," or the "artificial light," which should be understood interchangeably except where context indicates otherwise). The artificial lighting system 100 may include, be integrated with, or interact with various information technology components, such as one or more remote servers/cloud environments 136, networks 126, external systems 128, environment sensors 124, or the like. In embodiments, the artificial lighting system 100 may comprise various architectural form factors, such as forming a modular ceiling fixture skylight 102, a window, or the like, where a housing, such as shaped as a skylight 102, houses various components, such as one or more displays 160 for producing artificial daylight 110, imagery 112, or the like.

The artificial lighting system 100 may also include complementary systems, such as for delivering air 104, sound 105, scent 106, heat 107, cooling 109, or other factors that affect non-lighting conditions of the environment of the artificial lighting system 100.

The lighting system 100 may have a dimension-variable, modular form factor housing 106, which may be varied to fit into various architectural configurations, such as a space for a standard skylight or window. The system 100 may use data from various databases 168.

A control system hosted on a remote server or in a cloud environment 136 may include various control modules, systems or algorithms 138. Control systems 138 may include environment sensor-based control algorithms 148, tuning control algorithms 164, lighting algorithms 146, display control algorithms 144, virtualization algorithms 142, environmental condition control algorithms 140 (such as a fan 104 for controlling air, a system for sound 105, a system for scent 106, a heater 107, a cooling facility 109), and the like. Remote server/cloud 136 may be connected to databases 168 and network 126. Databases 168 may include geolocation data databases 150, weather data databases 152, display content databases 154, user data databases 156, environment databases 158, biological effects databases 162, color temperature databases 166 and the like.

In embodiments, methods and systems are provided wherein a static imagery effect is distributed over a plurality of modular ceiling fixtures with partial display on each. This may include a synchronization module 172 for managing multiple lighting systems 100, including tracking information about the absolute and relative position and orientation of such systems 100, as well as managing timing for display of images across multiple systems 100.

Network 126 may connect to remote server/cloud 136, environment sensors 124, external systems 128 and modular ceiling fixture skylight 102. External systems 128 may include building control systems 134, enterprise systems 132, information systems 130 and the like.

In embodiments, a custom form factor kit 114 may be provided for producing an artificial lighting system 100. The kit 114 may include any of the components depicted on FIG. 1, as well as appropriate instructions and/or tools for integrating the components, assembling the lighting system 100, and installing the lighting system 100.

The artificial lighting system 100 or kit 114 for making it may include complementary systems, such as a fan 104 or other ventilation system element for providing air, sound 105, scent 106, heat 107, and cooling 109.

The system 100 may have a dimension-variable, modular form factor housing 106. Modular ceiling fixture skylight 102 may have variable dimensions. Variable dimensions may include a variable width dimension, variable height dimension and variable depth dimension. The custom form factor kit 114 may include light engines 122 having various light sources (e.g., LED or other semiconductor light sources, CFL light sources, fluorescent light sources, incandescent light sources, or the like), one or more networked processors 120, one or more custom optics 118 and a control system, such as for algorithm execution 116. The artificial lighting system 100 may include a user interface 108, such as for controlling lighting, inputting settings, selecting modes, and controlling air, sound, scent, display, cooling, heating or the like. Display 160 may include the ability to display artificial daylight 110 (such as to complement or substitute for lighting from the light engines 111), and/or provide imagery 112. Networked processor 120 may include algorithms such as time of day algorithms, azimuth algorithms, intensity algorithms and the like. Algorithms may also enable modulation for other effects.

The artificial lighting system 100 for daylight emulation may also collect or receive data. Data may be weather data 152, location data 150 (such as geolocation data), display content data 154, user data 156, environment data 158, biological effect data 162, color temperature data 166, mapping data, and the like, which may be obtained from external data sources or from data collected by the artificial lighting system 100. The system 100 may also include or take images from a camera, such as an external camera 170, which may capture images for storage as display content 154, such as allowing the display 160 to show images captured by the camera as if the viewer of the system 100 were looking out a window or skylight and seeing the environment captured by the camera 170.

Artificial lighting system 100 may also include an environment sensor hub 124. The sensor hub 124 may provide sensor integration to sensors connected to the artificial lighting system 100, such as light sensors, temperature sensors, motion sensors, heat sensors, proximity sensors, chemical sensors, or others, or to other sensors that are connected to the system 100, such as through the Internet.

Location data, weather data, or the like may be used to simulate location-aware daylight. Location data may include azimuth data and intensity based time of day data.

Artificial lighting system 100 may include interfaces to other systems. Interfaces to other systems may include application programming interfaces (APIs), connectors, network interfaces and the like, optionally available via a network 126. Thus, artificial lighting system 100 may be an intelligent, connected artificial light.

Artificial lighting system 100 may include a control system 138, with integrated or distributed facilities for controlling various parameters of the components of the lighting system 100, such as for virtualization, personalization, emulation, and the like. This may include controlling lighting parameters of the light engines 122, such as lighting intensity levels, light color, color temperature or the like, controlling content (e.g., imagery, video, animations, or the like) for a display 160, and controlling ventilation, cooling, heating, scent, sound or other conditions that result from the output of the system 100. Personalization of the system 100 may be based upon user input or analysis, such as of similar users, and may include or be based upon comfort personalization, therapeutic personalization, energy management personalization, functional lighting personalization, performance optimization personalization and the like. Each type of personalization may include or be based on artificial intelligence, such as developed using a machine learning system 174, such as having the control algorithms 138 accept feedback from users as to user experiences and usage profiles with various goals of the system 100 and optimize user experiences, such as by varying and optimizing control parameters, relationships, and rules. In embodiments, therapeutic personalization may include prescribed light recipes for intended health outcomes. Energy management personalization may include rules based parameters to minimize energy usage, meet prescribed energy goals or react to demand response protocols.

Figure 4:
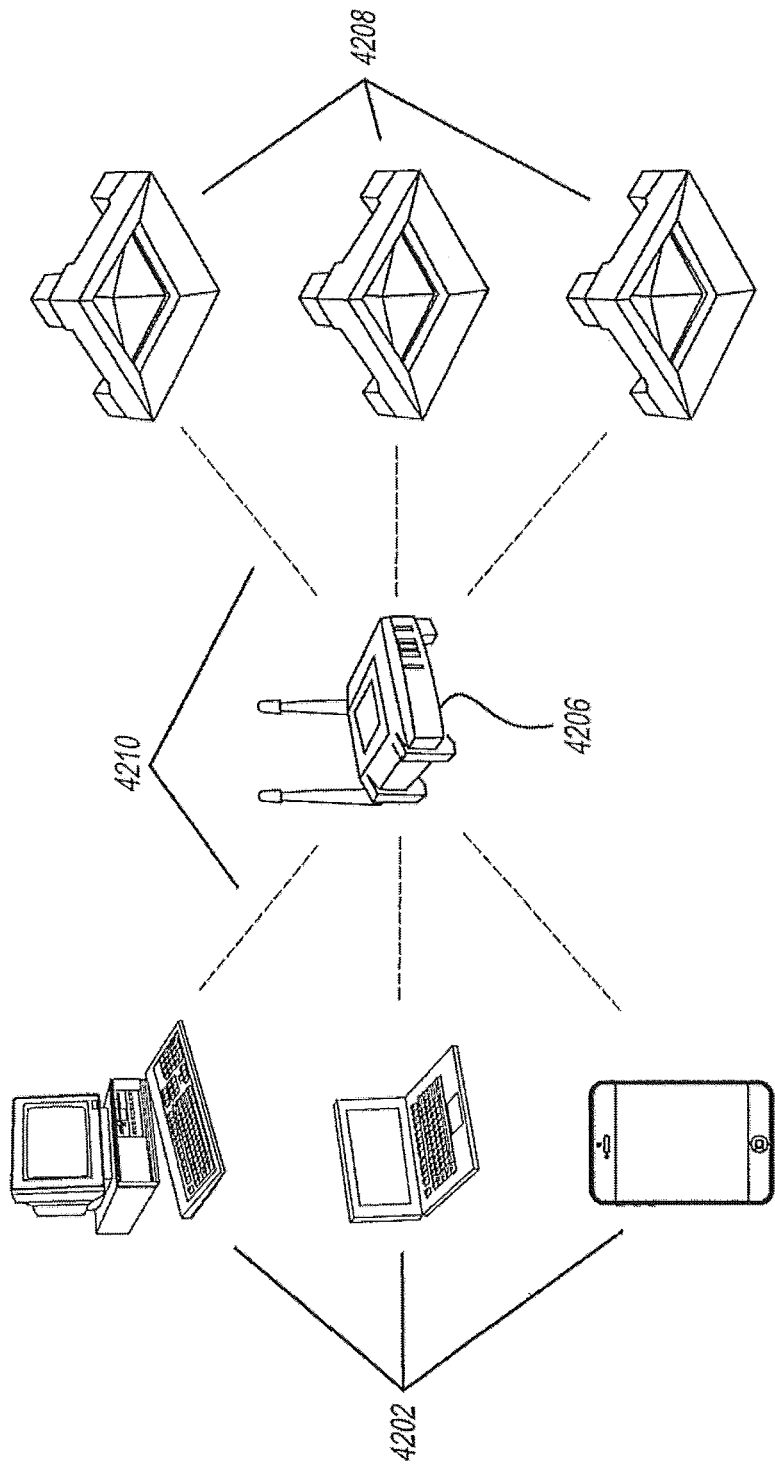
FIG. 4 is an illustration of various methods of communicating with the elements of the system.

Network 126 may be a wired network or wireless network. FIG. 4 illustrates an embodiment of wireless network technology. The wireless network topology may include user devices (4202), a wireless router (4206), and skylight luminaires (4208). User devices may include desktop computers, laptop computers, mobile devices and the like. The password protected GUI that may be accessed by a user device (4202) may allow direct wireless control to one or more of the skylight luminaires (4208) via a wireless communications network (4210). The wireless communications network may be a local-area-network (LAN) or wide-area-network (WAN). One embodiment of a local area network used in the group of light fixtures is comprised of a no centralized router to mediate communications between units but such communications are sent through a network of light fixtures directly through a peer-to-peer network.

According to another embodiment of the current application, the devices may be hardwired, connected through the Internet, connected though cellular telephone communication or a combination of any number of these communications listed.

An embodiment of the artificial lighting system 100, configured for daylight emulation, includes generating a dynamic, daylight quality spectrum with at least one of intensity, directionality and color temperature tuned to sun position based on at least one of geography and time of day. The system 100 may be further configured to induce a biological effect selected from a group of biological effects. Biological effects may include a circadian biological effect, a sleep inducing biological effect, an alertness inducing biological effect, a stimulating biological effect, a phototherapeutic biological effect, a mood enhancing biological effect and the like. The group of biological effects may be stored in the biological effects database 162.

Some of the general features of embodiments are described below.

In embodiments, a general illumination area greater than that of typical light fixtures is produced.

In embodiments, a variable light spectrum is produced.

In embodiments, there is an advantage of being utilized in environments with or without natural light.

In embodiments, light parameters are calculated and emulated without the need to rely upon sensor or network input for this purpose.

In embodiments, no ducts linking the building internal and external environments are required to operate.

In embodiments, light is provided by a plurality of wide and narrow-band light sources. These can provide light of more than one target correlated color temperature, which can be controlled to change as a function of time.

In embodiments, a light source with a spectral maximum in the ultraviolet or infrared wavelengths is not required, as is required by some prior art devices.

In embodiments, light is provided from a wide spatial area and is not intended to be a point source, as required by some prior art devices. The claimed system can also provide uniform lighting over the illuminated area, if desired.

Some prior art devices require minimizing differences between its actual output light spectra and a reference spectrum. However, in embodiments, this is not a requirement for operation.

In embodiments, widely spatially varying light is produced uniformly.

In embodiments, the claimed disclosure describes fixtures that are intended to be observed, as opposed to hidden lighting of some prior art devices.

In embodiments, a secondary lens is not required.

Multiple, distinct light sources are employed in embodiments, and arranged to create areas of color and brightness uniformity on some surfaces and areas of substantial non-uniformity on other surfaces.

In embodiments, some of the light from the light sources may radiate directly to the observer without being reflected, due to the structure.

In embodiments, multiple light sources are employed that are capable of rendering various colors.

Natural daylight emulation can be achieved in a number of arrangements where only a subset of features normally associated with daylight is typically present. For instance, emulation of the view of a detailed scene through a vertically oriented window requires the re-creation of a view of the detailed scene, but such is not required for horizontally oriented windows, roof windows, or skylights. Likewise, the total transmitted illumination through large area arrays of vertically or horizontally oriented windows would require high densities of artificial light sources, which may not be readily obscured from direct observation compared to arrangements of smaller areas of horizontally oriented windows.

An effective emulation of natural daylight may require the emulation of both sunlight and skylight, each of which have distinct physical properties, such as intensity, color, and the extent to which light is scattered, or diffused. The sun is considered a distant point source of light, often referred to as "beam" sunlight, because it is highly directional. Light from the sky, on the other hand, arrives from a large area and is more or less diffuse, meaning scattered and arriving from all directions. Beam light will cast a shadow; diffuse light will not cast a distinct shadow. Methods and systems disclosed herein may consider the nature of environmental lighting conditions and manage the light to produce sharp shadows that are characteristic of beam light or less distinct shadows that are characteristic of diffuse light, such as based on current outside conditions. In some cases, sharp shadows may be altered, such as to move them to locations within an environment where the shadows are less invasive, such as by keeping them away from the location of a desktop in a work environment. Thus, in embodiments, control systems for an artificial lighting system 100 may include inputs for setting locations at which shadows should be avoided.

Unobstructed sunlight is typically high intensity, generally providing 5,000 to 10,000 foot-candles of illumination. The intensity of sunlight varies with time of year and location on the planet. It is most intense at noon in the tropics when the sun is high overhead and at high altitudes in thin air, and least intense in the winter in the arctic, when the sun's light takes the longest path through the atmosphere. Sunlight also provides a relatively warm color of light varying in correlated color temperature (CCT) from a warm candlelight color at sunrise and sunset, about 2000 degrees K, to a more neutral color at noon of about 5500 degrees K. The correlated color temperature is the temperature of the Planckian (black body) radiator whose perceived color most closely resembles that of a given stimulus at the same brightness and under specified viewing conditions.

Natural skylight includes the light from both clear blue skies and various types of cloudy skies. The brightness of cloudy skies depends largely on how thick and numerous the clouds are. A light ocean mist can be extremely bright, at 8,000 foot-candles, while clouds on a stormy day can almost blacken the sky. The daylight on a day with complete cloud cover tends to create a very uniform, diffuse lighting condition. Skylight from clear blue skies is non-uniform. It is darkest at 90 degrees opposite the sun's location, and brightest around the sun. It also has a blue hue, and is characterized as a cool color temperature of up to 10,000 degree K. Skylight from cloudy skies is warmer in color, a blend somewhere between sunlight and clear blue skies, with correlated color temperatures of approximately 7,500 degrees K.

The overcast sky is the most uniform type of sky condition and generally tends to change more slowly than the other types. It is defined as being a sky in which at least 80% of the sky dome is obscured by clouds. The overcast sky has a general luminance distribution that is about three times brighter at the zenith than at the horizon. The illumination produced by the overcast sky on the earth's surface may vary from several hundred foot-candles to several thousand, depending on the density of the clouds. The clear sky is less bright than the overcast sky and tends to be brighter at the horizon than at the zenith. It tends to be fairly stable in the luminance except for the area surrounding the sun which changes as the sun moves. The clear sky is defined as being a sky in which no more than 30% of the sky dome is obscured by clouds. The total level of illumination produced by a clear sky varies constantly but slowly throughout the day. The illumination levels produced can range from 5,000 to 12,000 foot-candles. The cloudy sky is defined as having cloud cover between 30% and 80% of the sky dome. It usually includes widely varying luminance from one area of the sky to another and may change rapidly.

The majority of commercial and industrial skylights are installed on flat roofs, where the skylight receives direct exposure to almost the full hemisphere of the sky. Typically, there are also few obstructions to block sunlight from reaching the skylight. A skylight on a sloped roof does not receive direct exposure to the full sky hemisphere, but only a partial exposure determined by roof. The sun may not reach the skylight during certain times of the day or year, depending upon the angle and orientation of the sloped roof. For example, a skylight on an east-facing roof with a 45 degrees slope will only receive direct sun during the morning and midday hours. In the afternoon it will receive skylight, but only from three-fourths of the sky. As a result, in the afternoon it will deliver substantially less light to the space below than an identical skylight located on a flat roof.

The shape of a skylight also affects how much daylight it can provide at different times of the day, although these effects tend to be much more subtle than building geometry. For example, a flat-glazed skylight on a flat roof will intercept very little sunlight when the sun is very low in the early morning and at the end of the day. However, a skylight with angled sides, whether a bubble, pyramid, or other raised shape, can intercept substantially more sunlight at these critical low angles, increasing the illumination delivered below by five to 10 percent at the start and end of the day.

Figure 10A:
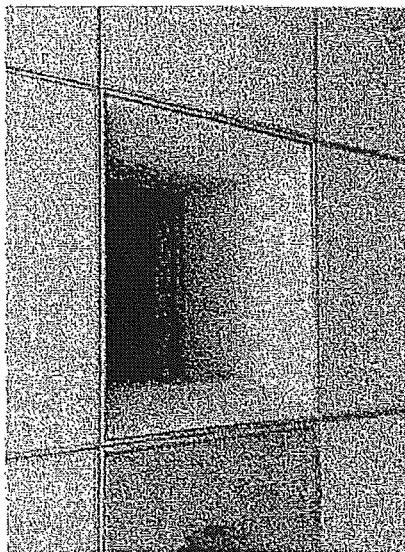
FIGS. 10A and 10B are examples of a natural daylight emulation light fixture.
Figure 10B:
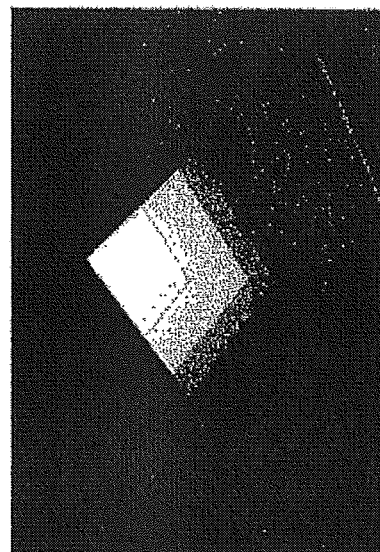

FIG. 10B shows an embodiment of an embodiment of a natural light lighting assembly as it appears installed in a ceiling in operation.

Natural daylighting systems are typically implemented alongside artificial lighting systems for use on days with insufficient daylighting and for nighttime utilization. Artificial lighting systems are typically designed to supplement the daylighting system. A common approach is to use the skylights to provide the basic ambient light for the building along with a back-up electric ambient system on photocontrols, while using specific electric lights to provide higher levels of task lighting in critical locations. Task lighting can be provided at work counters, in shelving aisles, or at critical equipment.

The correlated color temperature of supplemental artificial lighting is typically set to higher temperatures to reduce color mismatch between natural daylight and artificial light and to reduce the tendency for lights to draw an occupant's attention. A typical configuration is the use of fluorescent lamps at 4100 degrees K. Also typical is the use of daylight as a complement to artificial sources with poor color rendition, such as high-pressure sodium lamps in a daylight warehouse. In such a case, the presence of daylight greatly enhances the ability to see colors accurately.

In order to ensure that naturally daylight interiors have high enough illumination when used during evenings or during day times of low natural illumination, artificial lights may be placed in fixtures in between skylights with approximately equal spacing between one or more fixtures. This arrangement also tends to increase work surface illumination uniformity even during periods of high natural daylight.

Common features of prior art skylights exist for finished and unfinished ceilings.

The instant disclosure provides a means to emulate natural daylight by the utilizing devices within a system to artificially create effects common to daylight illumination of skylight structures. Providing a user perception of natural daylight not readily distinguishable from natural daylight results in user benefits observed for natural daylight exposure, including increased sales per square foot, higher employee productivity, reduced recovery times after surgical procedures, increased test scores, reduced employee absenteeism, and increased occupant satisfaction.

A detailed understanding of why natural daylight emulation affects an outcome similar to exposure to natural daylight is recently emerging and may involve a number of affective and cognitive factors. Circadian rhythms are biological cycles that have a period of about a day; numerous body systems undergo daily oscillations, including body temperature, hormonal and other biochemical levels, sleep, and cognitive performance. In humans, a pacemaker in the hypothalamus called the suprachiasmatic nucleus drives these rhythms. Because the intrinsic period of the suprachiasmatic nucleus is not exactly 24 hours, it drifts out of phase with the solar day unless synchronized or entrained by sensory inputs, of which light is by far the most important cue. When humans experience a sudden change in light cycle, as in air travel to a new time zone, they may suffer unpleasant mismatches between instantaneous biological rhythms and local solar time, also known as jet lag. Normal synchrony is restored over several days via the rising and setting of the sun; an abundance of artificial light frustrates this resetting mechanism. Furthermore, chronic exposure to cyclical lighting patterns different to those of the local solar time shifts local biological rhythms, causing loss of attention, drowsiness, lowered productivity, irritability, and general decrease of well-being. The strong ability for artificial light to alter circadian rhythms arises from exposure frequency; typical participants in industrialized economies may spend a majority of waking hours under artificial lighting conditions. In some nations, lighting is the largest category of electricity consumption. Daylight emulation systems, while not exactly matched to local solar conditions, can provide the body with a series of signals strongly correlated with local solar conditions, such that the mismatch between artificial and natural daylight is reduced, causing less interference to natural daily biological patterns. These interference reductions may beneficially affect occupant's behaviors, such as productivity, propensity to purchase goods and services, and general wellbeing.

Social, market, cognitive, and economic factors also influence the effect of natural daylight's ability to affect factors such as productivity, propensity to purchase goods and services, and general wellbeing. Typical building construction results in a limited supply of windows and skylights. For densely populated multi-story buildings, a fraction of all working areas receive direct or indirect exposure to natural daylight. Since scarcity can be a driving factor in relative valuation, areas of ample natural daylight illumination are assigned higher value, and may serve as rewards or incentives for performance or reserved for communal area such as atriums, cafeterias, and conference rooms. A building has a limited supply of perimeter and corner offices, only a subset of which may include windows. A building also has a limited supply of floors directly below the roof, only a subset of which may include skylights. Daylight emulation systems and fixtures, while not actually providing exposure to natural daylight, may provide building occupants the perception or belief of the presence of natural daylight and a beneficial outcome may be affected by a means of placebo effect.

As such, affecting outcomes such as increased sales per square foot, higher employee productivity, reduced recovery times after surgical procedures, increased test scores, reduced employee absenteeism, or increased occupant satisfaction comes from a combination of exposure to lighting conditions closely resembling lighting natural daylight and the user perception that the light is emerging from a real skylight. Embodiments of the instant specification create at least one of the above conditions.

Figure 5:
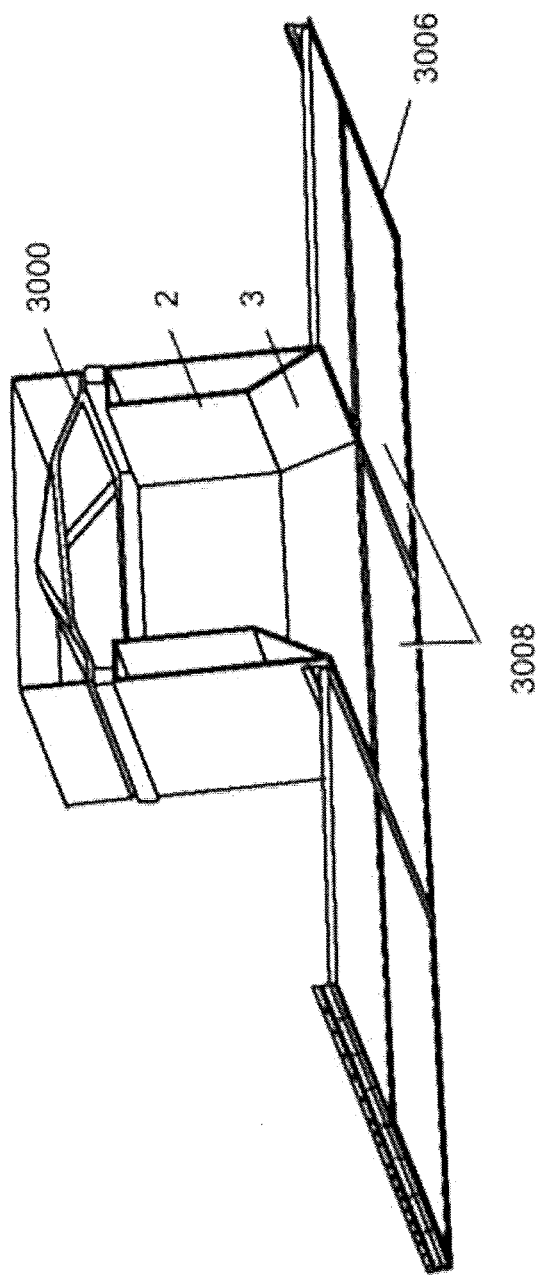
FIGS. 5 and 5A are schematic representations of a natural daylight emulation light fixture.
Figure 5A:
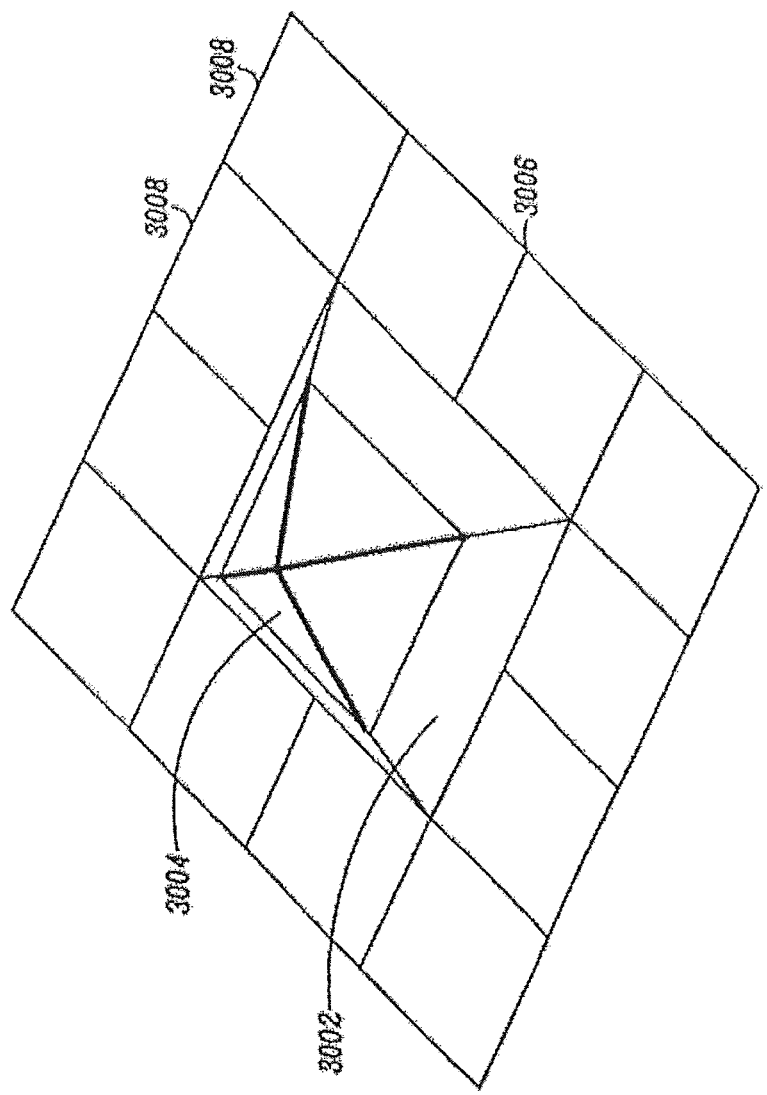
Figure 6:
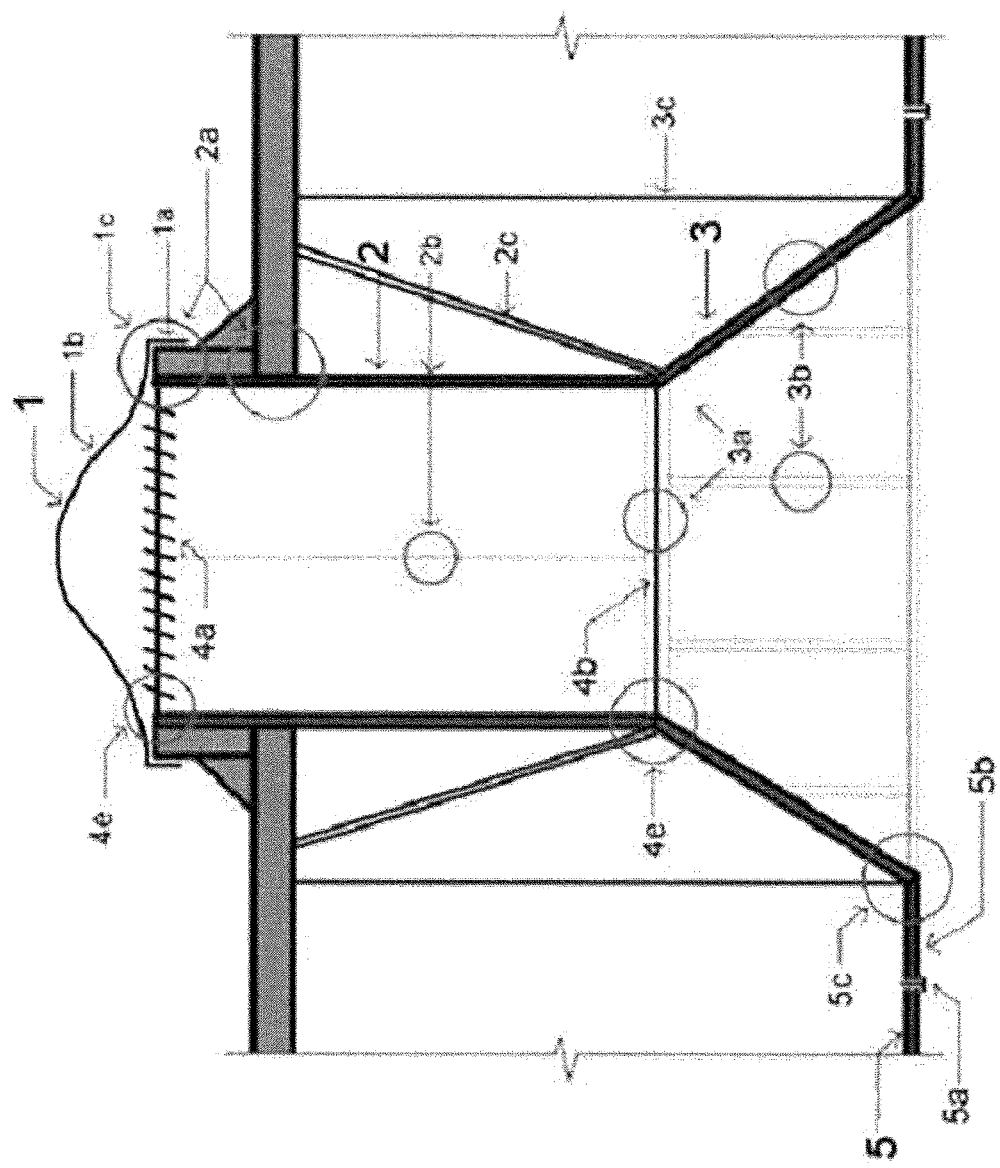
FIG. 6 is an example of a suspended ceiling skylight of the prior art.

An embodiment of the disclosure utilizes a lighting fixture which includes features common to or emulating the visual appearance of skylight components, such as a splayed light well (3002 of FIG. 5A), splay (3), throat (2), or glazing (1*b*) of FIG. 6. As it relates to daylight emulating light fixtures, light wells are recessed surfaces configured at an angle greater than 5 degrees slope relative to architectural surfaces, such as walls and ceilings. Light wells provide for ample vertical surfaces upon which light may be substantially non-uniformly directed to provide the visual appearance of a highly directional source, a key feature of actual sunlight. Embodiments including components common to or emulating the visual appearance of skylight components serve to provide visual signatures of real skylights and also to provide additional surfaces upon which non-uniform illumination may be directed to provide visual signatures of direct and moving light such as the sun. An embodiment utilizes light well with a recessed surface with a total height of at least ten centimeters. Another embodiment utilizes light well throats with a recessed surface with a total width of at least thirty centimeters. Another embodiment utilizes light wells throats with surfaces constructed of materials typical to actual skylights, including gypsum board, acoustic tile, plywood, natural or synthetic wood, textile, plastic, glass, steel or aluminum. Another embodiment utilizes light wells with surfaces coated with materials typical to actual skylights, including diffuse, matte, gloss, or semi-reflective painted surfaces, including variant of neutral white, beige, or unsaturated colors matched to architectural surfaces elsewhere in the building interior.

Another embodiment of the disclosure utilizes light well with splays with angles of 25 degrees-65 degrees relative to the ceiling. Another embodiment utilizes daylight emulating light fixtures with total ceiling footprints corresponding to multiples of the ceiling tile, such as 2' or 4'.

An embodiment of the disclosure utilizes an occupant observable glazing typical to skylights. An embodiment utilizes a glazing constructed of plastic or glass. An embodiment utilizes a glazing colored as clear or translucent white, bronze, or gray. An embodiment utilizes a glazing shaped as flat, at an angle greater than 5 degrees slope relative to the ceiling, or in a faceted framing system that assumes various pyramid shapes. An embodiment utilizes a plastic glazing shaped as a molded dome or pyramid.

An embodiment of the disclosure utilizes a light fixture configured such that no structural supports are directly observable to a building user aside from during installation and maintenance, such as is the typical case for an actual skylight.

An embodiment of the disclosure utilizes a spatial configuration of daylight emulating light fixtures that closely resembles a typical spacing for actual skylights. For example, inter-emulator spacing may be approximately the same as those typical for natural skylight spacing, such as a dimension less than 1.4 times the ceiling height. In another embodiment, inter-emulator spacing with large splayed elements may be 140% of ceiling height plus twice the distance of the lateral splay dimension plus the emulator light well lateral width.

Another embodiment of the disclosure utilizes artificial light fixtures typical to building interiors which are not intended to emulate daylight configured in an arrangement to emulate a system comprised of natural skylights supplemented with artificial light. In such an embodiment, inter-emulator spacing and inter-artificial light fixture spacing are set such that an overall configuration emulating a typical arrangement of the corresponding configuration is achieved.

Another embodiment of the disclosure utilizes artificial light fixtures typical to building interiors that not intended to emulate daylight with lamps possessing correlated color temperatures typical to artificial light fixtures configured to supplement skylights. In an embodiment, the artificial light fixtures may be fluorescent lamps with correlated color temperatures of 4100 degrees K arranged in ceiling troffers.

Another embodiment of the disclosure utilizes artificial light fixtures typical to building interiors that not intended to emulate daylight with lamps possessing color rendering indices typical to artificial light fixtures configured to supplement skylights. In an embodiment, the artificial light fixtures may be fluorescent lamps with color rendering indices of 60-85 arranged in ceiling troffers.

FIG. 5A shows the luminaire installed in a ceiling (3006) wherein the ceiling is constructed of ceiling tiles (3008). This embodiment differs from that shown in FIG. 5 in that there is a very short throat in this embodiment. This allows for installation in ceilings having little clearance.

Mechanical aspects of the disclosure may utilize a skylight assembly, or skylight luminaire (3000).

Figure 7:
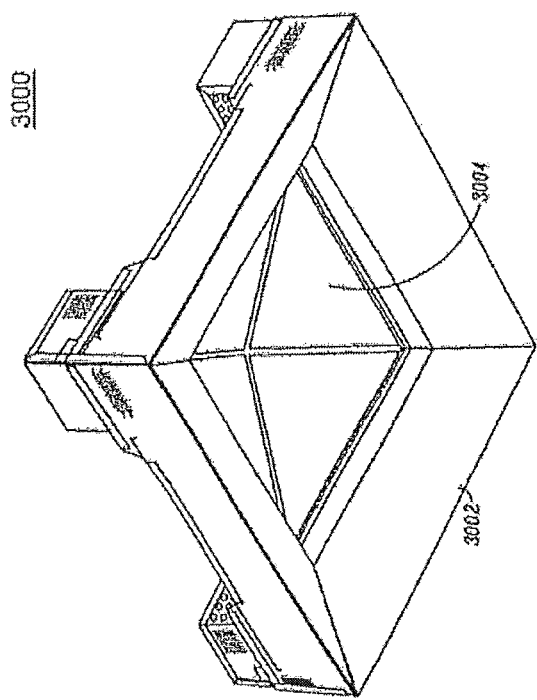
FIG. 7 illustrates a view from under a bottom side of a skylight assembly.

FIG. 7 illustrates a view from under a bottom side of skylight assembly (3000).

Figure 8:
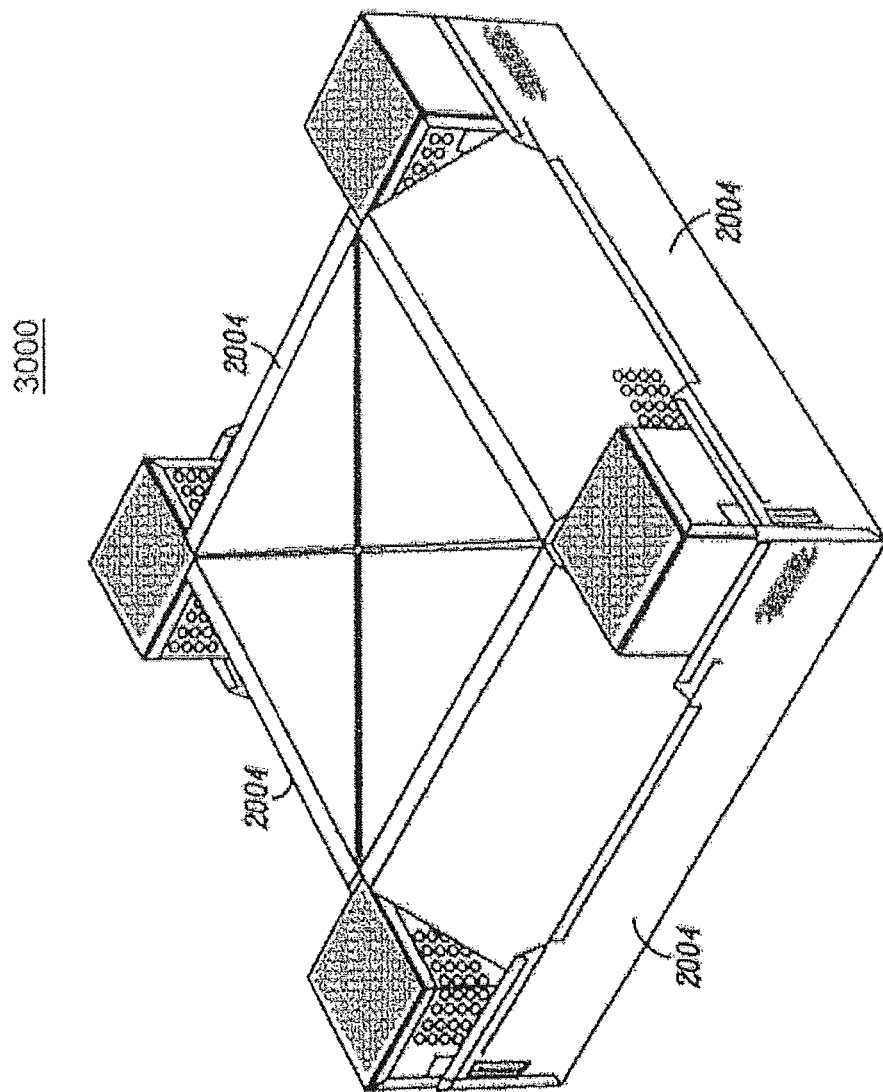
FIG. 8 illustrates a view from the top of a skylight assembly of FIG. 5.

FIG. 8 illustrates a view from the top of the same embodiment.

Tuning control algorithms 164 may include color temperature tuning, intensity tuning and the like. Color temperature tuning may include generating a dynamic, daylight quality spectrum with color temperature tuned to sun position based on geography and time of day. Intensity tuning may include generating a dynamic, daylight quality spectrum with intensity tuned to sun position based on geography and time of day. Tuning control algorithms 164 may generate a dynamic, daylight quality spectrum with at least one of intensity, directionality and color temperature tuned to sun position based on at least one of geography and time of day, wherein the light mixes light from multiple sources to provide a range of color temperatures spanning from 3000 K or less to 6000 K or more with a color rendering index (CRI) greater than 85.

The light sources may be comprised of multiple types, such as surface mount light emitting diodes (LEDs), packaged LED emitters, through hole LEDs, arrays of LEDs in a common package (chip-on-board devices), or collections of packaged LED emitters attached to a common board or light engine. The LEDs may be comprised of down conversion phosphors of multiple types, including YAG:Ce phosphors, oxynitride chemical compounds, nitride chemical compounds, rare earth garnets such as lutetium aluminum garnet, rare earth oxynitride compounds, silicate compounds, phosphor films, quantum dot, nanoparticles, organic luminophores, or any blend thereof, collectively referred to as phosphor coatings. The phosphor coatings may also be disposed on other optical elements such as lenses, diffusers, reflectors and mixing chambers. Incident light impacts the phosphors coatings causing the spectrum of impinging light to spread.

Light sources may also include organic light emitting diodes (OLEDs), polymer LEDs, or remotely arranged downconverter materials comprised of a range of compounds. The semiconductor source of light generation may include one or more semiconductor layers, including silicon, silicon carbide, gallium nitride and/or other semiconductor materials, a substrate which may include sapphire, silicon, silicon carbide, and/or other microelectronic substrates, and one or more contact layers which may include metal and/or other conductive layers. The design and fabrication of semiconductor light emitting devices is well known to those having skill in the art and need not be described in detail herein.

The positioning of individual light sources with respect to each other that will produce the desired light appearance at least partially depends on the viewing angle of the sources, which can vary widely among different devices. For example, commercially available LEDs can have a viewing angle as low as about 10 degrees and as high as about 180 degrees. This viewing angle affects the spatial range over which a single source can emit light, but it is closely tied with the overall brightness of the light source. Generally, the larger the viewing angle, the lower the brightness. Accordingly, the light sources having a viewing angle that provides a sufficient balance between brightness and light dispersion is thought to be desirable in the lighting fixture.

The intensity of each of multiple channels of lighting elements may be adjusted by a range of means, including pulse width modulation, two wire dimming, current modulation, or any means of duty cycle modulation.

In embodiments, tuning control algorithms 164 may also include weather tuning and tuning based on other environmental conditions. Weather tuning may include at least one of intensity, directionality and color temperature, which may be based on the sun position (which may be based on at least one of geography and time of day) and based on emulating a weather condition for a local or remote environment, such as cloud cover conditions, cloud thickness conditions, a snow condition, a rain condition, an air pollution condition, a fog condition and the like. Weather conditions may be stored in weather data database 152. A user may wish to have the lighting system 100 replicate outside conditions at a current location or replicate conditions at some other position. For example, a user in the far North may wish to emulate conditions in a tropical island during the winter.

In embodiments, methods and systems are provided wherein tuning a window or skylight with a control algorithm 164 adjusts delivered daylight based on weather, and the display 160 shows an image of the current outside weather conditions, such as captured by an external camera 170 or color photo sensor having a network connection, which may be positioned to capture images outside a building where the system 100 is positioned, or may be positioned at a remote location, such as to capture images of desired scenery.

In embodiments, methods and systems are provided wherein the heat system 107 includes an integral radiant heat source that is controlled, such as by the environmental condition control system 140, to provide a correlation between heater power flow and cloud cover conditions, such as measured by a sensor or reported by an external weather database. For example, on a sunny day, the heater 107 may provide more warmth from the system 100, to simulate the warmth of the sun.

In embodiments, methods and systems are provided wherein a control algorithm is provided that uses a defined relationship between weather conditions and tuned colorimetrics across an available color gamut, which is used to control the output of the fixture. For example, the color temperature of the lighting system 100 may be tuned to the color temperature of the daylight conditions outside the building where the system 100 is positioned.

Figure 21:
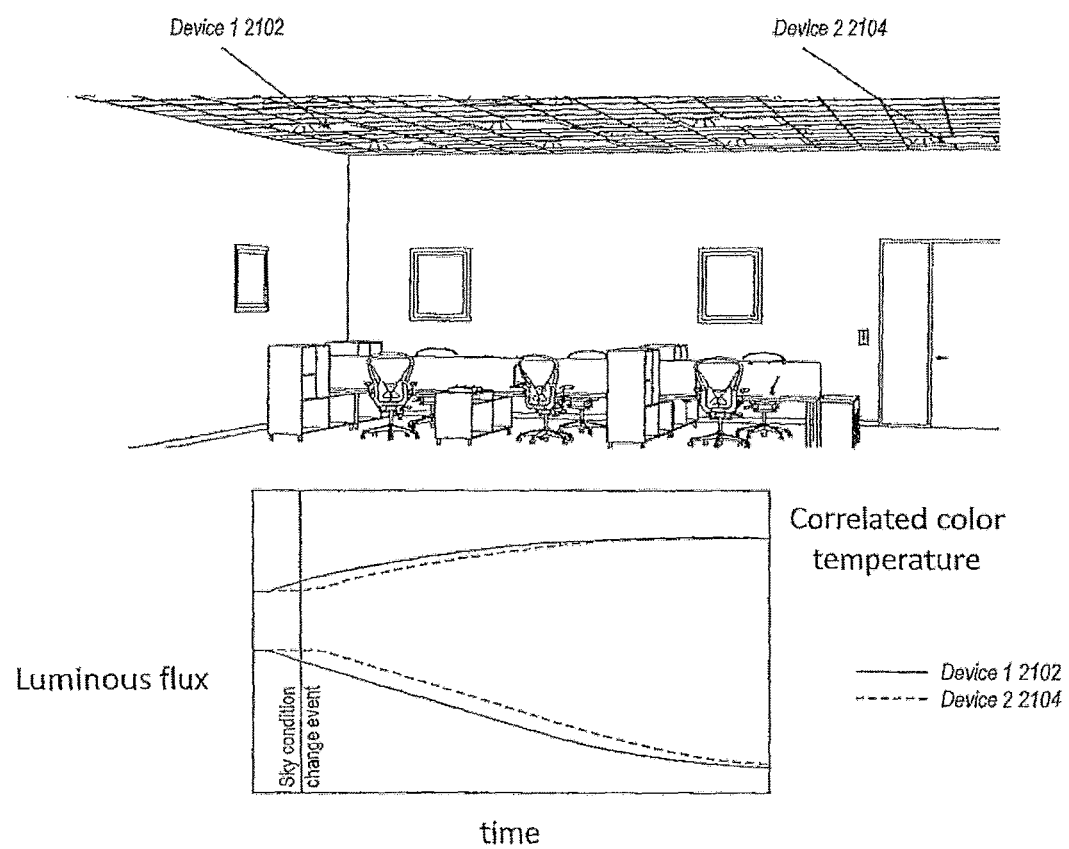
FIG. 21 illustrates coordination of an effect across a plurality of skylight systems.

In embodiments, methods and systems are provided wherein a plurality of modular ceiling fixtures have weather condition variants that result in tuned lighting that is synchronized and/or coordinated among the fixtures and configured for integration with the architectural features. For example, referring to FIG. 21 two systems 100 (Device 1 2102 and Device 2 2104, each comprising a skylight system 100) may be positioned near each other, and the passing of clouds overhead may be simulated by having a darkening effect travel in the same direction across the display 160, or by dimming the light engines 122 to simulate the impact of clouds, where the timing is coordinated to make it appear that the effect is passing over the systems 100 in series, rather than at the same time. For example, a change in the light level, color temperature, or other photometric output of Device 1 2102 can slightly precede a similar change in Device 2 2104. Effects can vary depending on the type of condition that is being simulated. High clouds can be simulated by varying light levels and color temperature, while lower clouds or passing objects might be simulated by displaying a shadow on the system 100 or by projecting a shadow to the environment of the system 100 via the light output of the system 100.

In embodiments, methods and systems are provided wherein a plurality of modular ceiling fixtures with lighting systems 100 are provided, where weather condition variants result in tuned lighting or imagery that is synchronized among the fixtures.

In embodiments, methods and systems are provided wherein fixtures are tuned to weather, such as by referencing a library of images (or video) based on an Internet weather feed.

In one embodiment, the control algorithm 138 for tuning the output of the fixture is based on historical weather data. Illuminance versus time of day can be fit to a quadratic equation of the form:

$$\text{Illuminance} = P_1 * X'^2 + P_2 * X' + P_3$$

where $P_1$, $P_2$, and $P_3$ are fit parameters and X is the time of day in minutes.

X is the re-centered and re-scaled version of X where:

$$X' = X - \mu_1/\mu_2 \text{ and } \mu_1 \text{ is mean } X$$
$$\text{and } \mu_2 \text{ is the standard deviation of } X.$$

Figure 9:
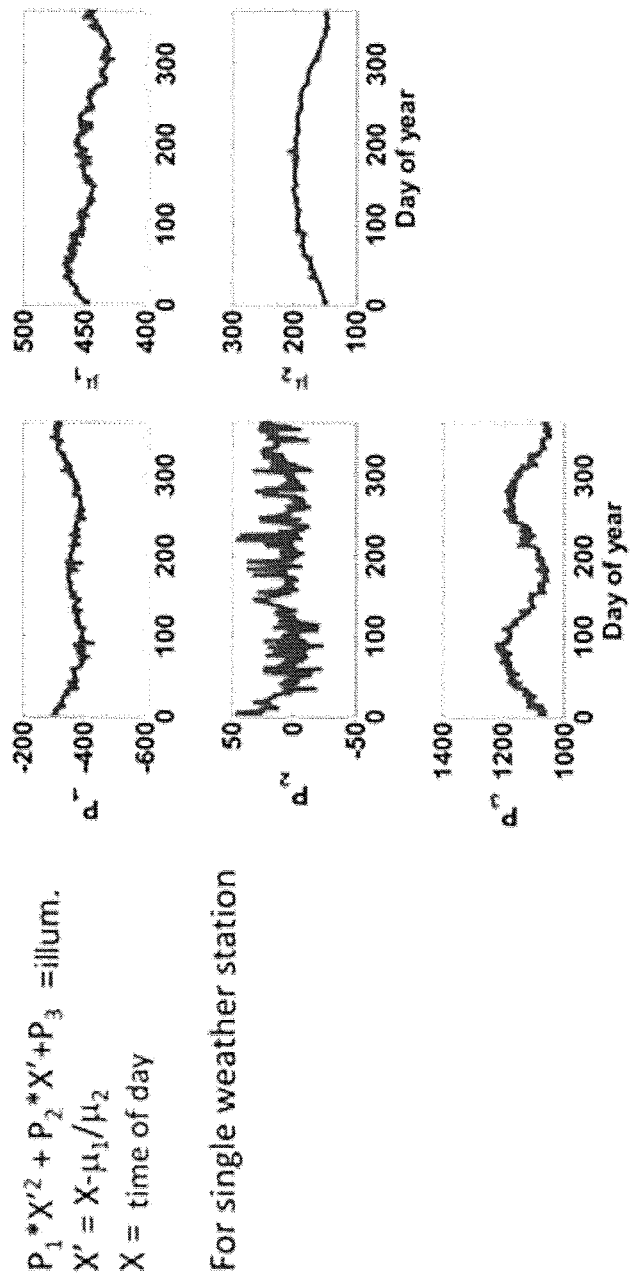
FIG. 9 shows an equation for calculating illuminance and graphs of the values of five fitting parameters of this equation as a function of day of year.

The values of these five fitting parameters as a function of day of year are shown in FIG. 9. Each of the parameters can be fit to further cyclical functions and the coefficients can be stored to relate illuminance value to a function of time of day. The data in FIG. 9 originate from calculated illuminances versus time of day fits to 2007-2013 clear sky solar spectrum data from the US Department of Energy National Renewable Energy Laboratory spectroradiaometer at the Measurement and Instrumentation Data Center in Colorado.

In an embodiment of the disclosure, a controlling input may be provided by a derived metric, such as cash register sales. The daylight emulating light fixture or system of fixtures may be manually or automatically altered to change overall lighting performance in response to a merit function with variable such as seasonally adjusted sales turnover, patient recovery period, satisfaction survey result, occupant dwell time, or a metric related to productivity such as emails sent, orders or calls processed, mail sorted, or assembly time. The derived input may be manually or automatically fed into the system controlling one or more daylight emulating light fixtures.

Tuning based on environmental conditions may include at least one of intensity, directionality and color temperature tuned to sun position based on at least one of geography and time of day and based on emulating an environmental condition selected from a group of environmental conditions. Environmental conditions may include al albedo condition, a reflectivity condition, and opacity condition, a color condition, a building material condition, a shadow condition and the like. Environmental conditions may be stored in environment data database 158.

Environment sensors 124 may include environmental sensor data from at least one external resource and a processing facility for modulating the output of the artificial lighting system 100 based on the environmental sensor data, wherein the environmental sensor data is from a sensor selected from a group of environmental sensors. Environmental sensors may include light sensors, weather sensors, barometers, moisture sensors, temperature sensors, heat flux sensors occupancy detection and tracking sensors and the like. Occupancy detection and tracking sensors may include smoke detection sensors, temperature sensors, weather data sensors, sound collection sensors and motion detection sensors. Environmental sensor data may be stored in environment data database 158. Environmental sensors may be connected by wireless repeaters. Environmental sensors may also be connected to a sound system. Environmental sensors may also provide sensor data streams. Sensor data streams may be data and communications data streams and enable sensor integration.

Figure 22:
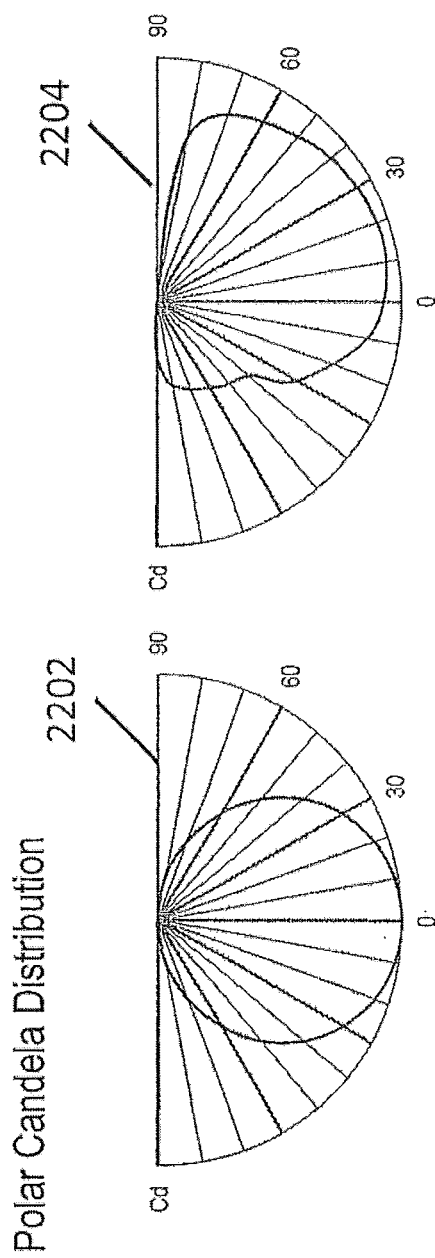
FIG. 22 illustrates varying photometric parameters in order to achieve a coordinated lighting effect.

Tuning control algorithms 164 may also include spatial tuning of bright spots, reflections and shadows tuning. Spatial tuning may manage the position of at least one of a bright spot, a shadow and a reflection based on a factor in the environment where the artificial lighting system 100 provides illumination, where the factor in the environment is selected from a group of factors requiring spatial tuning. Factors requiring spatial tuning may include a workspace location factor, a desktop location factor, a display screen location factor, a TV screen location factor, an art location factor, a mirror location factor, an eye-level location factor, a reading location factor and the like. Factors requiring spatial tuning may be stored in the environment data database 158. Referring to FIG. 22, the left plot corresponds to one light setting 2202, and the right plot corresponds to another light setting 2204. The radial magnitude on the plots 2202, 2204 indicates the light intensity, using polar coordinates. So the left view angle spectrum (polar candela distribution of a typical Lambertian source) would be brightest directly below the fixture. The right plot would be brightest at approximately 30 degrees off axis from directly below the fixture. This is a bright spot moving between two light settings 2202, 2204. These plots correspond to simulated moving bright spots.

Artificial lighting system 100 may include a networking facility that facilitates accessing a geo-location facility for identifying the geo-location of the light. A networking facility that facilitates accessing a geo-location facility for identifying the geo-location of the light may also include a processing facility for determining the azimuth of the sun at the geo-location at a point in time. A networking facility that facilitates accessing a geo-location facility for identifying the geo-location of the light may also include automatically tuning the intensity, directionality and color temperature based on the azimuth and geo-location of the sun at the position. The azimuth and geo-location of the sun at the position may be based on geography of the position, time of day of the position and the like.

The LED and drivers light engine printed circuit board assembly (2610) may include microcontrollers. The micro controllers on each printed circuit board assembly (PCBA) may receive commands from a master micro controller about relative dimming levels for five LED channels and the like. Commands may be specific to longitude, latitude, luminaire orientation, time of day, day of year and the like. Embodiments may respond to actual sky conditions.

A skylight assembly (3000) may include an on-board database which related five channel drive settings to luminous flux output, color rendering index, and correlated color temperature (CCT). The CCT and luminance set points may be derived from a set of closed form equations with inputs. Inputs may be time of day, day of year, longitude, latitude, and luminaire orientation. The closed form equations for CCT and luminance may originate from numerical fits to observed historical data from weather stations. In one embodiment, control algorithms 138 may be derived from analytically derived calculations of light spectra for a surface arbitrarily located on the earth. A lighting program may be manually altered by a user, administrator and the like. The alteration may affect the closed form equations for CCT/luminance. The new program sequence may still reference the same control algorithms and database to determine required channel compositions. Examples of a change to the lighting program may be to "adjust all CCTs up by 100 K", "adjust all luminance values down by 10%" and the like.

The sun position and solar spectral power density spectrum may be required for any installation location at any time. In one embodiment, the spectral model originates from the equations described in Bird, R. E., and Riordan, C. J. (1986). "Simple Solar Spectral Model for Direct and Diffuse Irradiance on Horizontal and Tilted Planes at the Earth's Surface for Cloudless Atmospheres." Journal of Climate and Applied Meteorology. Vol. 25(1), January 1986; pp. 87-97. This model generates a list of illuminance values at specified wavelengths for surfaces at arbitrary positions and orientations and any time. That spectrum may be reduced to, for instance, a value of illuminance relative to daily peak illuminance and correlated color temperature, which may then be mapped to the four glazing diffusers by an analytically determined or experimentally measured table of channel settings to proportionally alter luminance to create the sense of a moving sun. In one embodiment, the illuminance spectrum is matched to glazing luminance settings of the luminaire glazings when the glazings are designed to strongly diffuse. In other cases, the correlated color temperatures are adjusted according to occupant override of algorithmic settings.

A controller can receive input as to the location on the earth and the day, month, and time of day and can calculate the spectrum, direction of light and intensity that would be received. It then can control multiple light sources surrounding the light well to generate a spectrum and intensity that simulates such light being received form the calculated direction. Illuminating one or more of the sides of the light fixture gives the impression of light being received from a given direction. Lighting the top side appears to receive light at an angle form the bottom side. Lighting both the top and the right sides creates a lighting gradient that gives the appearance of light being received from the left bottom corner. If all sides are lit, it looks like light is being received from directly overhead.

Figure 11:
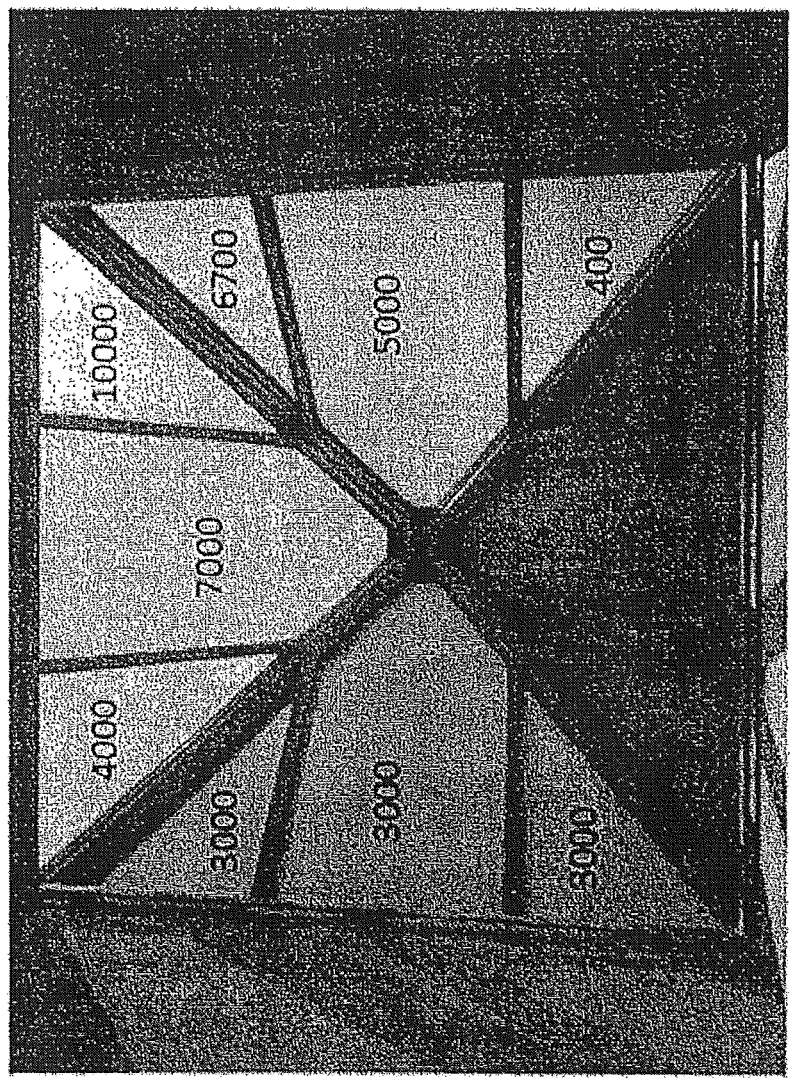
FIG. 11 is an illustration of architectural skylight.

Using multiple light sources and controlling their output in a proper manner may result in the pattern shown in FIG. 11. The numbers represent intensities.

In one embodiment, the input settings of one or more of longitude and latitude to drive the algorithm are altered to correspond to geographical settings remote from the installation location for the purposes of affecting occupant's circadian rhythms. Increasing longitude from local values results in a positive time shift and will shift occupant circadian rhythms to later in the day. Decreasing longitude from local values results in a negative time shift and will shift occupant circadian rhythms to earlier in the day. Decreasing latitude from local values results in an increase in perceived day length, and can be used to counteract the seasonal reduction in day length that occurs in winter in northern latitudes and is correlated to seasonal affective disorder. Increasing latitude from local values results in a decrease in perceived day length, and can be used to increase the occupant sleepiness in late hours of the day.

Virtualization algorithms 142 may select an additional virtual effect. A virtual effect may be an image virtual effect, a sound virtual effect, a smell virtual effect and a feel virtual effect that simulates an effect of a skylight, a window and the like. Sound virtual effects may include the replication of sound, messaging and communications sounds, music and the like. Replication of sound may be replication of sound as heard through windows and skylights, from spaces outside. Sound virtual effects may include street noise sound, rain sound, lighting sound, waves crashing sound and the like. Messaging and communications sounds may include a voice in the sky, such as a speaker in a cruise ship cabin. Music may be muted to sound like it is coming from the outside. A smell virtual effect could include fresh cut grass, smells from the countryside, salty ocean air and the like. A smell virtual effect could be released when a housing that includes the artificial lighting system 100 is opened, for example. A feel virtual effect could be dynamic airflow from an open skylight or window, radiant heat and the like.

Figure 23:
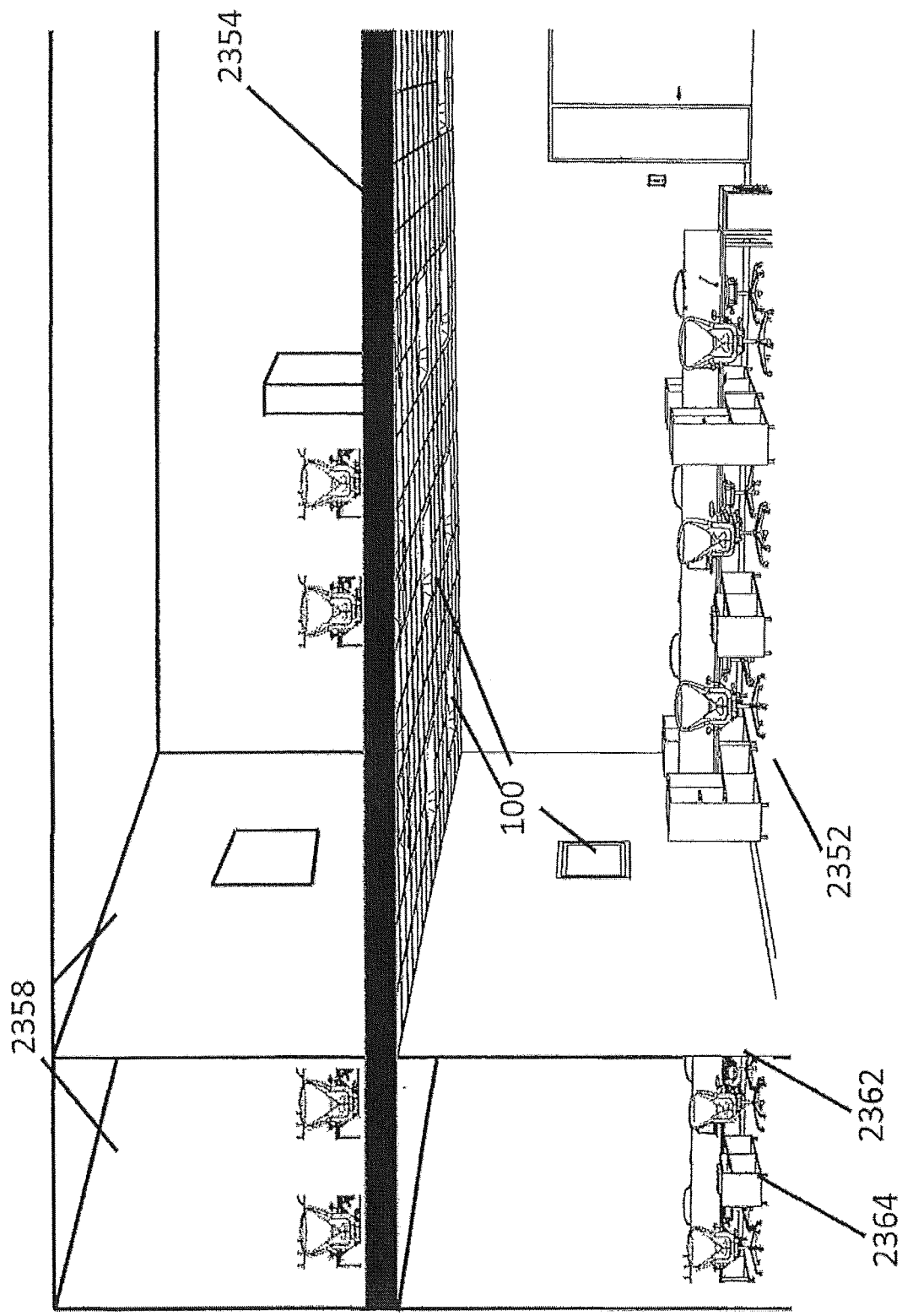
FIG. 23 illustrates an interior office that emulates an exterior office by virtue of installation of daylight emulation systems.

In embodiments, methods and systems are provided wherein a fan 104 or other ventilation element for moving air, a heater 107, a cooling facility 109 or the like is integrated to allow simulation of a warm or cool breeze. The breeze may be controlled by the environmental condition control system 140, such as to emulate conditions in the outside environment of a building in which the system 100 is disposed, or to emulate conditions at some other location. In embodiments of a system 100, a virtual window may be provided for an interior office, where the window provides not only daylight emulating lighting, but also visual imagery 112 and a warm or cool breeze, so that the user perceives the interior office as having realistic characteristics of an exterior office. Referring to FIG. 23, an interior office 2352 has skylight and daylight emulation systems 100 for emulation of natural daylight in the interior office 2352, which are placed in the ceiling 2354 and wall 2360 respectively. Workers in the interior office 2352 experience a daylight experience despite being located beneath upper offices 2358 and adjacent office 2364, which in a conventional building would block the interior office 2352 from receiving daylight from above or from the side. As result, the interior office 2352 effectively emulates an exterior office, rendering it potentially more attractive for workers and also making it possible for architects and designers to design spaces with fewer constraints, such as to take advantage of interior spaces that normally would be considered unsuitable for certain uses. In embodiments, methods and systems are provided wherein a control algorithm is provided that uses a defined relationship between radiant heat power and tuned colorimetrics across a wide color gamut that is used to control an output of the fixture. For example, the heater 107 may warm the air delivered by a fan 104, so that the air has an appropriate temperature that reflects the color of the illumination. For example, in the summer, when blue skies often correspond with high temperatures, a breeze coming from a lighting system 100 may be warm when the color of the light corresponds with the cool color temperatures of a bright blue sky. In the winter, when warmer days are usually associated with lower pressure systems, which produce clouds, the heater 107 may warm the air more on cloudy days and provide cooler breezes on bright days. Many such relationships may be defined, so that heat 107, cooling 109, movement of air by a fan 104, and scent may be controlled in association with the control of the color or color temperature of light produced by light engines 122, to produce virtual effects that effectively mimic real world effects.

In embodiments, methods and systems are provided wherein a control algorithm of a control system 138 is provided where a defined relationship is provided between radiant heat power produced by a heating facility 107 of a system 100 and location of the system 100, such as reflecting outside temperatures across a wide geography. The relationship may be used to control the output of the fixture, including output from light engines 122 and from the heating facility 107. Other outputs, such as the speed of a fan 104, corresponding sounds 105 and scents 106, or the like may also be defined in such a relationship.

In embodiments, methods and systems are provided wherein an integral radiant heat source in a fixture has positive correlation between heater power flow and light levels, thus approximating the relationship between cold overcast days to hot sunny days.

In embodiments, methods and systems are provided wherein a modular ceiling skylight fixture or window, embodied as an artificial lighting system 100 as described herein, is provided with a ventilation system, such as enabled by a fan and/or one or more conduits. FIG. 24A shows a view from a room of a dropped ceiling mounted recessed light fixture 2402 appearing as a typical light fixture. FIG. 24B shows a view from the ceiling of the fixture 2402, where an opening in the plenum rated light fixture 2402 mounts to the ventilation duct 2404. In embodiments, a control system for ventilation, such as a ventilation register, may be provided that can be controlled together with the lighting system 100, such as with a single interface, where actuation of the register for ventilation may be encoded with commands for desired conditions, such as for 'fresh air'. In embodiments, the source of fresh air may be from outside of a building, such as to increase oxygen levels, as compared to recirculating internal building air, which may otherwise have lower oxygen and higher carbon dioxide and higher volatile organic compound levels. In embodiments, a filter may be provided for filtering outside air to remove any undesired components, such as CO2, particulates, ozone, or the like.

In embodiments, methods and systems are provided wherein an effect, such as a lighting effect, imagery effect, or other effect (such as heating, cooling, ventilation, scent, or the like) is distributed over a plurality of modular ceiling fixtures with partial display on each. This may be controlled by the synchronization module 172 for managing multiple lighting systems 100, including tracking information about the absolute and relative position and orientation of such systems 100, as well as managing timing for display of images across multiple systems 100. In embodiments, methods and systems are provided wherein a dynamic imagery effect is distributed over a plurality of modular ceiling fixtures with partial display on each.

In embodiments, methods and systems are provided wherein a display may have imagery that makes a skylight or window appear real, while providing realistic daylight, which may involve separate handling of the imagery and the daylight under distinct protocols in the control systems 138.

In embodiments, methods and systems are provided wherein the library of available imagery is restricted or resized relative to the results of a design method. For example, only images that have an appropriate image size, image form factor, or resolution, may be made available to an artificial lighting system 100, depending on its size, shape and display capabilities.

In embodiments, methods and systems are provided wherein the library of available images, such as in the display content database 154, is specific to the form factor of the lighting system 100. For instance horizontal form factors (skylights) may show sky related images (clouds), while vertical form factors (windows) may show street related images (e.g., moving vehicle patterns).

In embodiments, methods and systems are provided wherein fixtures are provided with a library of displays of imagery tuned to known biological/psychological outcomes, such as calmness, excitement, and sadness intended to affect mood and behavior.

In embodiments, a kit 114 may be provided with a skylight to fit a standard ceiling, with pre-configured network capability (such that it works out of the box), with a user account that can be configured to allow access to a library of images. In embodiments, the kit may comprise a library of videos. In embodiments, the kit may enable a live feed, such as of video from a remote camera.

Figure 12:
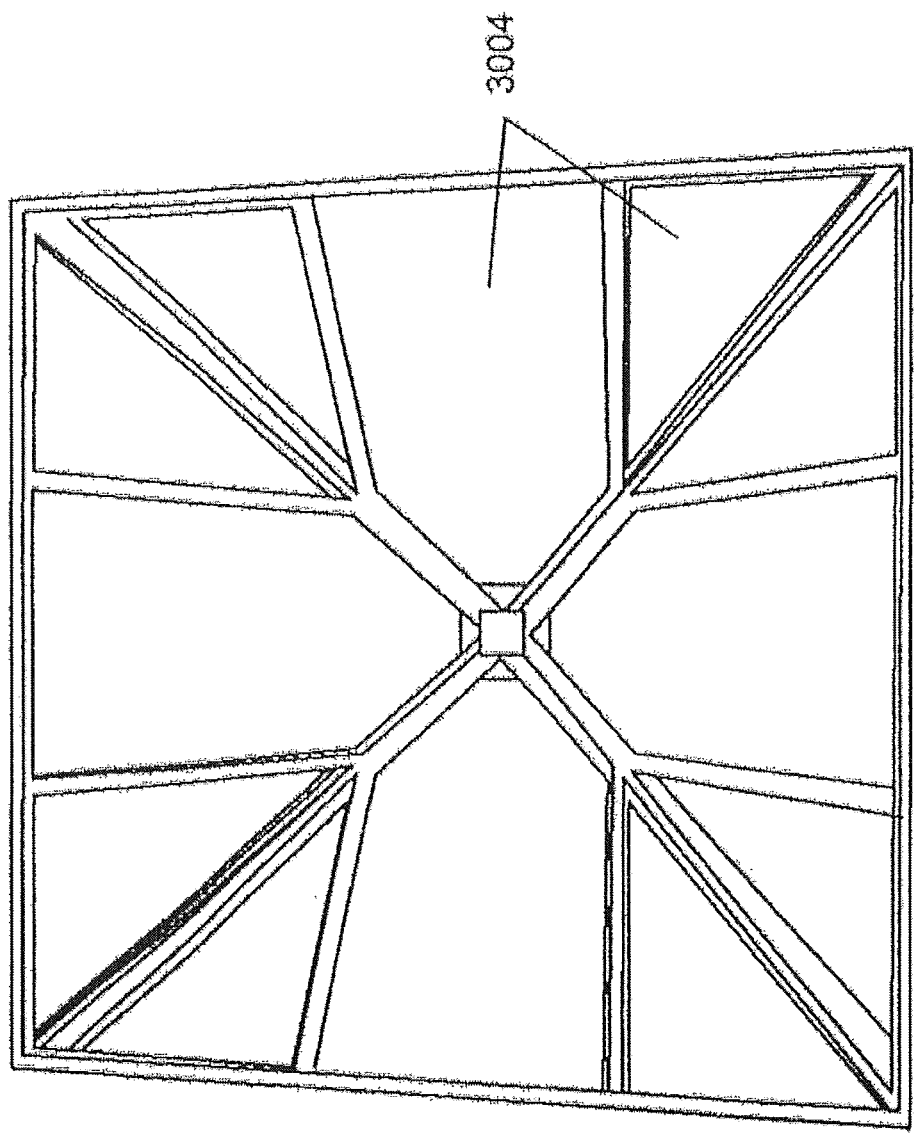
FIG. 12 illustrates an embodiment of a frame for glazing diffusers.

FIG. 12 illustrates an embodiment of a frame for glazing diffusers. The frame for glazing diffusers may be constructed with mullions with dimensions typical to conventional skylights, an embodiment of which is illustrated as the pyramidal glazing (3004) with visible mullions. The skylight luminaire may also include housings to provide convective air flow for electronics cooling. The dimension of the skylight luminaire user-side ceiling foot print may be matched to the typical acoustic tile grid size of two feet wide by two feet in length.

An embodiment of the disclosure utilizes multiple light sources within light engine (2004) with color temperature, color rendering performance, and viewing angle configured such that at least one light source is configured to emulate sunlight and at least one light source is configured to emulate skylight. The light source may be LEDs, such as those on the light engine printed circuit board assembly (2610 of FIG. 13), configured to emulate sunlight and may have a viewing angle lesser than the light source configured to emulate skylight. The light source configured to emulate sunlight may have a correlated color temperature lower than the light source configured to emulate skylight. The light source configured to emulate sunlight may have color rendering performance greater or lesser than the light source configured to emulate skylight as quantified by color rending index.

An embodiment of the disclosure utilizes a light well with a light source configured to emulate sunlight such that direct illumination of the light well is clearly observable to at least one building occupant. The light source is configured to create a substantially non-uniform illumination of the light well in a manner characteristic of a bright point source of light, such as the sun, including distinct areas of light and shadow and clear boundaries between such areas. The light source may be configured such that the distinct areas and boundary region move over the course of the day, such as would be created by movement of the sun across the sky. An embodiment utilizes an array of light sources which are mechanically actuated such that the distinct areas and boundary region on the light walls shifts throughout the day as to emulate the movement of the sun. An embodiment utilizes an array of light sources which are electronically controlled such that the distinct areas and boundary region on the light walls shifts throughout the day as to emulate the movement of the sun. An embodiment utilizes a light source configured to emulate sunlight with a correlated color temperature with a value within 20% of the correlated color temperature of the direct sunlight present at that time of day. An embodiment utilizes a light source configured to emulate sunlight with a color rendering index of at least 90. An embodiment includes a minimum separation of six inches from an array of highly directional light sources and an illuminated surface on the opposite facing light well throat.

Figure 20:
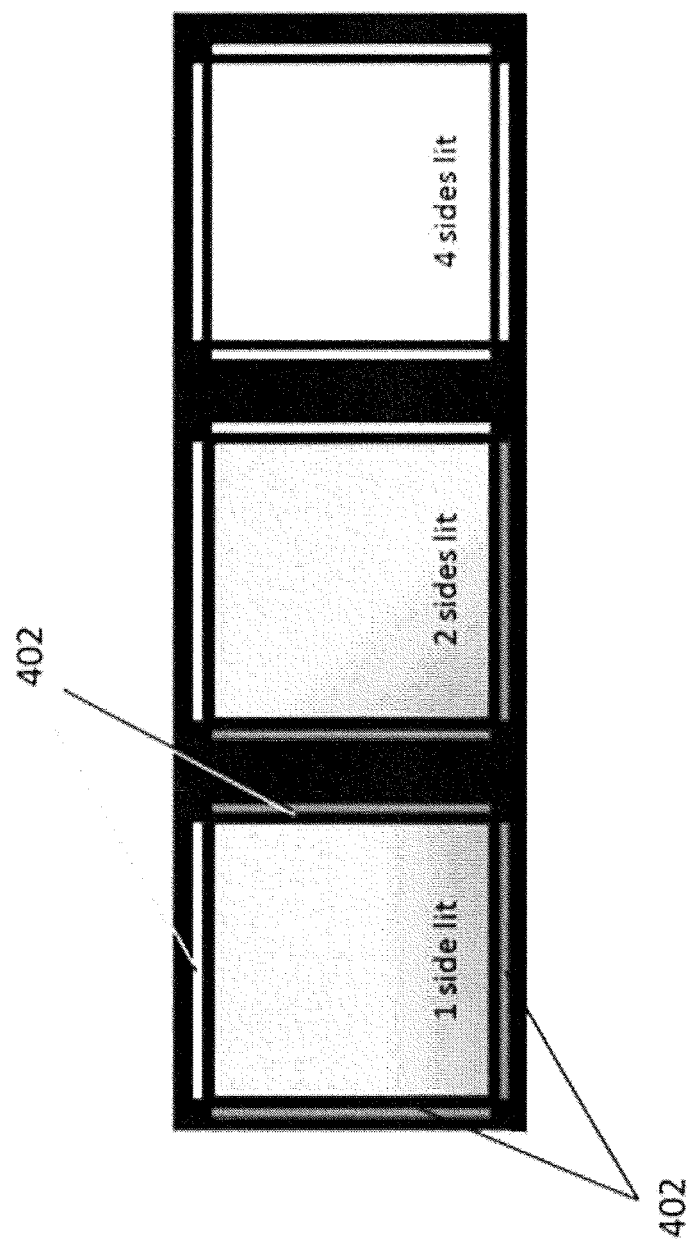
FIG. 20 is an illustration of the graded light effects that may be produced with a multi-channel addressable edge illuminated light guide.

An embodiment of the disclosure utilizes light sources that are edge-illuminated light guides (402, as shown in FIG. 20), as a luminous surface directly viewable to occupants as surfaces of the glazing, light well, throat, or splay. Areas of graded brightness are achieved through the selective illuminated of lighting channels distributed over the edge faces. For example in FIG. 20, various visual effects of graded brightness are achieved through selective illumination of edge channels, each of which may correspond to the visual effect created by the illumination of a surface of the light well throat by a directional light source such as the sun. An embodiment utilizes as least one edge illuminated light guides (402). Another embodiment utilizes four edge illuminated light guides (402) configured to illuminate the light wall throat observable by a building user. Another embodiment utilizes a groove or channel in the edge faces of the light guide (402) to facilitate optical coupling and assembly of the light source. A light guide (402) may be constructed of materials such as are well known to those versed in the art. A light guide (402) may be patterned with substantially non-uniform structures or coatings to control light output using methods and arrangements that are well known to those versed in the art.

Therefore, by selectively activating the light sources, or combinations of the light sources, it is possible to emulate light being received form a specific direction.

An embodiment of the disclosure utilizes a glazing formed of edge-illuminated light guide (402) to emulate a diffuse skylight. This configuration has principle benefits of reducing light source part count, increasing light source homogeneity, and reducing the vertical dimension between the top of the emulator and the glazing.

An embodiment of the disclosure utilizes a glazing possessing a plurality of surfaces each viewable to a building occupant and facing a different direction. The surfaces may be directly connected or connected by way of a framing or mullion member. Each of the surfaces are backlit by one or more light sources configured to emulate diffuse skylight and such that the average luminance and correlated color temperature are substantially different at any given time in a manner that may optionally change over the course of a day to emulate an effect of a moving direct source such as the sun. For instance, the surface facing the direction of the emulated sunlight may have a lower correlated color temperature and a higher luminance compared to one or more adjacent surfaces that are configured to emulate skylight having a higher correlated color temperature and a lower luminance. As the emulated sun traverses the emulated sky, the relationship between the surfaces may switch, indicating a change in time to a building occupant through the movement of light. Further, daylight emulator elements that may be included, such as a light well, may be non-uniformly illuminated by the plurality of surfaces, contributing to a sense to a building occupant that a direction of the sunlight has shifted.

An embodiment of the disclosure utilizes a light source configured to emulate skylight that is substantially non-uniform formed by independently addressable light pixels, such that a rudimentary display illuminates the daylight emulator glazing. The display is configured to produce at least two regions of illumination with substantially different correlated color temperatures and luminance. At least one region has substantially higher correlated color temperature than another region, such that the former represents a clear blue sky and the latter represents a cloudy area. At least one region has substantially higher luminance than another region, such that the latter represents a clear blue sky and the former represents a cloudy area. The boundary of the two regions may visually traverse the glazing to provide an emulation of moving cloud cover. The display will be controlled using controlling inputs that may be derived from one or more photosensors or a data stream derived from external weather measurements or observations.

An embodiment of the disclosure utilizes a light well configured to emulate a skylight light well that is substantially taller than the vertical dimension of the daylight emulating light fixture achieved by the inclusion of a mirror. In this configuration, a mirror is arranged to fold light by 45 degrees and the light well is continued horizontally, with one section of the light well below the mirror being approximately vertical and another section of the light well being approximately horizontal. Using this method, a light well can be utilized that has an effective length which is longer than that would be permitted in an unfolded geometry due to interference with non-lighting building infrastructure above the ceiling or in the plenum, including without limitation heating, ventilation, cooling, data, and telecommunication components.

An embodiment of the disclosure utilizes a light source configured to emulate daylight by illuminating a substantially translucent or diffuse glazing such that direct observation of the image of the light source is not possible by a building user aside from during installation and maintenance. An embodiment utilizes a light source configured to emulate skylight with a correlated color temperature with a value within 20% of the correlated color temperature of the diffuse skylight present at that time of day, which may create conditions that vary over a wide range, such as those created by an actual skylight during periods of overcast or patchy clouds, fog, clear or rainy skies.

An embodiment of the disclosure utilizes a light source configured to emulate sunlight with a color rendering index of at least 90. An alternative embodiment utilizes a light source configured to emulate daylight with a correlated color temperature that is greater than the correlated color temperature of artificial light fixtures in the near vicinity of the daylight emulating light fixture by at least 500 degrees K and preferably by at least 1000 degrees K. The differences in correlated color temperature are utilized to provide visual clues that the daylight emulating light fixtures are colorimetrically distinct from the more common light fixtures using, for instance, fluorescent, halogen, or incandescent lamps, such as is the case with natural daylight. The difference in correlated color temperature may be set at the factory at the time of production, or by a technician during fixture installation.

An embodiment of the disclosure utilizes a glazing that is substantially optically non-uniform in a manner to provide visual signatures of elements commonly observed on actual skylight, such as cross bars, mullions, honeycombed patterned, blinds, louvers, or wire reinforced to simulate fire rated glass. An embodiment includes visual elements common to skylights in need of periodic maintenance and which may be otherwise considered local external obstructions, such as bird droppings, fungal growth, plant growth, leaves, water induced mineralization, stains, pooling water marks, tree branches, or puddles. The visual elements may be created by a number of means, including without limitation adhesive decals, and partially transparent and partially coated plastic elements. The elements may be configured behind the glazing, such that the image of the element may be obscured through an optionally diffuse glazing.

An embodiment of the disclosure utilizes a light source configured to emulate daylight constructed by an array of printed circuit board assemblies that are substantially similar. In this manner, daylight emulation fixtures of a range of overall sizes may be constructed from a common component. For instance, the array may possess a lateral dimension within 10% of a factor of a lateral dimension a suspended ceiling grid, such as 6, 12, 18, or 24 inches. Such printed circuit board assemblies may be connected by board to board or board to wire to board connectors in a manner to facilitate fixture assembly.

An embodiment of the disclosure utilizes at least two daylight emulating light fixtures with substantially similar performance characteristics. Establishing believable daylight emulation requires consistency among individual units, and key characteristics such as correlated color temperature, color rendering performance, and average brightness must be matched to within 20% and preferably within 10% and more preferably within 5%. The shape of the substantially optically non-uniform areas within the light well as a function of time should be substantially similar, and average angular difference should be within 20% and preferably within 10% and more preferably within 5%. The difference in correlated color temperature may be set at the factory at the time of production, by a technician during fixture installation, or by a control system responding to user input manual overrides to a given light fixture, which may periodically shift performance characteristics to maintain inter-fixture consistency.

An embodiment of the disclosure utilizes a light source in the light engine (2004) configured to emulate daylight comprised of multiple LEDs on board the light engine printed circuit board assembly (2610) with distinct spectra in a composition such that the additive and optically homogenized resultant light source substantially emulates the correlated color temperature and color rendering performance of daylight. The spectral power density need not be substantially similar to daylight, as the daylight has substantial optical power in wavelength ranges not visible to building occupants. The light source may be configured with independently addressable channels such that the correlated color temperature can be adjusted to a desired value according to controller input. The number of LEDs with distinct spectra need not, and is desirably greater than the number of independently addressable lighting channels to reduce controller complexity and total part count.

Figure 13:
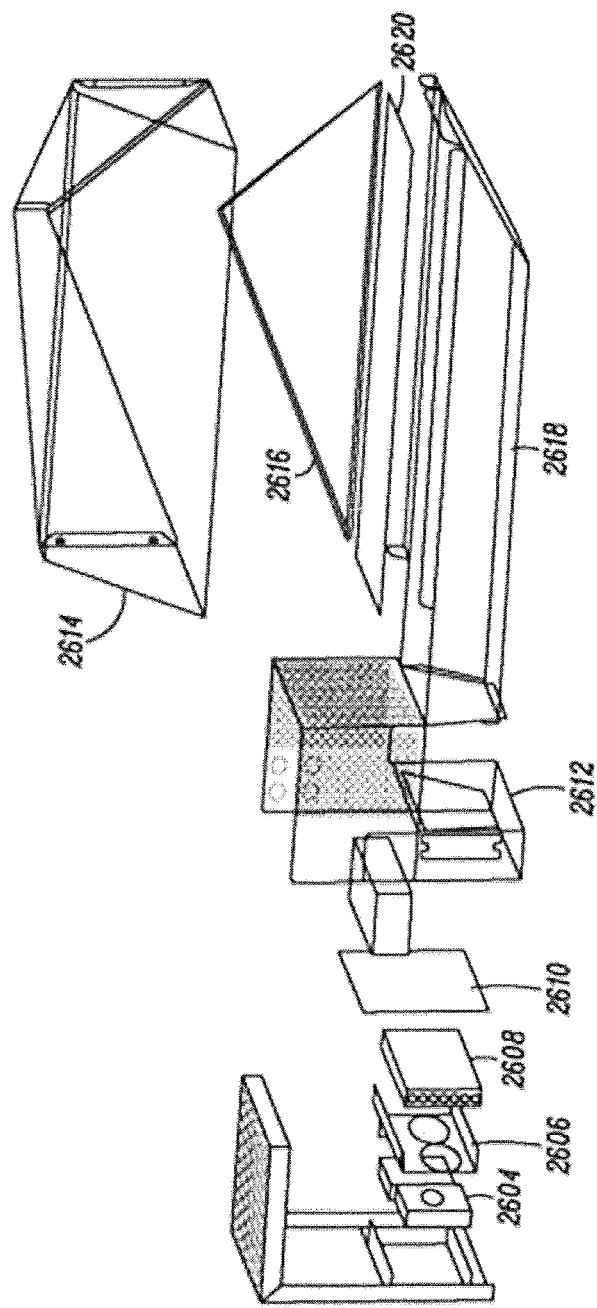
FIG. 13 illustrates an exploded top view of an embodiment of a light engine and light distribution assembly.

The current disclosure may include a light distribution assemblies (2010). FIG. 13 illustrates a solid model, top perspective, and partially transparent view of the light distribution assemblies (2010). The light distribution assemblies (2010) may include a secondary coated surface diffuser (3402), secondary optical mixing chamber (2614), secondary optical diffuser (2616), primary diffuser (2620), and primary optical mixing chamber (2618). The secondary optical diffuser (2616) may be made from highly reflective and predominantly diffuse sheet metal and the like. The secondary optical mixing chamber (2614) may be made from high reflective and predominantly specular sheet metal and the like. The secondary optical diffuser (2616) may be made from a "Lambertian-like" view angle rigid plastic sheet and the like. The primary diffuser (2620) may be made from narrow view angle optical film mounted on a rigid plastic sheet and the like. The primary optical mixing chamber (2618) may be made from highly reflective and predominantly specular sheet metal and the like. The highly reflective primary optical mixing chamber (2618) causes multiple reflections of the light to mix the frequencies.

Here the plurality of speed controlled fans (2604) in the electronics housing (2612) can be seen. There are also heat sinks that are not visible. All is housed in the splayed electrical housing (2008).

Each luminaire quadrant may be independently addressed to provide perceived movement of sun through space specific addressing of color and peak luminance, as if a rudimentary display, when the glazing diffusers are viewed directly. Independently addressable glazing diffusers may provide for non-uniform illumination of the light well providing for lighter, darker, and shadowed regions, as is present in real architectural daylighting features.

FIG. 11 is an illustration of an architectural skylight on clear day. The numbers shown on each diffuser of glazing of the skylight are peak luminance (intensity) in Cd/m2. Each diffuser of glazing in the pyramid skylight shows a different luminance and correlated color temperature depending on azimuth and zenith angle of sun.

Each PCBA of the present disclosure may have multiple independently addressable LED channels mixed to provide light spectrum with high color rendition with color coordinates close to black body equivalent over wide range of correlated color temperatures. An embodiment of the present disclosure may have 5 addressable LED channels. Each light engine may have multiple LEDs per light engine with multiple unique spectra under five channels of independent control. An embodiment may have 89 LEDs per light engine with 9 unique spectra under 5 channels of independent control.

The current disclosure may have a multi-stage two stage mixing chamber with diffuser apertures. An embodiment may have a two stage mixing chamber with diffuser apertures for color and light mixing such that any LED on PCBA uniformly illuminates arbitrarily sized glazing diffuser. The size may be triangular and the like.

Cost minimization in the current disclosure may be facilitated by using LEDs without regard to constraints on LED luminous flux and peak luminance when used at input to a two stage light mixing chamber configuration.

Figure 14:
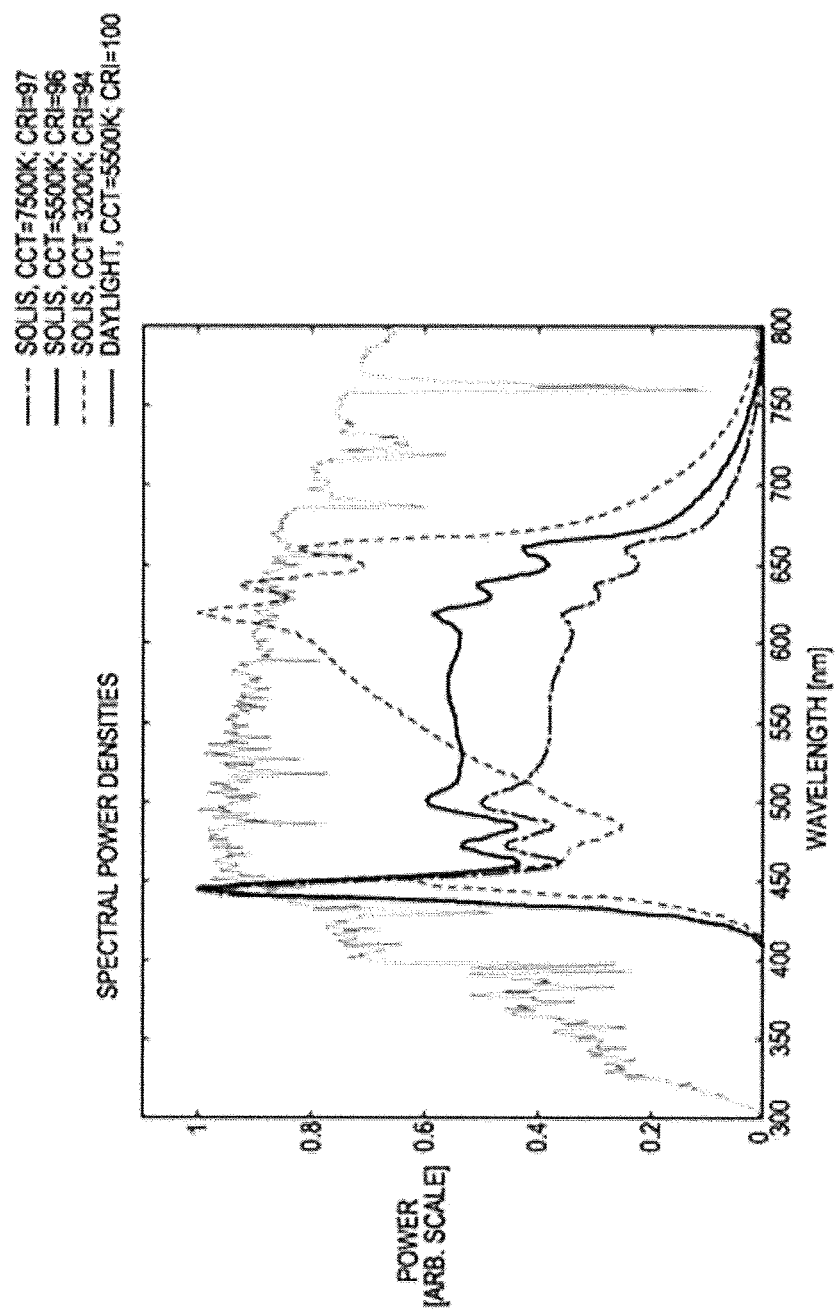
FIG. 14 illustrates an example of the power density over a spectrum for a multi-channel light engine.

FIG. 14 illustrates an example of the power density over a spectrum for a multi-channel light engine, according to embodiments of the claimed system. FIG. 14 illustrates simulated spectral output of a natural daylight emulating luminaire according to embodiments of the current application with reference to terrestrial daylight spectrum and shows plots of spectral power density vs. wavelength for daylight and three different emission spectra.

Various light sources that emit various spectra may be simultaneously operated to simulate a desired spectrum.

Adjustment of individual light levels is achieved through pulse width modulation (PWM), pulse amplitude modulation (PAM) or a combination of both PWM and PAM of the LED current or voltage. PWM dimming involves reduction of pulse width, thereby reducing the duty cycle of the activation pulses. Activation pulses after PWM dimming have the same amplitude (current or voltage), but have a reduced width. Therefore, the PWM dimming waveform has a lower applied current or voltage. However, the peak current/voltage is unchanged. PWM dimming may result in occupant detection of stroboscopic effects and flicker.

PAM may also be used for dimming. PAM reduces the amplitude (current or voltage) of the waveform when dimming, but keeps the same average pulse width.

A combined PWM and PAM dimming would decrease both the pulse width and the pulse amplitude (current or voltage) while dimming.

Please note that increasing illumination would encompass increasing pulse width of the waveform, PWM, or increasing pulse amplitude (current or voltage), PAM or both increasing the pulse width and the pulse amplitude.

In one embodiment, dimming of light levels of multiple LED channels with unique emission spectra results in a shift in color coordinates and correlated color temperature.

Analog dimming is another method known by those in the art to dim individual light levels and is effected through changing the current level continuously such that both average and peak current change as a function of time. Analog dimming methods result in LED emission spectra changes.

There are two pathways to the visual perception of flicker. Flicker can be perceived directly if the frequency is low enough (below 100 Hz). Even at frequencies where flicker cannot be directly perceived, it can be perceived indirectly through stroboscopic effects, sometimes called phantom arrays or wagon-wheel effects.

In addition to frequency and duty cycle, perception of flicker is also affected by modulation depth, or the range of light output between the high/on and low/off levels in a flickering light waveform. Use of complete modulation depths between on and off states has the highest frequency threshold for occupant detection (Bullough J. D., K. Sweater Hickcox, T. R. Klein, and N. Narendran. 2011: "Effects of flicker characteristics from solid-state lighting on detection, acceptability and comfort," Lighting Research and Technology 43(3): 337-348). Bullough et al. also report that stroboscopic effect detection occurred for PWM frequencies from <1 Hz to 10,000 Hz. The frequency threshold for user acceptability was lower at about 1,000 Hz.

The range of human hearing extends from approximately 20 Hz to 20,000 Hz. PWM dimming methods can result in circuit components vibrations at the same frequency, resulting in audible noise.

Emulation of natural daylight is desirably unaccompanied by flicker and stroboscopic effects detection and audible noise. In one embodiment, the light sources are modulated through PWM at frequencies higher than 10 kHz, and desirably above 20 kHz, and preferably above 25 kHz. Methods to modulate LEDs at frequencies above 25 kHz are known to those in the art.

An embodiment of the disclosure utilizes the building cooling system to dump heat generated by the daylight emulating light fixture, such as is achieved through direct physical contact or through an opening in cooling ducts such that air with a temperature below that of the fixture is directed onto the fixture. An embodiment utilizes apertures not visible to the building occupant which allow the passage of air from the light well into the plenum or area above the ceiling such that air with an elevated temperature does not collect in the light well and function to frustrate passive convective cooling of the daylight emulation light fixture. Outlets may be included at the top of the fixture, and inlets may be included at the bottom of the fixture. Such elements would be designed to facilitate natural air flow using methods well known to those versed in the art.

An embodiment of the disclosure utilizes at least one electrically powered fan configured specific to the daylight emulating fixture to affect active convection of thermal energy away from the fixture. An alternative embodiment includes a heat sink with fins to facilitate heat transfer through passive or active convection. An alternative embodiment includes heat pipes in the light walls or above the glazing to move thermal energy to other heat dissipating components to reduce operating temperatures of the light sources. Such elements would be designed to facilitate heat transfer using methods well known to those versed in the art.

The current disclosure may include a thermal assembly subset as illustrated in FIG. 13. The thermal assembly may include a plurality of speed controlled fans (2604) in a closed system control with thermistors mounted on the light engine PCBA (2610), a thermal interface material between the PCBA and heat sink (2608), and an FR-4 PCB with high heat elements in front of a heat sink (2608). An embodiment may include two speed controlled fans. LEDs and drivers may be place to minimize component failure and thermal de-rating of luminous flux, which may be achieved through minimizing temperature differences across a printed circuit board. The printed circuit board may be a 31 mil thick FR-4 polymer board with array of 0.01 inch diameter unfilled thermal vias at 0.025 inch centers.

An embodiment of the disclosure utilizes visually pronounced elements in or above the light well included to establish the illusion of a distance greater than actually exists within the light well. For example, two dimension representations of three dimensional objects or views typically include graded colorations, shadows and shading, and boundaries representing three dimensional parallel directions represented as non-parallel lines. Such elements provide for an expanded illusion of greater depth, and several means to achieve such effects are well known to those versed in the art.

The methods and systems may further include providing a communication facility of the lighting system, wherein the lighting system responds to data from an exterior source, such as communicated by a wireless or wired signal. In some embodiments the signal source may include a sensor for sensing an environmental condition, and the control of the lighting system is in response to the environmental condition. The sensor may be placed far from the daylight emulation fixture, at a distance substantially farther away from the center of the daylight emulation fixture than the largest dimension of the light well. One sensor may provide controlling inputs for more than one daylight emulation fixture. In some embodiments the signal source may be from a pre-set lighting program.

Figure 15:
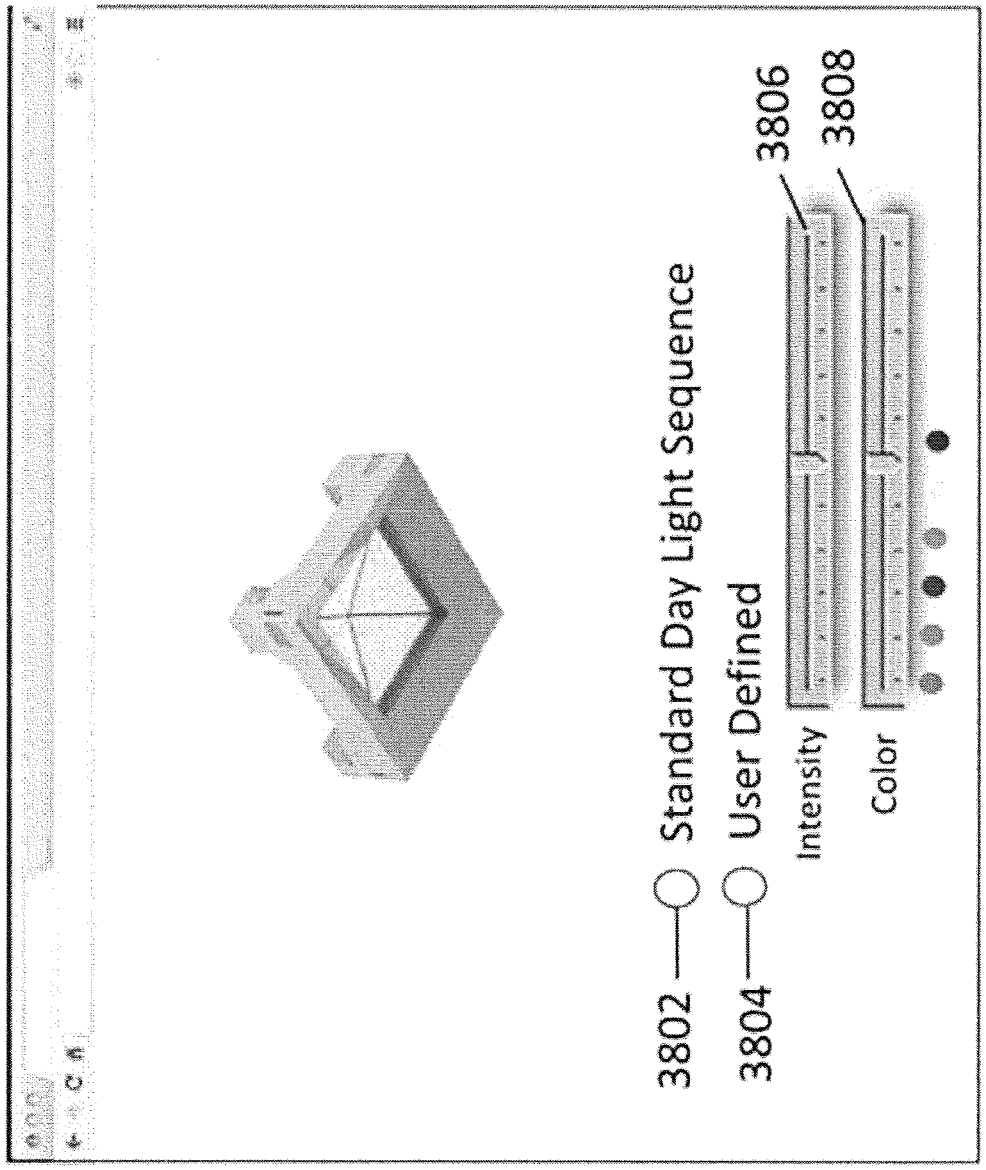
FIG. 15 illustrates a graphical user interface (GUI) according to an embodiment of the present application.

The current disclosure may have multiple light engines. An embodiment may have four light engines, a controller, and an interface to a web-based graphical user interface (GUI). FIG. 15 illustrates a GUI according to embodiments of the current disclosure. The GUI may include a standard day light sequence selection button (3802), a user defined sequence selection button (3804), and the like. The user defined sequence selection button (3804) may include an intensity selector slider bar (3806), a color selector slider bar (3808), and the like. The GUI may also include a group selection bar (4002), an exterior conditions selector button (4004), regional day light sequence selector button (4006), standard day light sequence selector button (4008), static selector button (4010) and the like. The GUI may be password protected. One of the light engines may be the master light engine that sends and/or received signals to a controller. The other three light engines may be slave light engines that send and/or report to the master light engine. The controller may have the capability of relaying a signal via a communication protocol for the GUI to interpret and display an interface used by a user to control the current disclosure. Communication protocols may be wireless communication protocols or wired communication protocols. Wireless communication protocols may include Wi-Fi, wi-max, 3G, LTE, and the like. Wired communication protocols may include Ethernet, other Internet Protocol (IP) communication protocols, and the like.

Referring still to FIG. 15, the GUI may be password protected. One of the light engines may be the master light engine that sends and/or receives signals to a controller. The other light engines may be slave light engines that send and/or report to the master light engine. An embodiment may have three slave light engines. The controller may have the capability of relaying a signal via a communication protocol for the GUI to interpret and display an interface used by a user to control the current disclosure. Communication protocols may be wireless communication protocols or wired communication protocols. Wireless communication protocols may include Wi-Fi, wi-max, 3G, LTE, and the like. Wired communication protocols may include Ethernet, other Internet Protocol (IP) communication protocols, and the like.

Upon system initiation and start-up, the current disclosure may execute a standard sequence of illumination configurations. The standard sequence of illumination configurations may autonomously run on the current disclosure until a command is received to alter or modify the standard sequence. A command received to alter or modify the standard sequence may be propagated to other skylight emulation systems as described by the current disclosure which are within the same room. Embodiments may allow for the monitoring of the light color in real-time to correct for differential LED degradation. Channel settings may be based on real-time sky conditions.

In embodiments of the current disclosure, the light engine PCBA (2610) may receive a signal by DMX (0-255), serial (3 digit hex), digital addressable lighting interface (DALI), 0-10V dimming, and the like. In embodiments the skylight luminaire may respond to command within at least one second.

The current disclosure may include a master server unit. The master server unit may host webpage and the main GUI. The master server unit may communicate with the skylight luminaires via a communication protocol. Communication protocols may be wireless communication protocols or wired communication protocols. Wireless communication protocols may include Wi-Fi, wi-max, 3G, LTE, and the like. Wired communication protocols may include Ethernet, other Internet Protocol (IP) communication protocols, and the like.

Multiple skylight luminaries may be grouped together and controlled simultaneously. Commands may be modified among skylight luminaries to account for differing spatial orientation.

Artificial lighting system 100 may be configured to provide an additional imagery effect 112 to a lighting effect. Imagery effect 112 may be selected from a group of images. Images may include a sky image, a cloud image, a landscaping image and the like.

Imagery effect 112 may be a static imagery effect, a dynamic imagery effect or a multi-skylight imagery effect. A multi-skylight effect may display movement across various skylights within a space. Imagery effect 112 may integrate static and dynamic transparent imagery. Static and dynamic transparent imagery may include cloud imagery, landscape imagery and the like. Imagery effect 112 may include lighting effects. Lighting effects may include color patterns, light show and the like. Imagery effect 112 may include night time lighting. Night time lighting may include simulating fireworks shows and a night time city environment, for example.

Artificial lighting system 100 may be configured to provide a display 160 of an effect. An effect may be selected from a group of effects. Effects may include a video effect, an animation effect, a color-changing effect, a light show effect, and indicator effect and the like.

Artificial lighting system 100 may be configured to provide a sound effect to a lighting effect. Sound effect may be configured to emulate the sound transmitted through at least one of a skylight and a window. Sound effect may be selected from a group of air, sound and scent effects 104. Sound effects may include a sound of crashing waves effect, a sound of wind effect, a sound of insects effect, a sound of a machine effect, a sound of music effect, a sound of communication effect and the like.

Artificial lighting system 100 may be configured to provide a feel effect in addition to a lighting effect. A feel effect may be configured to emulate a feeling transmitted through at least one of a window and a skylight. A feel effect may be selected from a group of feel effects. Feel effects may include a feeling of warmth that emulates from transmitted sunlight effect and a feeling of dynamic airflow effect. A feel effect may also be selected from a group of air, sound and scent effects 104.

Artificial lighting system 100 may be configured with a form factor that resembles an architectural feature. Form factor may be an architectural form factor. An architectural form factor may be a skylight architectural form factor, a window architectural form factor, a transom architectural form factor, a sliding door architectural form factor, a mirror architectural form factor and the like. A window architectural form factor may be a transom window architectural form factor, a paned window architectural form factor, a pane-less window architectural form factor and the like.

Artificial lighting system 100 may be configured in a form factor adapted to fit into the space of a standard ceiling tile and to create the appearance of a skylight. Form factor may have a configuration. A configuration may be a two-foot-by-two-foot configuration, a two-foot-by-four-foot configuration, a four-foot-by-four-foot configuration and the like. The form factor may be a standard configurable form factor. A standard configurable form factor may be a skylight feature form factor or a design form factor. A standard configurable form factor may be sized. A standard configurable form factor may be sized for ceiling tile replacement, sized for standard window replacement and sized to match standard features.

Standard features may be windows, for example. Form factor may be a custom form factor. Custom form factor may be light engines 122 behind architectural features or glass. Custom form factors may also be light engines 122 hidden behind glazed glass, placed in coves or niches and the like.

The desired form factor may be achieved through the use of a custom form factor kit 114. Custom form factor kit 114 may be a facility for forming a housing for light engines 122 that is configured for architectural features with which the Artificial lighting system 100 may be integrated. Architectural features with which the artificial lighting system 100 may be integrated may be selected from a group of architectural features with which the artificial lighting system 100 may be integrated. Architectural features with which the artificial lighting system 100 may be integrated may include a cove architectural feature, a recess architectural feature, a column architectural feature, a spandrel wall section architectural feature, a curtain wall section architectural feature, a clerestory architectural feature, a roof monitors architectural feature, a light well architectural feature, a translucent ceiling element architectural feature, barrel or arch vaulted ceiling architectural feature and the like. The facility for forming the housing of the custom form factor kit 114 may be an extrusion facility.

Figure 2A:
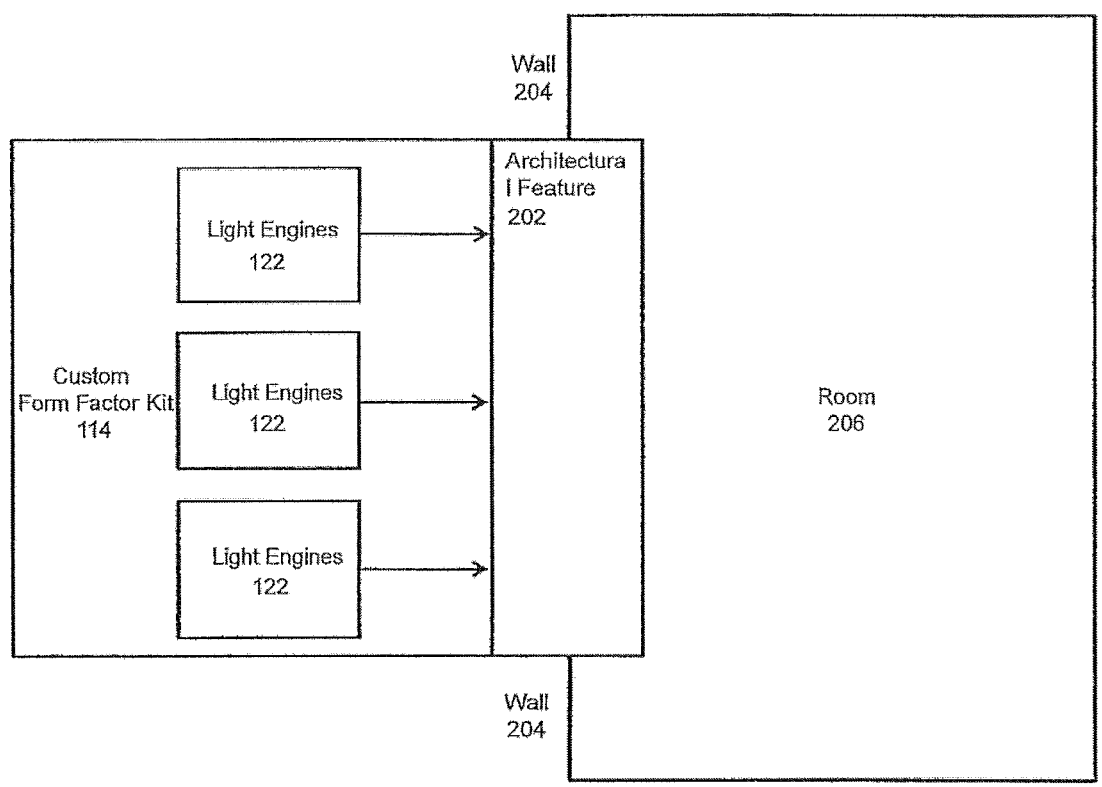
FIG. 2A is an illustration of one embodiment of a custom form factor kit with light engines behind an architectural feature.
Figure 2B:
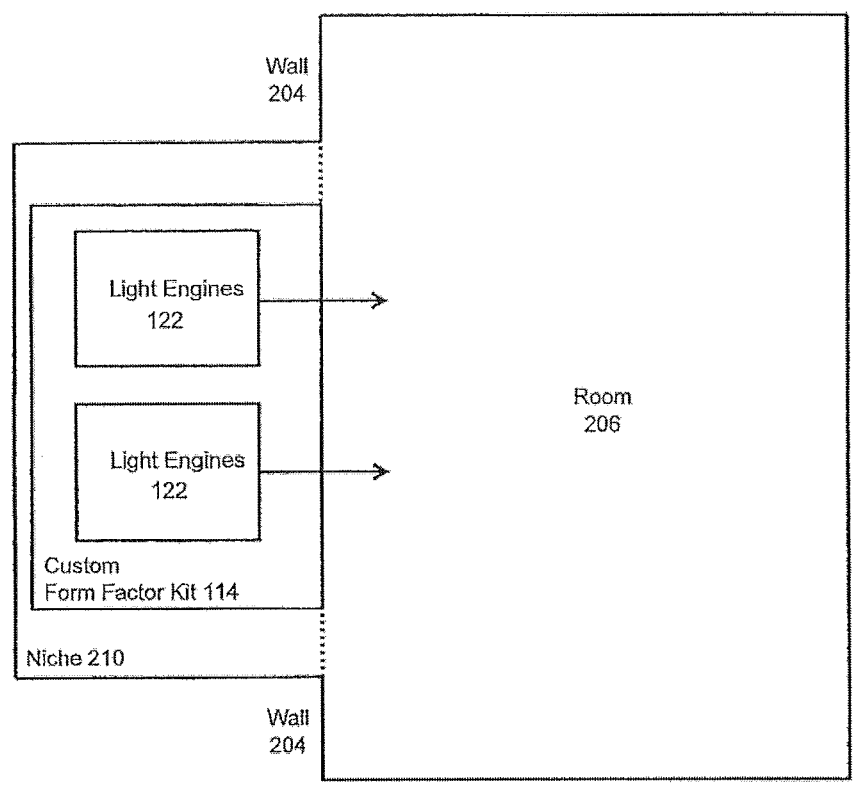
FIG. 2B is an illustration of one embodiment of a custom form factor kit with light engines in a niche.

FIG. 2A shows one embodiment of a custom form factor kit 114 with light engines 122 behind an architectural feature 202. Architectural feature 202 is shown embedded in wall 204 of a room 206. FIG. 2B shows one embodiment of a custom form factor kit 208 with light engines 122 in a niche 210. Niche 210 is shown embedded in wall 204 of a room 206.

Figure 3:
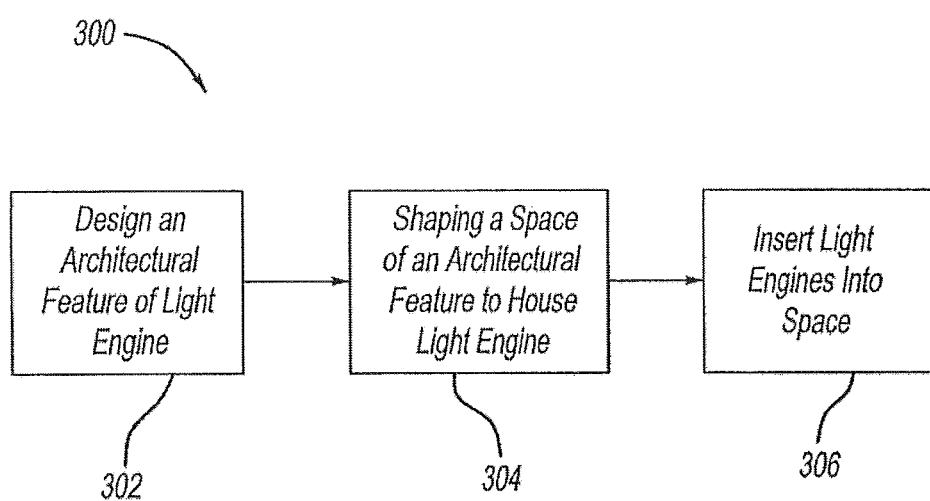
FIG. 3 is an illustration of a method for designing a configuration for an exemplar housing of an artificial light.
Figure 25:
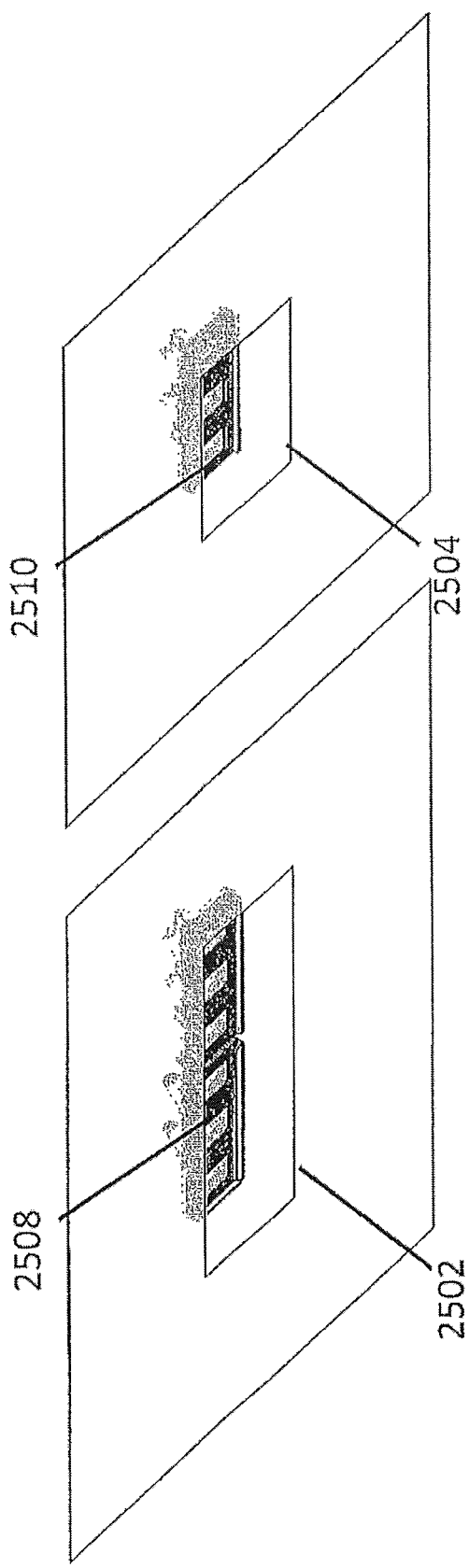
FIG. 25 illustrates an architectural feature shaped to conform to the dimensions of a daylight emulation system.

FIG. 3 shows a method 300 for designing a configuration for a housing of an artificial lighting system 100. The method 300 for designing a configuration for a housing of an artificial lighting system 100 may include designing an architectural feature 302, shaping of the architectural feature to house the light engines 304 and inserting the light engines into a space 306. FIG. 25 illustrates two architectural features 2502, 2504, consisting of two different openings that correspond to overhead windows of different dimensions. In embodiments, each feature 2502, 2404 can be shaped around a system 100, such as the double system 2508 around which the feature 2502 is shaped or the single system 2510 around which the feature 2504 is shaped. In embodiments, the opening of such a feature 2502, 2504 may be covered with diffuse translucent glazing material, behind which may reside arrayed systems 2508, 2510, including fixtures and light engines, which may be controlled in a coordinated fashion. The number of units in such an array may correspond to the dimensions of the architectural feature 2502, 2504. Similar shaping may occur for systems 100 that are designed to be placed in alcoves, above partial walls, behind columns or similar features, or in or within a wide range of other architecture features.

Figure 26:
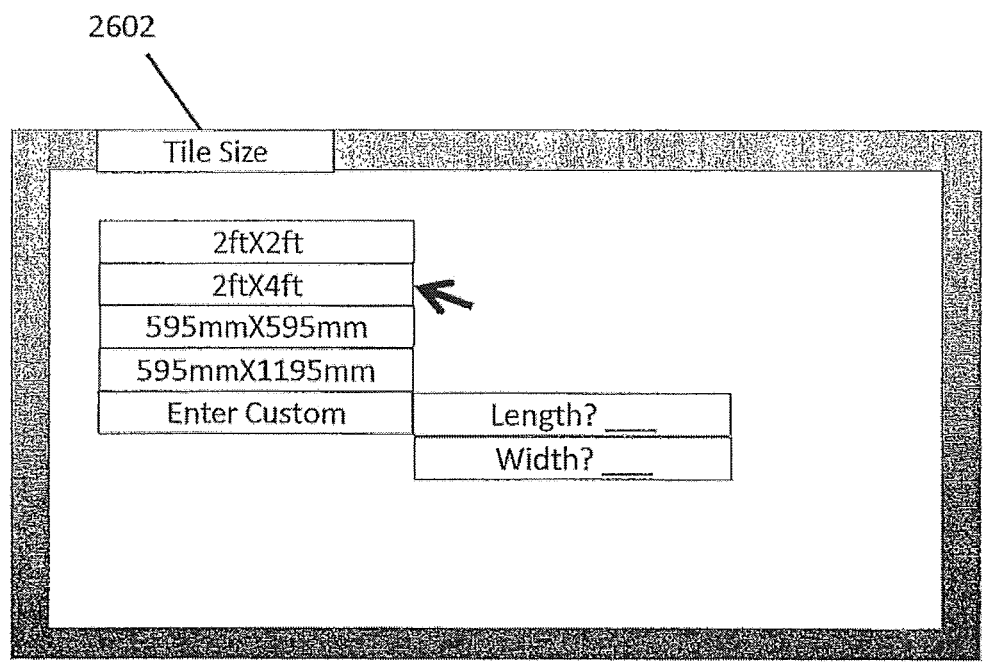
FIG. 26 illustrates a user interface for selecting or entering parameters of a daylight emulation system in connection with the design of such a system.

In embodiments, methods and systems are provided wherein an option in the design process involves choosing among several standard ceiling tile dimensions. Referring to FIG. 26, a user may be prompted, such as by a user interface element 2602, such as a drop-down menu, to select among standard dimensions for a ceiling tile, or to enter a custom dimension if needed. Similar menus may be provided to enable selection and entry of design specifications for other dimensions, such as width, height and length of windows, skylights, and other features as described throughout this disclosure. In embodiments, such a user interface for a design process may allow a user to select other parameters of a lighting system 100, such as selecting what content that will be available for display on the system 100, what modes of operation are to be made available to a user through the user interface of the lighting system 100 (e.g., a "wake me up" mode or a "calm me down" mode, which, if selected, provide appropriate lighting and display conditions based on an understood biological effect), and the like.

In embodiments, methods and systems are provided wherein a plurality of light engines may be configured for integration with a vertically oriented architectural member, such as a clerestory window or curtain wall, where temporal changes spanning seconds are propagated across the engines to approximate the visual display of external moving objects across the array, such as moving people, vehicles, shadows, headlights, or the like. This propagation may be accomplished under control of the control system 138, which may access a library of content, such as a display content database 154, for one or more data structures that correspond to desired effects, such as a moving vehicle effect, a moving person effect, a moving shadow effect, or the like.

In embodiments, methods and systems are provided wherein the design process is for one or more fixtures embodied as lighting systems 100 in relationship to a library of architectural materials with known optical properties. For example, reflective properties of ceiling materials, wall materials, floor materials, paints, carpets, cabinets, furniture, fixtures and the like may be characterized, so that the impact of illumination from a system 100 may be understood, such as to provide an overall desired level of illumination. For example, in very bright outside conditions, illumination delivered to a highly reflective, bright indoor environment might be tuned downward, rather than strictly emulating outside conditions, to avoid an undesirable level of brightness. Similarly, an environment with dark colors and non-reflective materials might be illuminated more brightly than required by strict emulation of outside daylight, to allow meeting the personal desires of the user(s) of the space.

In embodiments, methods and systems are provided wherein a defined architectural material with known optical properties is used, such that light colorimetrics and photometrics are specifically calibrated for the material. In embodiments, multiple such calibrations may be stored within a library that can be accessed by the control system 138, such as to allow selection of an illumination control regime for the system 100 that is at least in part based on a property of the chosen architectural material.

In embodiments, the color gamut and CRI for a given solution may be made selectable during the design process in accordance with a desired use or the needs of a particular solution. An expanded high intensity high color temperature, for instance, would have higher impact on circadian rhythm synchronization, if that is required for a given situation.

In embodiment involving the emulation of heat (such as would be experienced as a result of solar radiation in a real window or skylight), the radiant heat to be delivered by a system 100 may be set during a design process. For example, the peak radiant heat source power levels for a heater 107 may be set during the design process, in concert with a user selecting a glass, coating, glazing material, or other material having a known heat conduction coefficient, gain coefficient or the like. These factors may be arranged in the design process to deliver desired levels of warmth. When coupled with information about geographical location, stored information from the design process may be used to help select the power levels, such as to deliver heat levels that emulate typical heat transmission for that location (or some other desired profile of heat, such as a reduced heat level in hot climates or an increased heat level in cold An embodiment of the disclosure utilizes a ledge and a light well to visually obscure a light source configured to emulate sunlight such that direct observation of the light sources is not possible by a building user aside from during installation and maintenance. Since direct light sources illuminated upon opposing light wall faces are configured to create non-uniform areas of light and not principally to directly illuminate working surfaces, ledges function to frustrate direct line of sight visibility of those light sources. In various embodiments, the ledge is configured at the top, bottom, or middle area of the light well height dimension.

An embodiment of the disclosure utilizes a light well with a light source configured to emulate sunlight that is dependent on time of day, time of year, emulator orientation, longitude, and latitude. Orientation is a controlling signal for the light sources and is input during the installation of the unit through the use of an analog or digital compass. In another embodiment, installation and setup is facilitated by incorporating orientation awareness via a signal generated by a digital compass within the daylight emulating fixture.

An archetypical horizontally oriented window or skylight of the prior art is schematically represented in FIG. 6. A skylight (1) is formed by a glazed opening in a roof to admit light. The skylight frame (1a) is the structural frame supporting the glazing of the skylight. It includes the condensation gutters and the seals and gaskets necessary for its installation. The glazing (1b) is the glass or plastic lenses used as to cover the skylight opening. The skylight-curb connection (1c) is the interface between the skylight frame and the rooftop curb. It includes all accessories required for the proper attachment of the skylight, such as fasteners, and flashing.

Typical glazing materials for skylights include a variety of plastics and glass. Typical common plastic materials include acrylics, polycarbonates, and fiberglass and may be utilized with a range of transmission colorations, including clear and translucent white, bronze, and gray. Typical skylight glazing spans a variety of shapes including flat, angled, or in a faceted framing system that assumes various pyramid shapes. Plastic glazing is also typically shaped in molded dome or pyramid shapes for greater stiffness.

The light well is composed of two components, the throat (2) and the splay (3). They both serve as conveyances of daylight from the skylight into the interior space. They bring the light through the roof and ceiling structure, and they simultaneously provide a means for controlling the incoming daylight before it enters the main space. A light well is similar to the housing of an electric light fixture. It is designed to distribute the light and to shield the viewer from an overly bright light source.

The throat (2) is the tubular component (can be rectangular or circular in section) connecting the skylight to the splay. In the absence of a splay, it is attached directly to the ceiling plane. It is comprised of a throat attachment to structure (2a), which is the interface between the throat (2) and the building structure. This attachment holds up the throat (2) by providing support. The throat interconnector (2b) attaches two pieces of throat material (e.g. gypsum board, acoustic tile, or sheet metal tubes) together. It may be a rigid connection, or an adjustable component that allows for vertical, horizontal or angular displacement of the throat (2). A throat structural support (2c) provides lateral and seismic stability. It may be a rigid brace, hanger wire or other alternative types of support system. The deeper a light well is relative to its width, the less light is transmitted. The inside surface of the throat (2) is typically a reflective material, like white paint that would enhance the light that enters the light well.

A splay (3) is the oblique transitional component of the light well that starts at the bottom of the throat and connects to the ceiling. The use of a splay (3) will provide better light distribution into the interior space. The splay-throat connector (3a) attaches the splay (3) to the throat (3). It can be a simple attachment or it can incorporate an adjustable assembly that allows for horizontal, vertical or angular displacements. The splay interconnector (3b) joins two pieces of splay material (e.g. gypsum board, acoustic tile or sheet metal tubes). It may be a rigid member or an adjustable component that allows for horizontal, vertical or angular displacements. The splay structural support (3c) provides lateral and seismic stability for the splay (3). It may be a rigid brace, hanger wire or other alternative types of support system. Light wells can be designed in a wide variety of shapes. The simplest are vertical-sided shafts, the same size as the skylight opening. More elaborate wells have splayed or sloping sides that spread the light more broadly through the space. Typical angles of splay are 45 degrees-60 degrees. In designs where ceiling tiles are used for splays, the opening is typically multiples of 2' or 4' to correspond to ceiling tile sizes, since this reduces the need for site cutting of ceiling tiles.

Light control devices are attachments to the light well that modulate the amount of daylight coming through the skylight. One or more devices can be used at the same time in a light well system, depending on the design requirements. Several types of light control devices are used, including louvers (4a), slanted metal slats attached to the throat that controls the amount of daylight coming through. They can be installed as an integral part of the skylight frame. Interior diffusers (4b) are any kind of glazing material installed within the light well that diffuses the light from the exterior into the interior. The most commonly used diffusers are prismatic acrylic lenses installed at the bottom of a skylight well. Suspended reflectors are lighting accessories made of reflective material installed at the bottom of the light well to diffuse daylight by bouncing it off the ceiling or splay (3). Baffles are opaque or translucent plate-like protective shields used against direct observation of a light source. Device connectors (4e) attach the light control devices onto the throat or splay, as their design requires.

A suspended ceiling (5) is a ceiling grid system supported by hanging it from the overhead structural framing. Runners (5a) are cold-rolled metal channels used to support ceiling tiles. Ceiling tiles (5b) are preformed ceiling panel composed of mineral fiber or similar material with desired acoustical and thermal properties, and a textured finish appearance. The ceiling-splay connector (5c) joins the splay to the ceiling. It can also serve as concealment for this junction.

Ceiling height is a major determinant of skylight spacing. Light distribution has to be even on the work plane. Work plane is typically measured at 30" above finished floor. The skylight spacing should be so that there are no dark spots on the work plane due to too much distance between skylights. Typical end to end spacing between two skylights is a dimension less than 1.4 times the ceiling height. Another spacing criterion between skylight centers of units with large splayed elements is 140% of ceiling height plus twice the distance of the lateral splay dimension plus the skylight light well lateral width.

FIG. 5 shows one embodiment of a natural light system employing a skylight assembly (3000) at the top of a neck (3d). A splay (3) opens to the ceiling (3006) having ceiling tiles (3008).

FIG. 10A shows an embodiment of a natural light lighting assembly as it appears installed in a ceiling.

Figure 16:
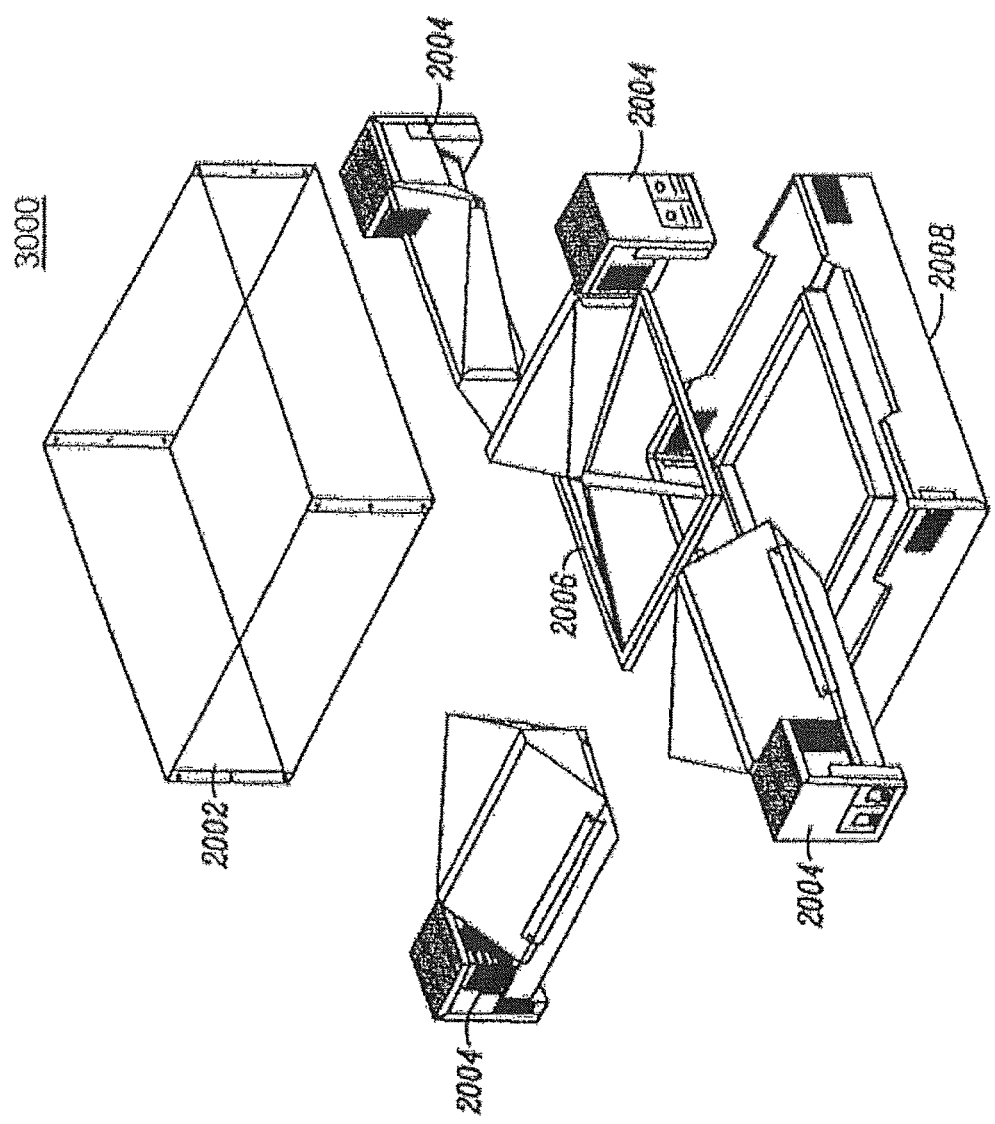
FIG. 16 illustrates an exploded top perspective view of an embodiment of a skylight assembly as viewed from above.
Figure 17:
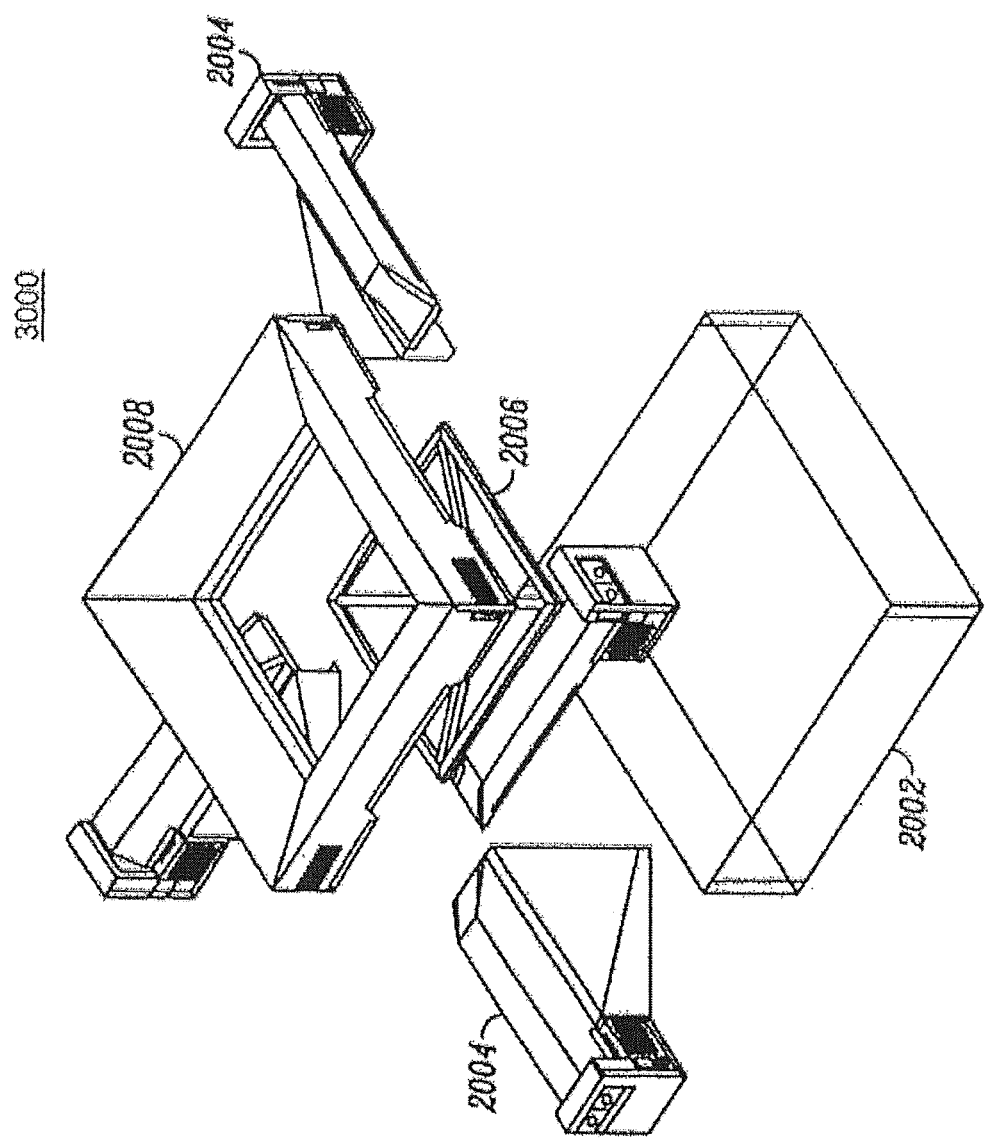
FIG. 17 illustrates an exploded top perspective view of an embodiment of a skylight assembly as viewed from below.

FIGS. 16 and 17 illustrate an exploded top isometric view of an embodiment of the skylight assembly (3000). The skylight assembly (3000) may include an optional gas-tight housing for environmental air compliance (2002), a plurality of light engines (2004) and light distribution assemblies (2010), a frame for glazing diffusers (2006), a splayed electrical housing (2008) and splayed light well (3002), and luminaire.

Figure 18:
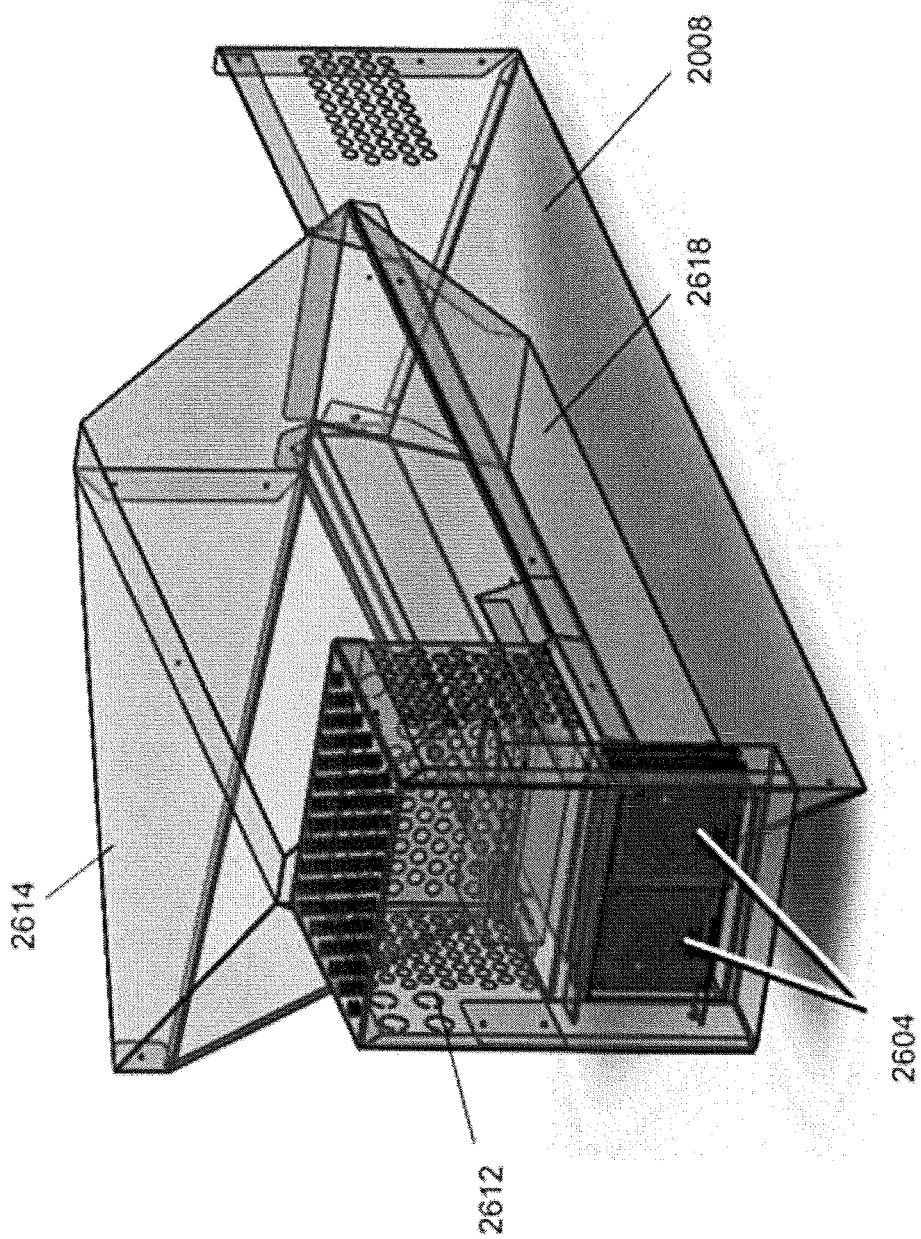
FIG. 18 illustrates a perspective view of the light distribution assembly.

FIG. 13 illustrates an exploded top view of an embodiment of a light engine (2004) and light distribution assembly (2010). FIG. 18 provides a different view of the light engine (2004) and light distribution assembly (2010). A light distribution assembly (2010) may include an electronics and fan housing (2602), a plurality of speed controlled fans (2604), a cover plate (2606), a heat sink (2608), LED and drivers light engine PCBA (2610), electronics housing (2612), secondary optical mixing chamber (2614), secondary optical diffuser (2616), primary optical mixing chamber (2618), primary diffuser (2620), and the like. The heat sink (2802) may be an aluminum finned heat sink, and the like.

Figure 19:
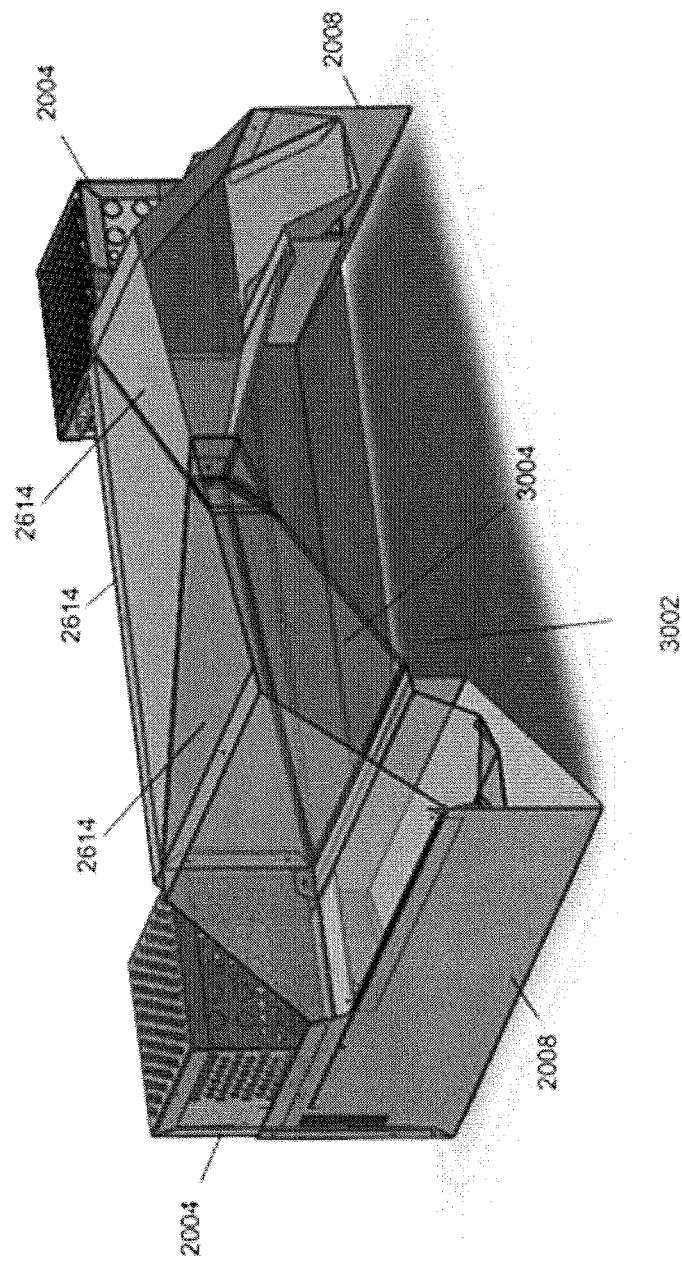
FIG. 19 is a perspective, partial sectional view of a skylight assembly.

FIG. 19 is a perspective, partial sectional view of a skylight assembly. The luminaire may include a splayed light well (3002) and pyramidal glazing (3004) with visible mullions. The splayed light well (3002) may be coated on the side visible to an observer standing below the splayed light well (3002) to match typical ceiling finished and may be available with several color and textile options. The splayed light well (3002) may be constructed of die cut and bent sheet metal and may be connected to the frame for glazing diffusers, light engines (2004) and light distribution assemblies (2010) and a secondary optical mixing chamber (2614).

Aspects and embodiments are directed to lighting fixtures, as well as devices for and methods of using them. Embodiments of light fixtures disclosed herein may provide significant advantages over existing devices, including higher efficiencies, fewer components, and improved materials, improved optical properties, and better color rendition, leading to several characteristic effects, including increased sales per square foot, higher employee productivity, shorter recovery times after surgical procedures, reduced employee absenteeism, and increased occupant satisfaction. These and other advantages will be recognized by the person of ordinary skill in the art, given the benefit of this disclosure.

It is to be appreciated that embodiments of the methods and apparatuses discussed herein are not limited in application to the details of construction and the arrangement of components set forth in the following description or illustrated in the accompanying drawings. The methods and apparatuses discussed herein are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Any references to embodiments or elements or acts of the systems and methods herein referred to in the singular may also embrace embodiments including a plurality of these elements, and any references in plural to any embodiment or element or act herein may also embrace embodiments including only a single element.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the various aspects and embodiments. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Additional features, aspects, examples and embodiments are possible and will be recognized by the person of ordinary skill in the art, given the benefit of this disclosure.

It is also to be appreciated that the phraseology and terminology used herein is for the purpose of description and should not be regarded as limiting. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, and upper and lower are intended for convenience of description, not to limit the present systems and methods or their components to any one positional or spatial orientation.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the device in addition to the orientation depicted in the figures. For example, if the device in the figures is turned over, structure or portion described as "above" other structures or portions would now be oriented "below" the other structures or portions. Likewise, if devices in the figures are rotated along an axis, structure or portion described as "above", other structures or portions would now be oriented "next to" or "left of" the other structures or portions. Like numbers refer to like elements throughout.

Some of the general features of embodiments are described below.

In embodiments, a general illumination area greater than that of typical light fixtures is produced.

In embodiments, a variable light spectrum is produced.

In embodiments described there is an advantage of being utilized in environments with or without natural light.

In embodiments, light parameters are calculated and emulated without the need to rely upon sensor or network input for this purpose.

In embodiments, no ducts linking the building internal and external environments are required to operate.

In embodiments, light is provided by a plurality of wide and narrow-band light sources. These can provide light of more than one target correlated color temperature which can be controlled to change as a function of time.

In embodiments, a light source with a spectral maximum in the ultraviolet or infrared wavelengths is not required, as is required by some prior art devices.

In embodiments, light is provided from a wide spatial area and is not intended to be a point source, as required by some prior art devices. The claimed system can also provide uniform lighting over the illuminated area, if desired.

Some prior art devices require minimizing differences between its actual output light spectra and a reference spectrum. However, in embodiments, this is not a requirement for operation.

In embodiments, widely spatially varying light is produced uniformly.

The claimed invention describes fixtures that are intended to be observed as opposed to hidden lighting of some prior art devices.

In embodiments, a secondary lens is not required.

Multiple, distinct light sources are employed in embodiments, and arranged to create areas of color and brightness uniformity on some surfaces and areas of substantial non-uniformity on other surfaces.

In embodiments, some of the light from the light sources may radiate directly to the observer without being reflected, due to the structure.

In embodiments, multiple light sources are employed that are capable of rendering various colors.

In embodiments, a change in input light spectra that results in an increased correlated color temperature results in an output light spectrum with a decreased correlated color temperature. In embodiments, a change in input light spectra that results in an increased correlated color temperature results in an output light spectrum with an unchanged correlated color temperature.

In embodiments, a change in input light spectra that results in a decreased correlated color temperature results in an output light spectrum with an increased correlated color temperature. In embodiments, a change in input light spectra that results in a decreased correlated color temperature results in an output light spectrum with an unchanged correlated color temperature.

In embodiments, a change in input light spectra that results in an unchanged correlated color temperature results in an output light spectrum with an increased correlated color temperature. In embodiments, a change in input light spectra that results in an unchanged correlated color temperature results in an output light spectrum with a decreased correlated color temperature.

In embodiments, there are no constraints placed on the relative dimensions of neither the light fixture nor scattering components relative to the room dimensions.

In embodiments, there are no constraints placed on absorptivity of components behind the light fixture emissive aperture.

Natural daylight emulation can be achieved in a number of arrangements where only a subset of features normally associated with daylight is typically present. For instance, emulation of the view of a detailed scene through a vertically oriented window requires the re-creation of a view of the detailed scene, but such is not required for horizontally oriented windows, roof windows, or skylights. Likewise, the total transmitted illumination through large area arrays of vertically or horizontally oriented windows would require high densities of artificial light sources, which may not be readily obscured from direct observation compared to arrangements of smaller areas of horizontally oriented windows.

An effective emulation of natural daylight requires the emulation of both sunlight and skylight, each of which have distinct physical properties, such as intensity, color, and the extent to which light is scattered, or diffused. The sun is considered a distant point source of light, often referred to as "beam" sunlight, because it is highly directional. Light from the sky, on the other hand, arrives from a large area and is more or less diffuse, meaning scattered and arriving from all directions. Beam light will cast a shadow; diffuse light will not cast a distinct shadow.

Sunlight is high intensity, generally providing 5,000 to 10,000 foot-candles of illumination. The intensity of sunlight varies with time of year and location on the planet. It is most intense at noon in the tropics when the sun is high overhead and at high altitudes in thin air, and least intense in the winter in the arctic, when the sun's light takes the longest path through the atmosphere. Sunlight also provides a relatively warm color of light varying in correlated color temperature (CCT) from a warm candlelight color at sunrise and sunset, about 2000° K, to a more neutral color at noon of about 5500° K. The correlated color temperature is the temperature of the Planckian (black body) radiator whose perceived color most closely resembles that of a given stimulus at the same brightness and under specified viewing conditions.

Skylight includes the light from both clear blue and cloudy skies. The brightness of cloudy skies depends largely on how thick the clouds are. A light ocean mist can be extremely bright, at 8,000 foot-candles, while clouds on a stormy day can almost blacken the sky. The daylight on a day with complete cloud cover tends to create a very uniform lighting condition. Skylight from clear blue skies is non-uniform. It is darkest at 90° opposite the sun's location, and brightest around the sun. It also has a blue hue, and is characterized as a cool color temperature of up to 10,000° K. Skylight from cloudy skies is warmer in color, a blend somewhere between sunlight and clear blue skies, with correlated color temperatures of approximately 7,500° K.

The overcast sky is the most uniform type of sky condition and generally tends to change more slowly than the other types. It is defined as being a sky in which at least 80% of the sky dome is obscured by clouds. The overcast sky has a general luminance distribution that is about three times brighter at the zenith than at the horizon. The illumination produced by the overcast sky on the earth's surface may vary from several hundred foot-candles to several thousand, depending on the density of the clouds. The clear sky is less bright than the overcast sky and tends to be brighter at the horizon than at the zenith. It tends to be fairly stable in the luminance except for the area surrounding the sun which changes as the sun moves. The clear sky is defined as being a sky in which no more than 30% of the sky dome is obscured by clouds. The total level of illumination produced by a clear sky varies constantly but slowly throughout the day. The illumination levels produced can range from 5,000 to 12,000 foot-candles. The cloudy sky is defined as having cloud cover between 30% and 80% of the sky dome. It usually includes widely varying luminance from one area of the sky to another and may change rapidly.

The majority of commercial and industrial skylights are installed on flat roofs, where the skylight receives direct exposure to almost the full hemisphere of the sky. Typically, there are also few obstructions to block sunlight from reaching the skylight. A skylight on a sloped roof does not receive direct exposure to the full sky hemisphere, but only a partial exposure determined by roof. The sun may not reach the skylight during certain times of the day or year, depending upon the angle and orientation of the sloped roof. For example, a skylight on an east-facing roof with a 45° slope will only receive direct sun during the morning and midday hours. In the afternoon it will receive skylight, but only from three-fourths of the sky. As a result, in the afternoon it will deliver substantially less light to the space below than an identical skylight located on a flat roof.

The shape of a skylight also affects how much daylight it can provide at different times of the day, although these effects tend to be much more subtle than building geometry. For example, a flat-glazed skylight on a flat roof will intercept very little sunlight when the sun is very low in the early morning and at the end of the day. However, a skylight with angled sides, whether a bubble, pyramid, or other raised shape, can intercept substantially more sunlight at these critical low angles, increasing the illumination delivered below by five to 10 percent at the start and end of the day.

The correlated color temperature and chromaticity of both skylight and sunlight is dependent on several factors, including year, day of year, time of day, latitude, longitude, altitude tilt, azimuth, and local cloud cover.

Figure 27:
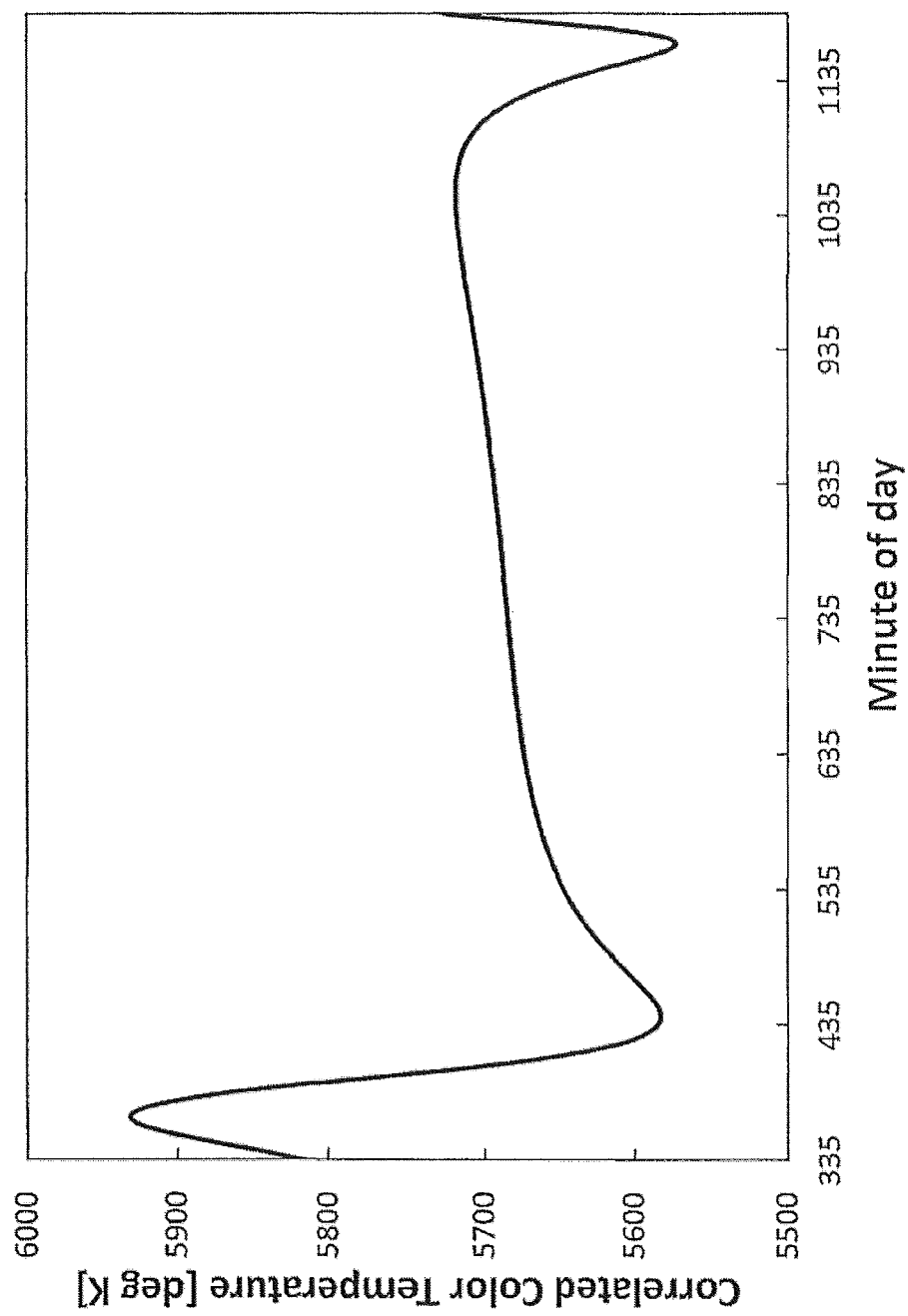
FIG. 27 is an example of variation in photometric parameters for a component of natural daylight.

FIG. 27 illustrates the correlated color temperature of diffuse skylight as a function of time of day on Jun. 21, 2014 at latitude 33.75 degrees and longitude 84.42 degrees West at 225 degrees azimuth (degrees from north increasing eastward) at 40 degree altitude tilt where it varies by several hundred degrees Kelvin.

Figure 28:
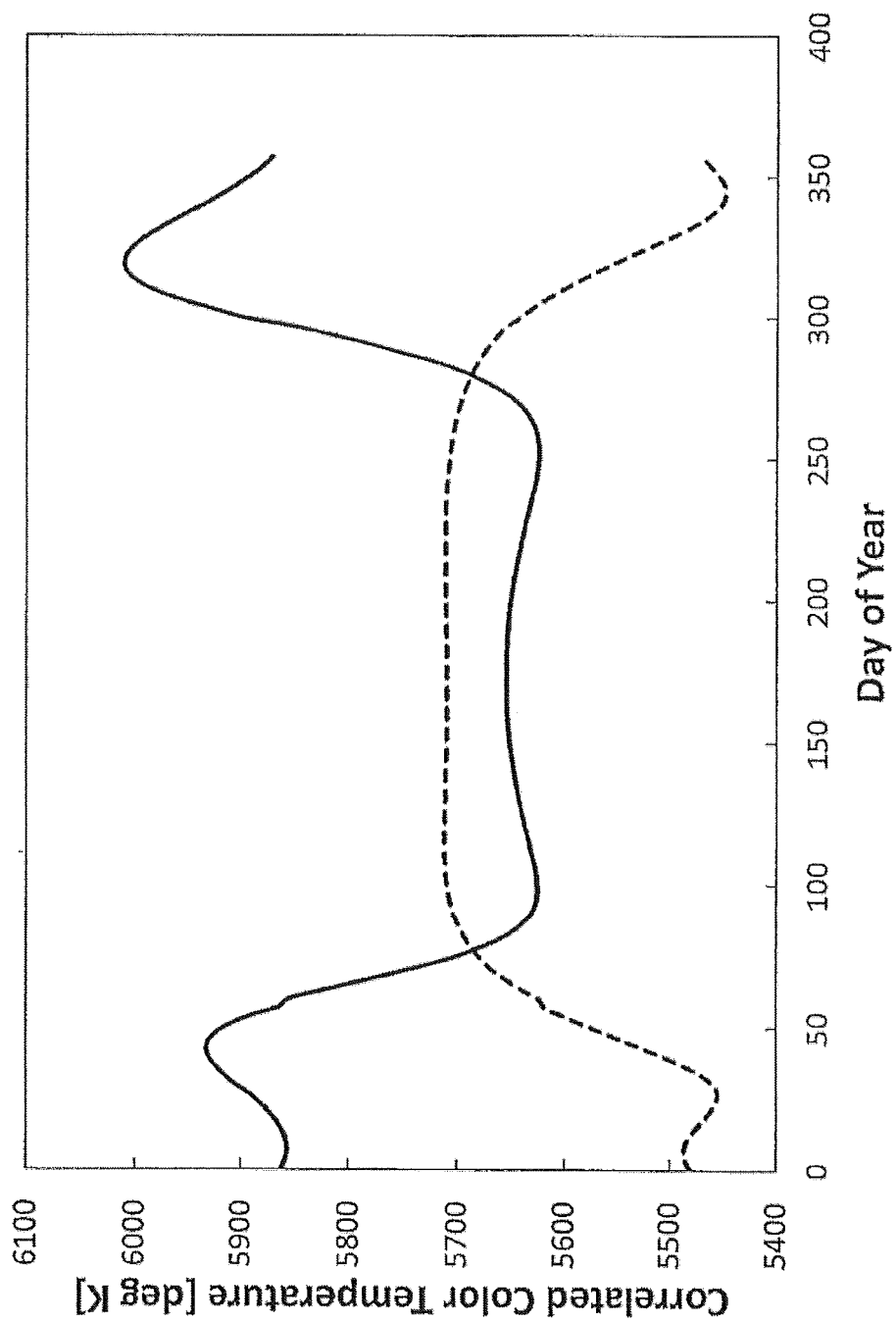
FIG. 28 is an example of variation in photometric parameters for a component of natural daylight.

FIG. 28 illustrates the correlated color temperature of diffuse skylight as a function of day of year at 8:00 at latitude 33.75 degrees and longitude 84.42 degrees West at 315 degrees (line) and 135 degrees (dotted) azimuth (degrees from north increasing eastward) at 40 degree altitude tilt where it varies by several hundred degrees Kelvin.

Figure 29:
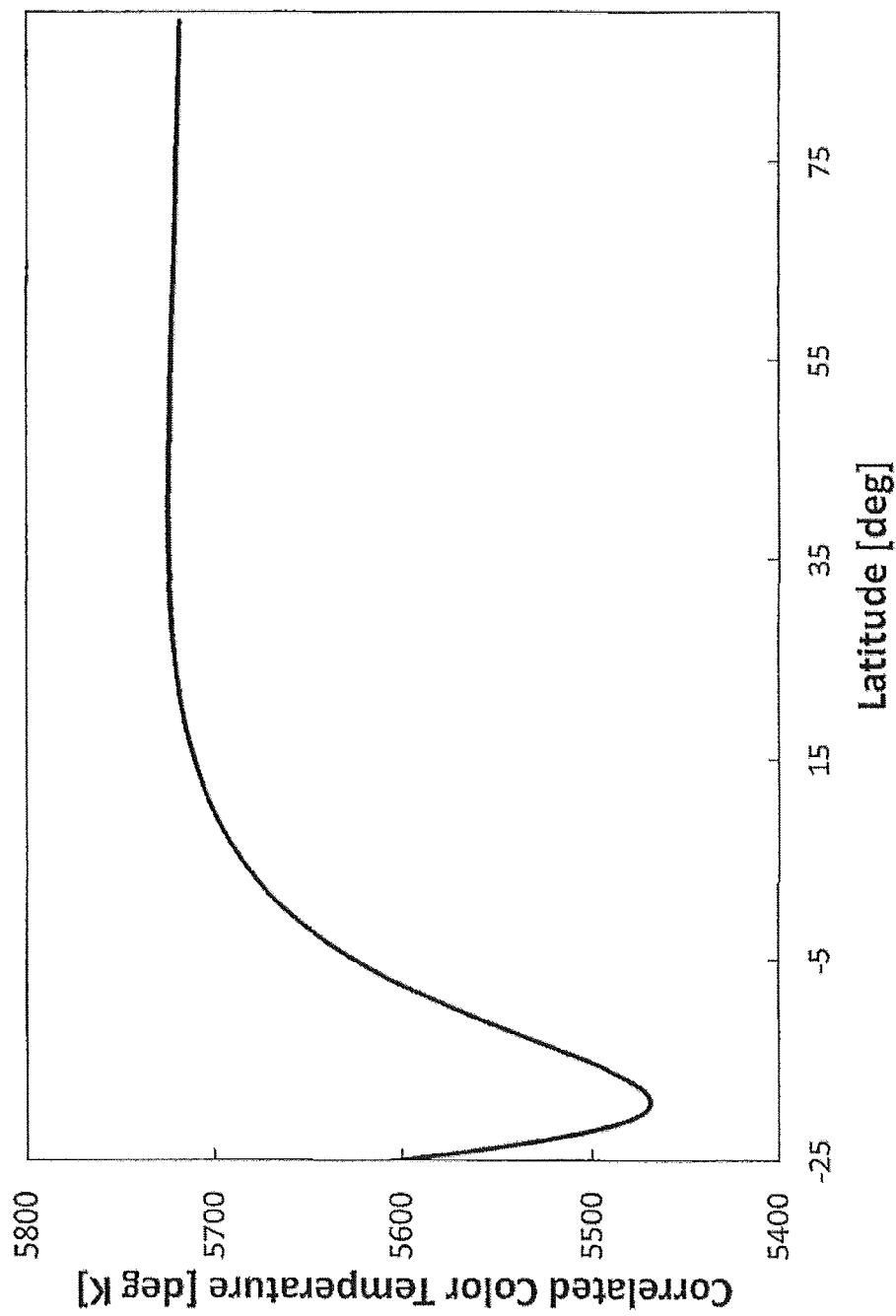
FIG. 29 is an example of variation in photometric parameters for a component of natural daylight.

FIG. 29 illustrates the correlated color temperature of diffuse skylight as a function of latitude at 7:30 on Jun. 21, 2014 at longitude 84.42 degrees West and 45 degrees azimuth (degrees from north increasing eastward) at 40 degree altitude tilt where it varies by several hundred degrees Kelvin.

Figure 30:
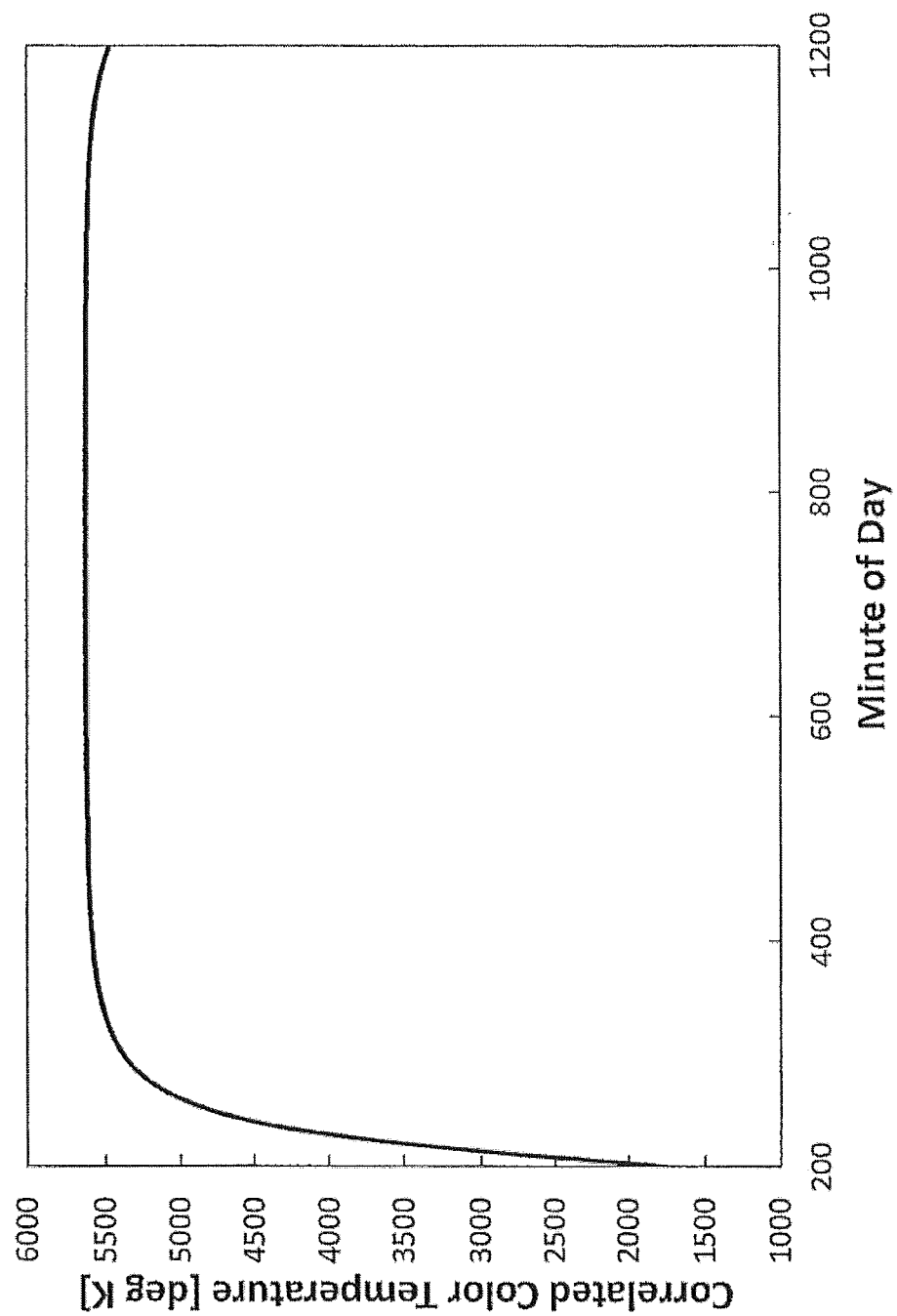
FIG. 30 is an example of variation in photometric parameters for a component of natural daylight.

FIG. 30 illustrates the correlated color temperature of direct sunlight as a function of time of day on Jun. 21, 2014 at longitude 84.42 degrees West at 225 degrees azimuth (degrees from north increasing eastward) where it varies by several thousand degrees Kelvin.

Figure 31:
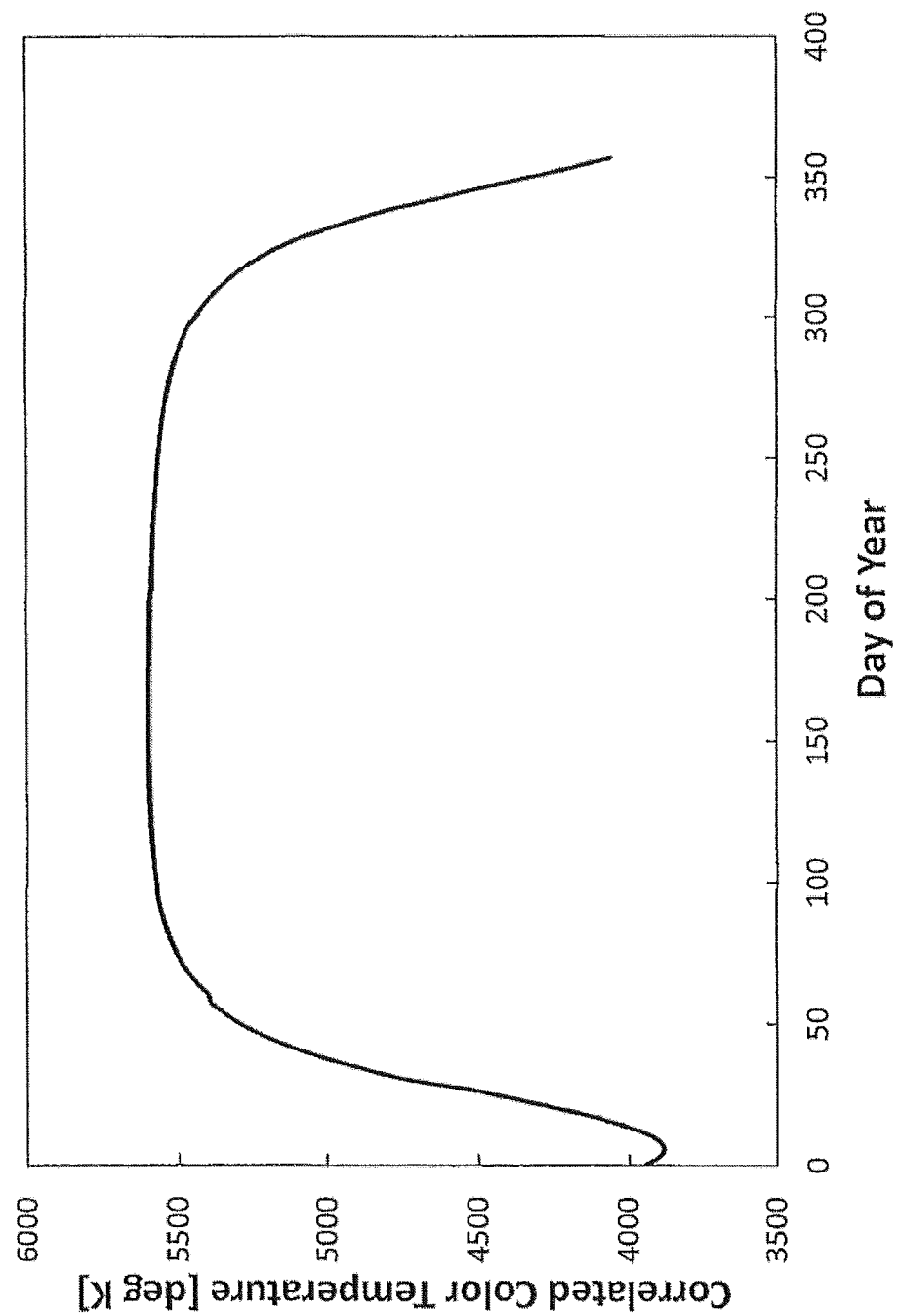
FIG. 31 is an example of variation in photometric parameters for a component of natural daylight.

FIG. 31 illustrates the correlated color temperature of direct sunlight as a function of day of year at 8:00 at latitude 33.75 degrees and longitude 84.42 degrees West and 225 degrees azimuth (degrees from north increasing eastward) where it varies by several thousand degrees Kelvin.

Figure 32:
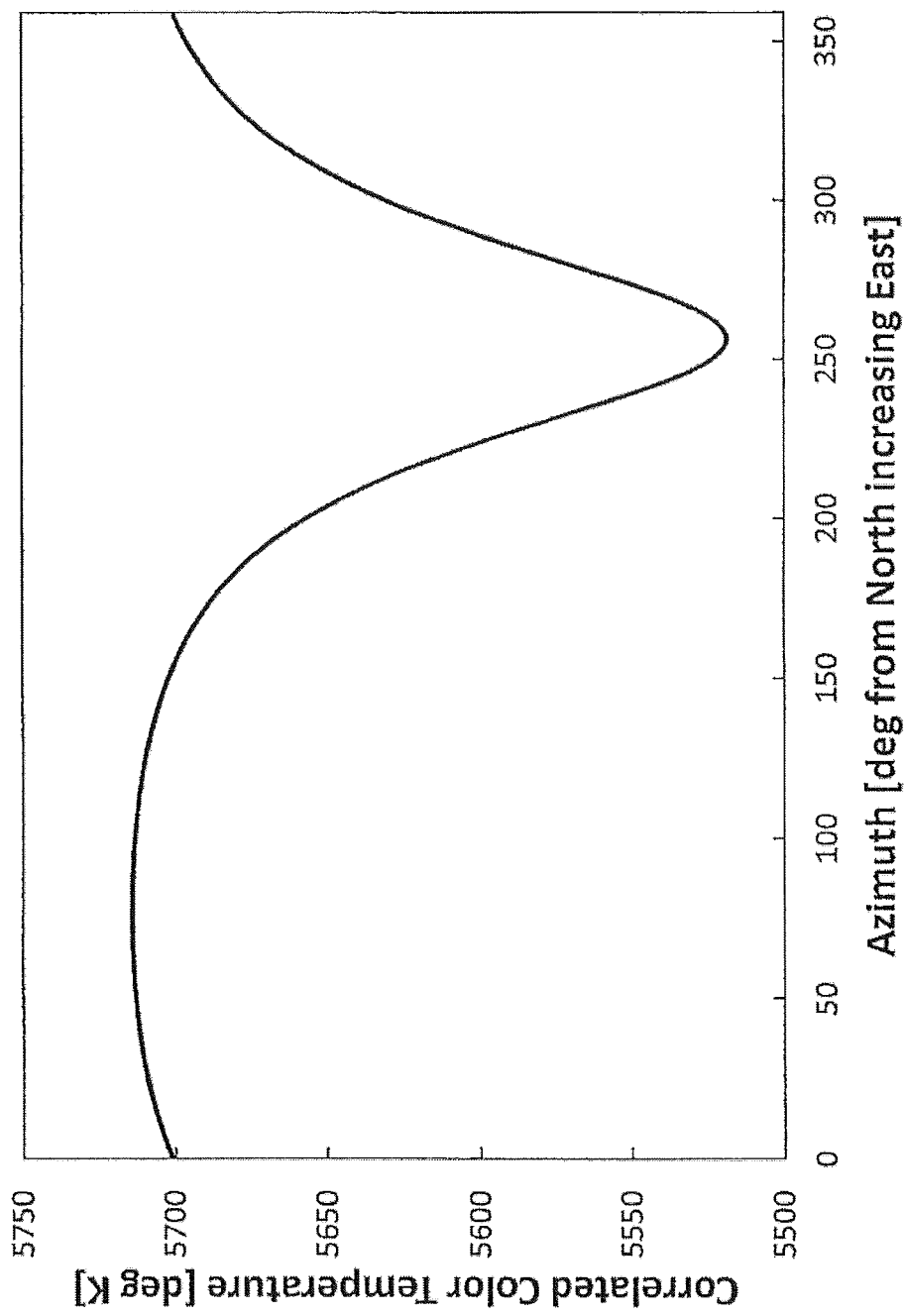
FIG. 32 is an example of variation in photometric parameters for a component of natural daylight.

FIG. 32 illustrates the correlated color temperature of direct sunlight on a surface of 40 degree altitudinal tilt as a function of azimuth that 8:15 on Jun. 21, 2014 at latitude 33.75 degrees and longitude 84.42 degrees West where it varies by several hundred degrees Kelvin.

Figure 33:
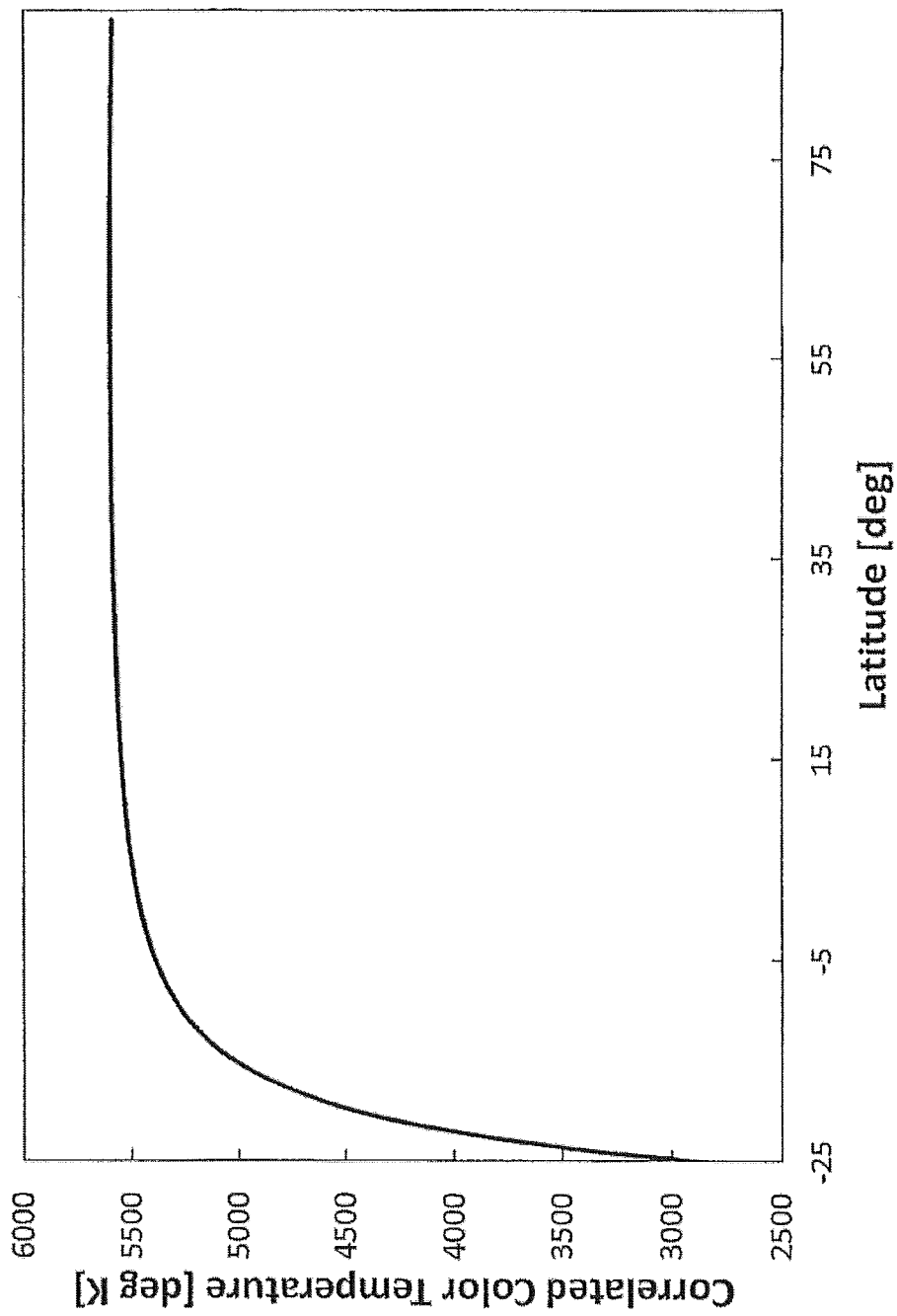
FIG. 33 is an example of variation in photometric parameters for a component of natural daylight.

FIG. 33 illustrates the correlated color temperature of direct sunlight as a function of latitude at 7:30 on Jun. 21, 2014 at longitude 84.42 degrees West and 225 degrees azimuth (degrees from north increasing eastward) where it varies by several hundred degrees Kelvin.

Figure 34:
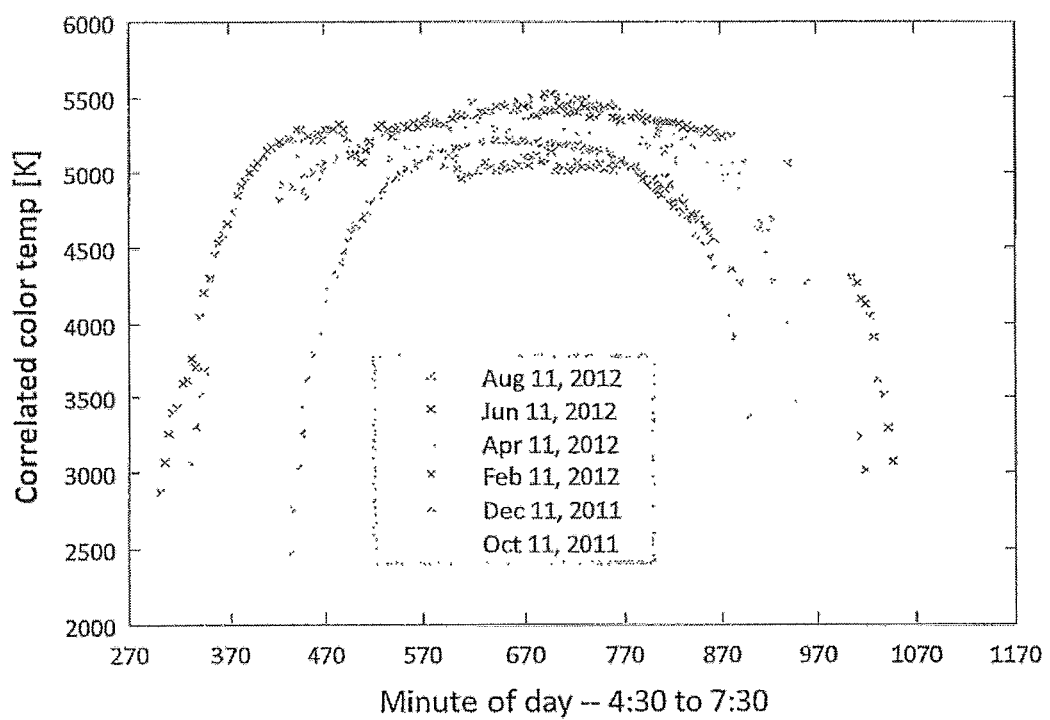
FIG. 34 is an example of variation in photometric parameters for a component of natural daylight.

FIG. 34 illustrates the correlated color temperature of direct normal incidence sunlight as a function of time of day at latitude 39.74 degrees and longitude 105.18 degrees West for several days across a calendar year where it varies by several thousand degrees Kelvin.

The majority of commercial and industrial skylights are installed on flat roofs, where the skylight receives direct exposure to almost the full hemisphere of the sky. Typically, there are also few obstructions to block sunlight from reaching the skylight. A skylight on a sloped roof does not receive direct exposure to the full sky hemisphere, but only a partial exposure determined by roof. The sun may not reach the skylight during certain times of the day or year, depending upon the angle and orientation of the sloped roof. For example, a skylight on an east-facing roof with a 45° slope will only receive direct sun during the morning and midday hours. In the afternoon it will receive skylight, but only from three-fourths of the sky. As a result, in the afternoon it will deliver substantially less light to the space below than an identical skylight located on a flat roof.

The shape of a skylight also affects how much daylight it can provide at different times of the day, although these effects tend to be much more subtle than building geometry. For example, a flat-glazed skylight on a flat roof will intercept very little sunlight when the sun is very low in the early morning and at the end of the day. However, a skylight with angled sides, whether a bubble, pyramid, or other raised shape, can intercept substantially more sunlight at these critical low angles, increasing the illumination delivered below by five to 10 percent at the start and end of the day.

As light is emitted by the surface of the sun and traverses homogenous space, its visible spectrum propagates without substantial absorption, reflection, scattering, or refraction. The human eye can only perceive its presence if it intersects its path. When the space is replaced with another medium that is non-homogenous, like the atmosphere, it may be absorbed by atmospheric gases or altered by spatial variations in refractive index. The degree of altering depends on the nature of the variation in refractive index. Refraction occurs if the refractive index variation dimensions are much larger than the light wavelength. Diffraction occurs if the refractive index variation dimensions are nearly the same as the light wavelength.

Mie scattering occurs if refractive index variation is moderately smaller than the light wavelength. Mie scattering is nearly independent of wavelength and scattering angles are small relative to the angle of incidence. Fog and mist produce Mie scattering. Rayleigh scattering occurs if refractive index variations are much smaller than the light wavelength. Scattering has intensity maxima in the forward and reverse directions of incidence and exhibits wavelength dependence with intensity inversely proportional to the fourth power of wavelength.

Rayleigh scattering occurs in the earth's atmosphere and is responsible for the blue hue of the sky. Refractive index variations originate from atmospheric gas density fluctuations. The variations are random in intensity and space and occur over length scales much smaller than the wavelength of visible light. Light near to 400 nanometers is scattered approximately nine times more strongly than light near to 700 nanometers. Since the scattered light is visible to the eye, the resultant spectra appear like the white light of the sun with a stronger blue component and a weaker red component.

Diffusers that exhibit dispersion with a wavelength dependence similar to Rayleigh scattering can be utilized to create sky-like appearances and effects. Light incident upon such a diffuser has partial direct transmittance and partial diffuse scattering. The diffuse and direct output light will have spectral power densities unique from the input source.

Wavelength dependent diffusers have been demonstrated by others and are known to practitioners of the art that produce scattering effects similar to Rayleigh scattering but compressed to an optical component several millimeters in thickness. They may be prepared using several techniques, including mixtures of high index nanoparticles in transparent binder polymers. When illuminated with white light, they may produce scattered white light with a correlated color temperature higher than the incident light, and directly transmitted white light with a correlated color temperature lower than the incident light.

In one embodiment of the invention, a light fixture is configured to provide a light spectrum with light distributions consistent with daylight. The light distribution and spectrum displayed may depend on several factors which also influence the light delivered by the sky and sun, including the including year, day of year, time of day, latitude, longitude, altitude tilt, azimuth, and local cloud cover. A light fixture may in general be customized to provide a daylight experience for a single year, time of day, latitude, longitude, altitude tilt, azimuth, and local cloud cover, however, such would be limited. As part of one embodied invention, all such aspects can be modified during light fixture commissioning, or by a user operating interface, or autonomously by a control system. Furthermore, it is desirable in the described invention to display light with distinct color temperature and spectrum for diffuse skylight and direct sunlight, as each vary relative to each other through time.

In a light fixture with a substantially non-dispersive scattering or filtering component, a change to the input light source results in a characteristic change to the output light. For example, light with a given CCT incident upon a non-dispersive scattering component may produce light with some CCT. If the CCT of the incident is increased, the CCT of the output light will be increased as well. If the CCT of the incident light is decreased, the CCT of the output light will be decreased as well.

In a light fixture with a substantially dispersive scattering component, the correlation between CCT of input and output light is altered compared to the non-dispersive condition. For example, light with a given CCT incident upon a dispersive scattering component may produce one output light with some CCT and a second output light with a second CCT. If the CCT of the incident is increased, the CCT of both of the first and second output lights may be increased, decreased, or unchanged. If the CCT of the incident light is decreased, the CCT of both of the first and second output lights may be increased, decreased, or unchanged. If the CCT of the incident light is unchanged, the CCT of both of the first and second output lights may be increased, decreased, or unchanged.

Optical elements which emulate Rayleigh scattering produce substantial dispersion, which means a scattering efficiency at one wavelength that is 50% or more than the scattering efficiency at another wavelength, both wavelengths being constrained to reside within the range of visibility of approximately 400 nanometers and 700 nanometers.

The degree to which a change in the CCT of the input source effects change in the CCT of multiple output light source depends on the scattering efficiency of the dispersive optical element. For instance, a component that exhibits scattering with a wavelength dependence of $\lambda^{-4}$ may result in a much larger change in output CCT than a component that exhibits scattering with a wavelength dependence of 7-2.

In the figures that follow, the relative intensity of three light sources are combined to generate a single adjustable spectrum light source. The source light passes through a single highly dispersive scattering component which produces two output lights: a directly transmitted direct light and a scattered diffuse light. The three light sources which are additively combined and uniformly mixed to produce a single uniform input light source are three broadband white source with CCTs of 2700 K (Channel 1), 3200 K (Channel 2), and 6500 K (Channel 3).

Figure 35A:
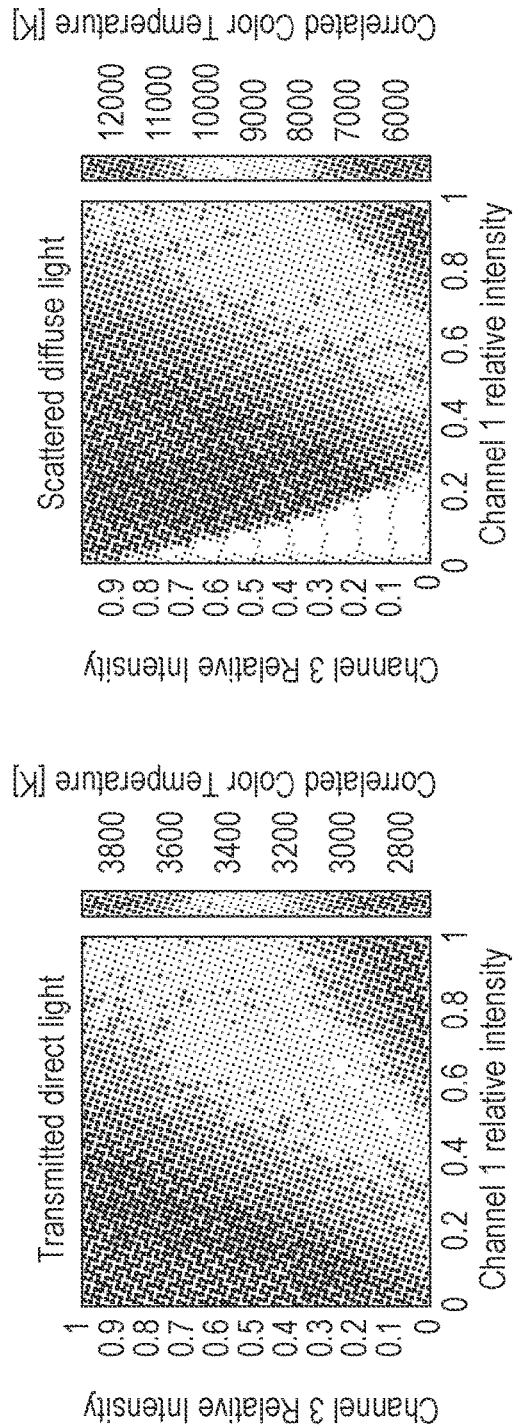
FIGS. 35A-35D are graphs that illustrate the scattering of a scattering component with a wavelength dependence of $\lambda^{-4}$.
Figure 35B:
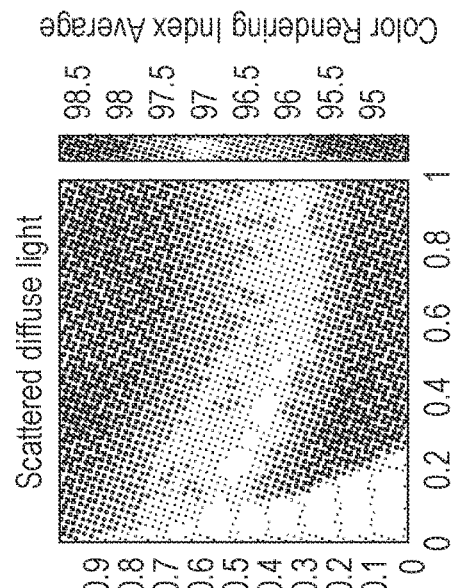
Figure 35C:
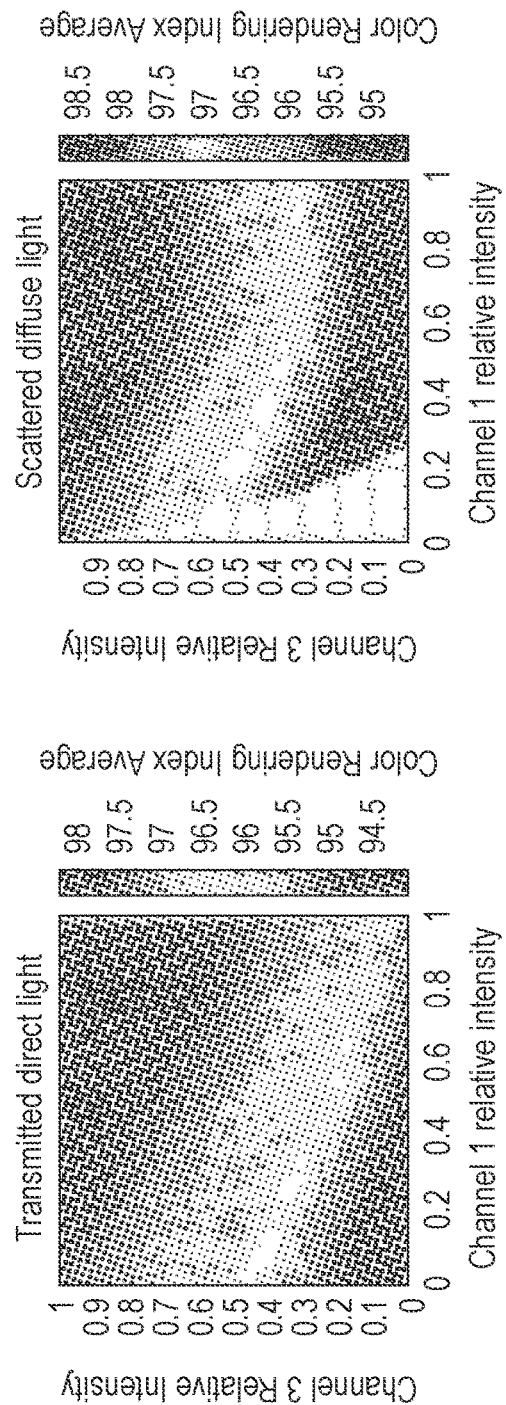
Figure 35D:
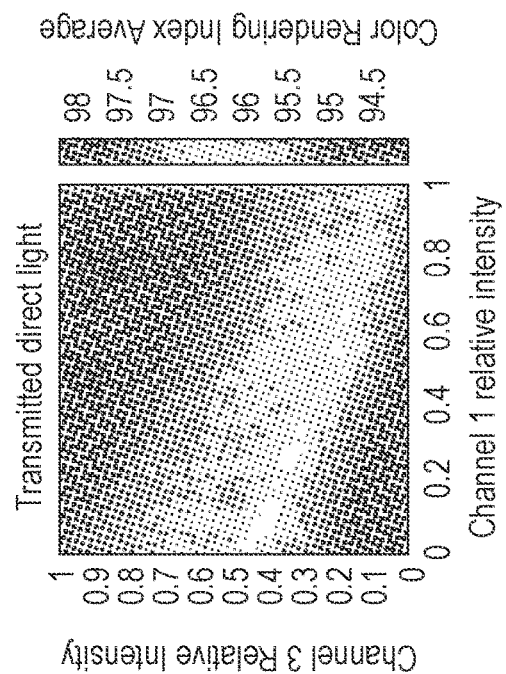

For example in FIG. 35A-FIG. 35D, the component exhibits scattering with a wavelength dependence of $\lambda^{-4}$. The light output of Channel 2 is fixed and the light outputs of Channels 1 and 3 are variable. The CCT and color rendering index (CRI) of the two output light spectra are displayed in the figures. In FIG. 35A, increasing Channel 1 intensity results in an increase in transmitted light CCT. In FIG. 35B, increasing Channel 1 intensity results in an increase in scattered light CCT. In FIG. 35C, increasing Channel 2 intensity results in a decrease in transmitted light CRI. In FIG. 35D, increasing Channel 2 intensity results in an either no change or a slight decrease in scattered light CRI.

Figure 36A:
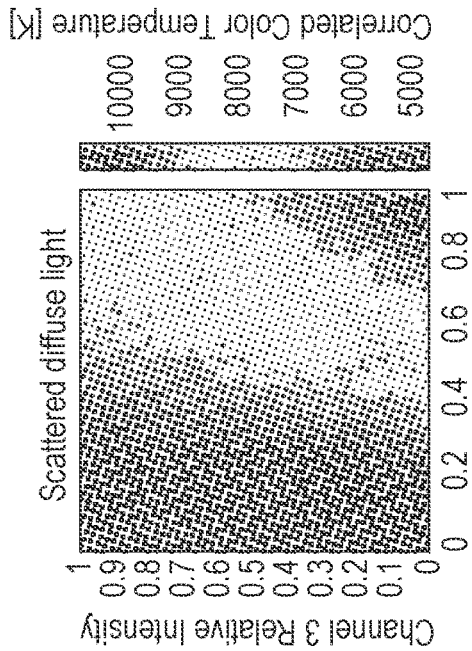
FIGS. 36A-36D are examples of variation in photometric parameters for varying intensities of input light after passing through a dispersive scattering optical component.
Figure 36B:
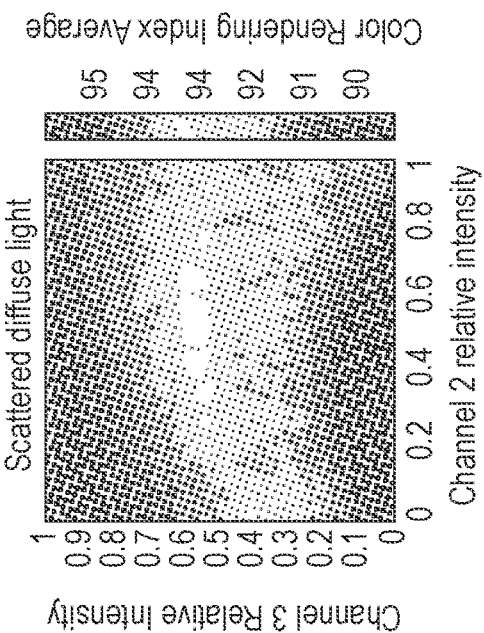
Figure 36C:
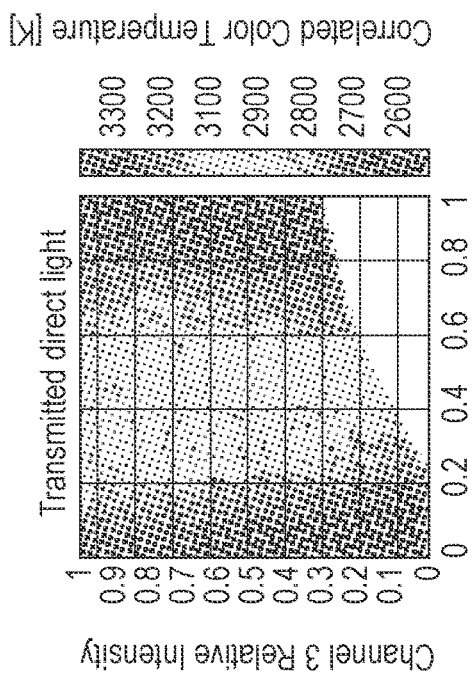
Figure 36D:
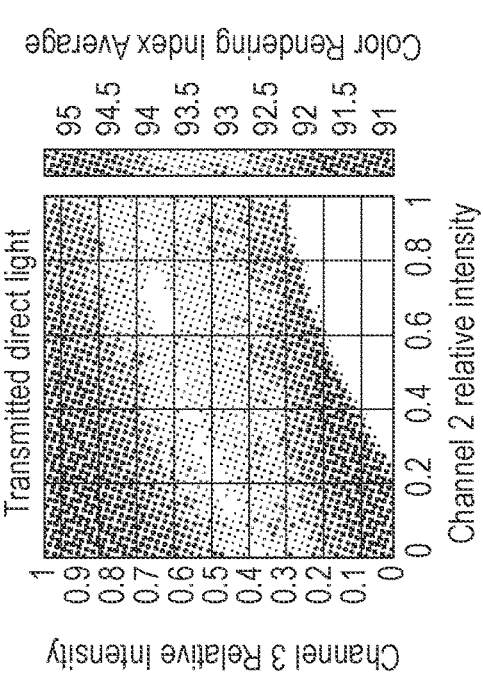

For example in FIG. 36A-FIG. 36D, the component exhibits scattering with a wavelength dependence of $\lambda^{-4}$. The light output of Channel 1 is fixed and the light outputs of Channels 2 and 3 are variable. The CCT and color rendering index (CRI) of the two output light spectra are displayed in the figures. In FIG. 36A, increasing Channel 2 intensity results in an increase in transmitted light CCT. In FIG. 36B, increasing Channel 2 intensity results in an increase in scattered light CCT. In FIG. 36C, increasing Channel 3 intensity results in an increase in transmitted light CRI. In FIG. 36D, increasing Channel 3 intensity results in an increase in scattered light CRI.

Figure 37A:
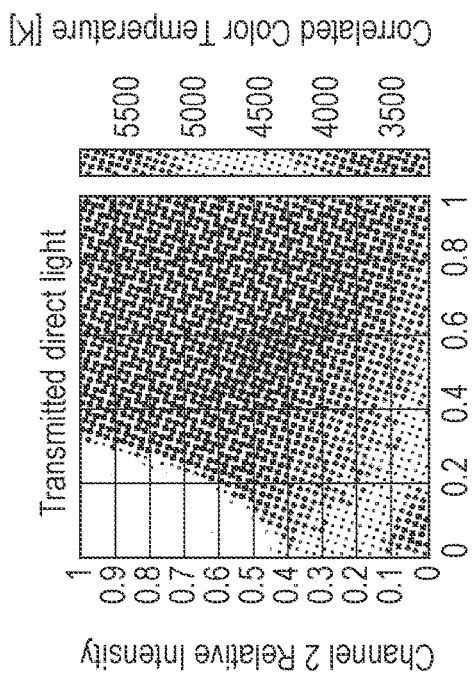
FIGS. 37A-37D are examples of variation in photometric parameters for varying intensities of input light after passing through a dispersive scattering optical component.
Figure 37B:
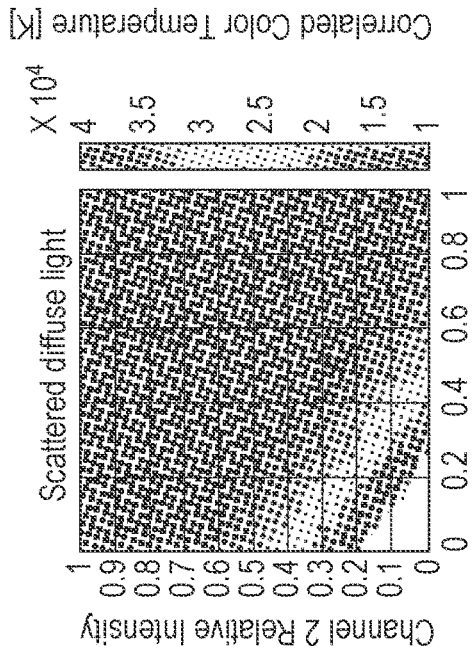
Figure 37C:
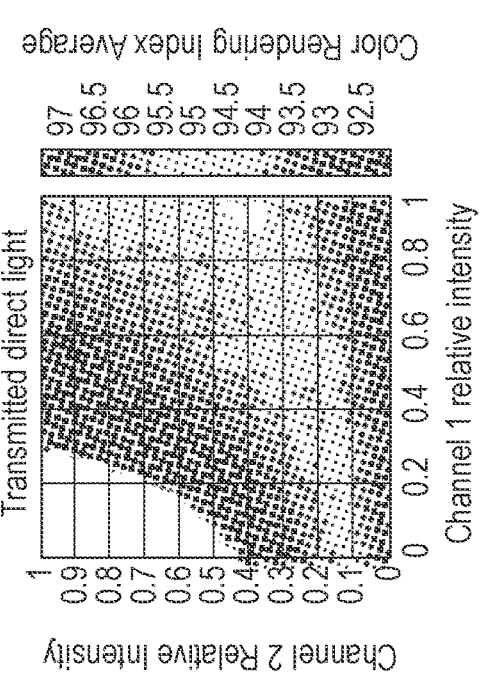
Figure 37D:
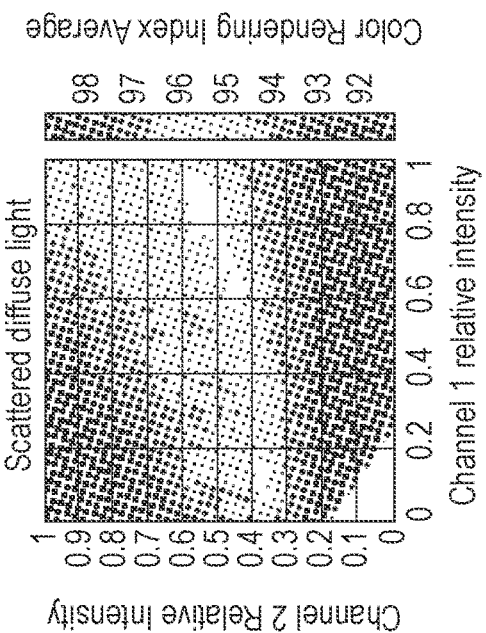

For example in FIG. 37A-FIG. 37D, the component exhibits scattering with a wavelength dependence of $\lambda^{-4}$. The light output of Channel 3 is fixed and the light outputs of Channels 1 and 3 are variable. The CCT and color rendering index (CRI) of the two output light spectra are displayed in the figures. In FIG. 37A, increasing Channel 1 intensity results in a decrease in transmitted light CCT. In FIG. 37B, increasing Channel 1 intensity results in a decrease in scattered light CCT. In FIG. 37C, increasing Channel 2 intensity results in either no change or a slight decrease in transmitted light CRI. In FIG. 37D, increasing Channel 2 intensity results in either no change or a slight increase in scattered light CRI.

Figure 38A:
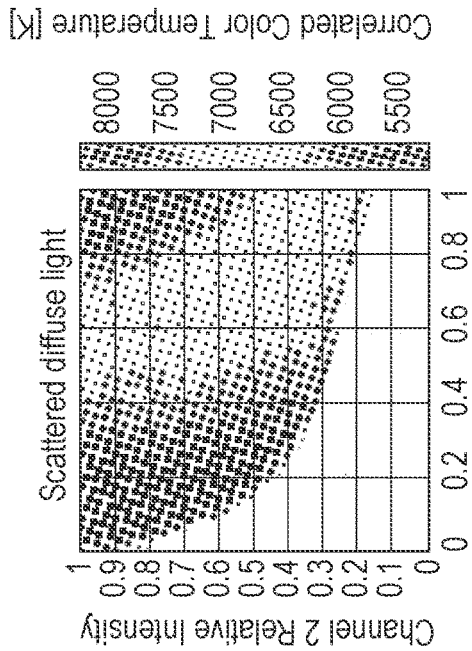
FIGS. 38A-38D are examples of variation in photometric parameters for varying intensities of input light after passing through a dispersive scattering optical component.
Figure 38B:
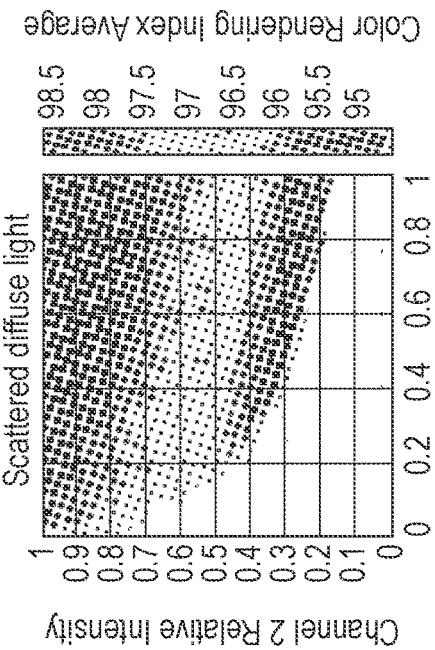
Figure 38C:
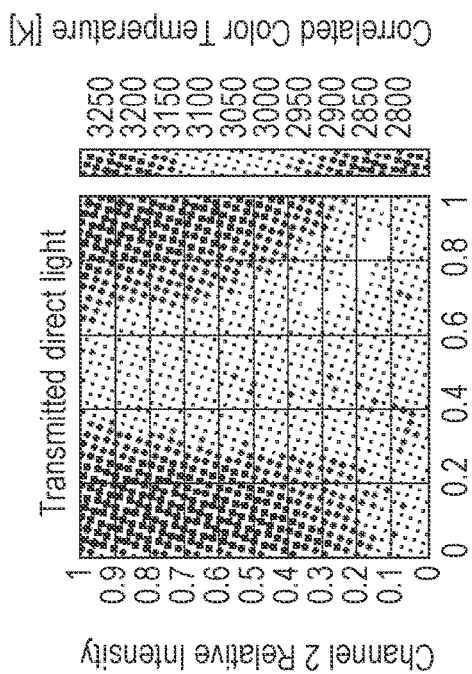
Figure 38D:
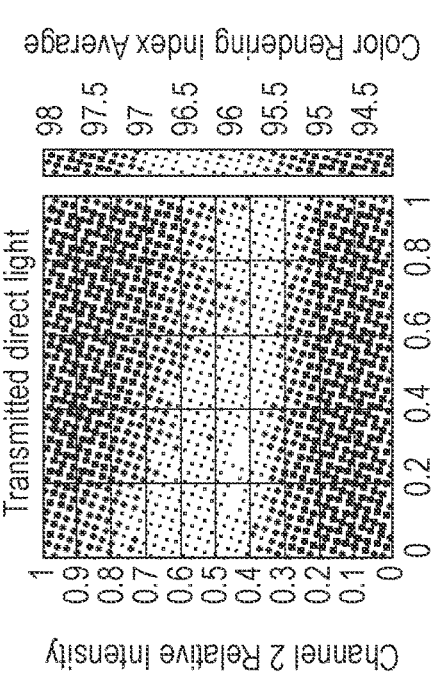

For example in FIG. 38A-FIG. 38D, the component exhibits scattering with a wavelength dependence of $\lambda^{-4}$. In these plots, Channel 1 is comprised of a mixture of CCT 2700 K and CCT 6500 K light, while Channel 2 is comprised of CCT 3200 K light. The light output of Channels 1 and 2 are variable. The CCT and color rendering index (CRI) of the two output light spectra are displayed in the figures. In FIG. 38A, increasing Channel 1 intensity results in either no change or an increase in transmitted light CCT. In FIG. 38B, increasing Channel 1 intensity results in an increase in scattered light CCT. In FIG. 38C, increasing Channel 2 intensity results in either no change or a slight decrease in transmitted light CRI. In FIG. 38D, increasing Channel 2 intensity results in a decrease in scattered light CRI.

Figure 39A:
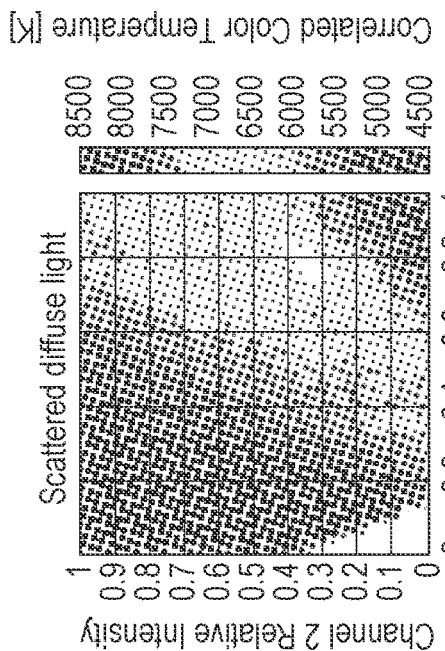
FIGS. 39A-39D are examples of variation in photometric parameters for varying intensities of input light after passing through a dispersive scattering optical component.
Figure 39B:
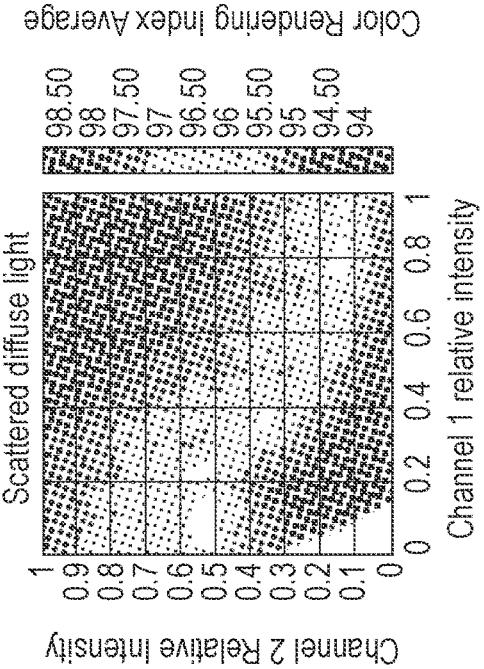
Figure 39C:
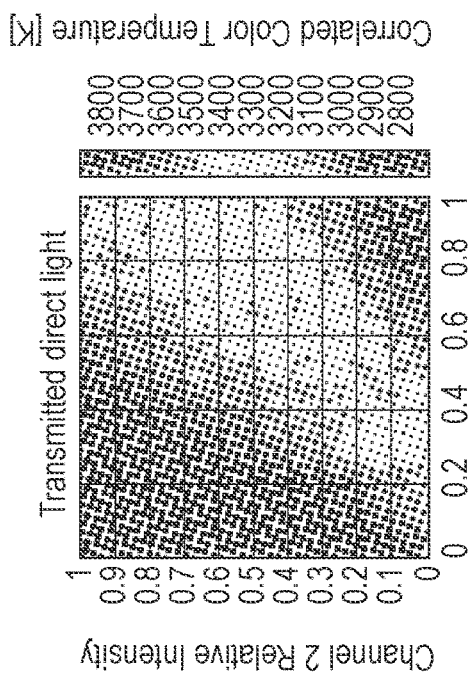
Figure 39D:
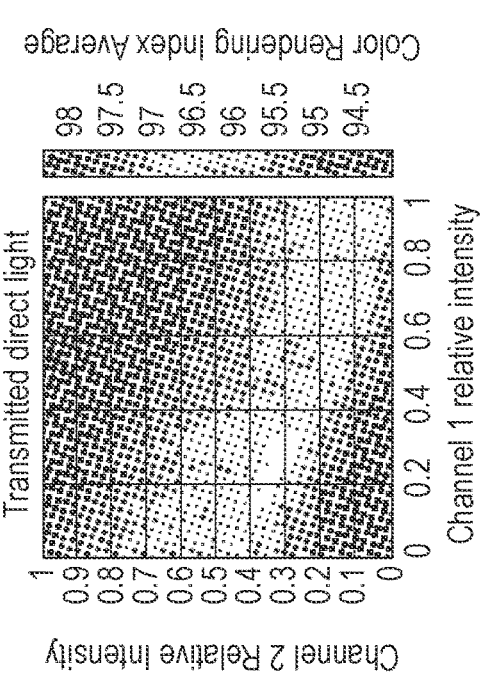
Figure 40B:
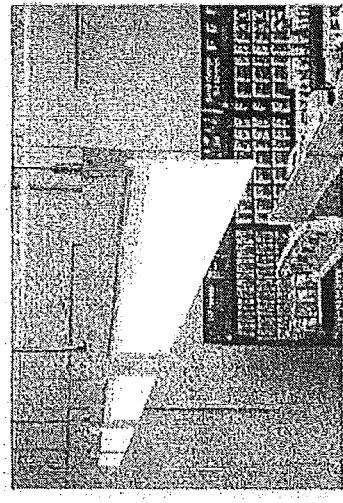
FIG. 40B shows commercially available luminaires designed for retail applications using edge lit planar light guides.
Figure 40A:
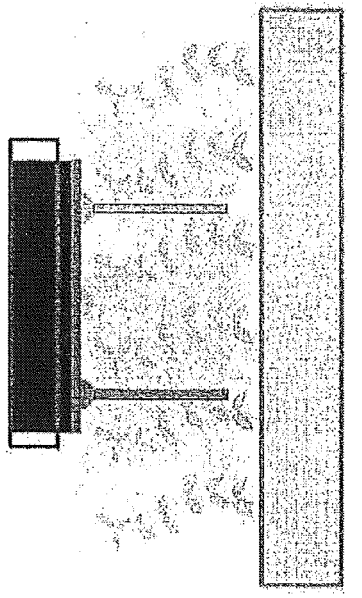
FIG. 40A shows a conceptual schematic of a lighting system where light is delivered through a combination of conventional top lit light engines and side lighting delivered through light guides.

For example in FIG. 39A-FIG. 39D, the component exhibits scattering with a wavelength dependence of $\lambda^{-3}$. The three light sources which are additively combined and uniformly mixed to produce a single uniform input light source are three broadband white source with CCTs of 2700 K (Channel 1), 3200 K (Channel 2), and 6500 K (Channel 3). The light output of Channel 2 is fixed and the light outputs of Channels 1 and 3 are variable. The CCT and color rendering index (CRI) of the two output light spectra are displayed in the figures. In FIG. 39A, increasing Channel 1 intensity results in an increase in transmitted light CCT. In FIG. 39B, increasing Channel 1 intensity results in an increase in scattered light CCT. In FIG. 39C, increasing Channel 2 intensity results in a slight decrease in transmitted light CRI. In FIG. 39D, increasing Channel 2 intensity results in a slight increase in scattered light CRI.

The instant invention discloses a means to emulate natural daylight by the utilizing devices within a system to artificially create effects common to daylight illumination of skylight structures. By providing a user perception of natural daylight not readily distinguishable from natural daylight results in user benefits observed for natural daylight exposure, including increased sales per square foot, higher employee productivity, reduced recovery times after surgical procedures, increased test scores, reduced employee absenteeism, and increased occupant satisfaction.

A detailed understanding of why natural daylight emulation affects an outcome similar to exposure to natural daylight is recently emerging and may involve a number of affective and cognitive factors. Circadian rhythms are biological cycles that have a period of about a day; numerous body systems undergo daily oscillations, including body temperature, hormonal and other biochemical levels, sleep, and cognitive performance. In humans, a pacemaker in the hypothalamus called the suprachiasmatic nucleus drives these rhythms. Because the intrinsic period of the suprachiasmatic nucleus is not exactly 24 hours, it drifts out of phase with the solar day unless synchronized or entrained by sensory inputs, of which light is by far the most important cue. When humans experience a sudden change in light cycle, as in air travel to a new time zone, they may suffer unpleasant mismatches between instantaneous biological rhythms and local solar time, also known as jet lag. Normal synchrony is restored over several days via the rising and setting of the sun; an abundance of artificial light frustrates this resetting mechanism. Furthermore, chronic exposure to cyclical lighting patterns different to those of the local solar time shifts local biological rhythms, causing loss of attention, drowsiness, lowered productivity, irritability, and general decrease of well-being. The strong ability for artificial light to alter circadian rhythms arises from exposure frequency; typical participants in industrialized economies may spend a majority of waking hours under artificial lighting conditions. In some nations, lighting is the largest category of electricity consumption. Daylight emulation systems, while not exactly matched to local solar conditions, can provide the body with a series of signals strongly correlated with local solar conditions, such that the mismatch between artificial and natural daylight is reduced, causing less interference to natural daily biological patterns. These interference reductions may beneficially affect occupant's behaviors, such as productivity, propensity to purchase goods and services, and general wellbeing.

Social, market, cognitive, and economic factors also influence the effect of natural daylight's ability to affect factors such as productivity, propensity to purchase goods and services, and general wellbeing. Typical building construction results in a limited supply of windows and skylights. For densely populated multi-story buildings, a fraction of all working areas receive direct or indirect exposure to natural daylight. Since scarcity can be a driving factor in relative valuation, areas of ample natural daylight illumination are assigned higher value, and may serve as rewards or incentives for performance or reserved for communal area such as atriums, cafeterias, and conference rooms. A building has a limited supply of perimeter and corner offices, only a subset of which may include windows. A building also has a limited supply of floors directly below the roof, only a subset of which may include skylights. Daylight emulation systems and fixtures, while not actually providing exposure to natural daylight, may provide building occupants the perception or belief of the presence of natural daylight and a beneficial outcome may be affected by a means of placebo effect.

As such, affecting outcomes such as increased sales per square foot, higher employee productivity, reduced recovery times after surgical procedures, increased test scores, reduced employee absenteeism, or increased occupant satisfaction comes from a combination of exposure to lighting conditions closely resembling lighting natural daylight and the user perception that the light is emerging from a real skylight. Embodiments of the instant specification create at least one of the above conditions.

Various light sources that emit various spectra may be simultaneously operated to simulate a desired spectrum.

Adjustment of individual light levels is achieved through pulse width modulation (PWM), pulse amplitude modulation (PAM) or a combination of both PWM and PAM of the LED current or voltage. PWM dimming involves reduction of pulse width, thereby reducing the duty cycle of the activation pulses. Activation pulses after PWM dimming have the same amplitude (current or voltage), but have a reduced width. Therefore, the PWM dimming waveform has a lower applied current or voltage. However, the peak current/voltage is unchanged. PWM dimming may result in occupant detection of stroboscopic effects and flicker.

PAM may also be used for dimming. PAM reduces the amplitude (current/voltage) of the waveform when dimming, but keeps the same average pulse width.

A combined PWM and PAM dimming would decrease both the pulse width and the pulse amplitude (current or voltage) while dimming.

Note that increasing illumination would encompass increasing pulse width of the waveform, PWM, or increasing pulse amplitude (current or voltage), PAM or both increasing the pulse width and the pulse amplitude.

In one embodiment, dimming of light levels of multiple LED channels with unique emission spectra results in a shift in color coordinates and correlated color temperature.

Analog dimming is another method known by those in the art to dim individual light levels and is effected through changing the current level continuously such that both average and peak current change as a function of time. Analog dimming methods result in LED emission spectra changes.

Controlling inputs for the light source may originate from data variables stored during commissioning or from sensors. The former may require reference to an analytical model of the atmosphere. The latter can correspond to conditions in the sky either locally or remotely.

The light sources may be comprised of multiple types, such as surface mount LEDs, packaged LED emitters, through hole LEDs, arrays of LEDs in a common package (chip-on-board devices), or collections of packaged LED emitters attached to a common board or light engine. The LEDs may be comprised of downconversion phosphors of multiple types, including YAG:Ce phosphors, phosphor films, quantum dot, nanoparticles, organic luminophores, or any blend thereof, collectively referred to as phosphor coatings. The phosphor coatings may also be disposed on other optical elements such as lenses, diffusers, reflectors and mixing chambers. Incident light impacts the phosphors coatings causing the spectrum of impinging light to spread.

Light sources may also include organic light emitting diodes (OLEDs), polymer LEDs, or remotely arranged downconverter materials comprised of a range of compounds. The semiconductor source of light generation may include one or more semiconductor layers, including silicon, silicon carbide, gallium nitride and/or other semiconductor materials, a substrate which may include sapphire, silicon, silicon carbide, and/or other microelectronic substrates, and one or more contact layers which may include metal and/or other conductive layers. The design and fabrication of semiconductor light emitting devices is well known to those having skill in the art and need not be described in detail herein.

The positioning of individual light sources with respect to each other that will produce the desired light appearance at least partially depends on the viewing angle of the sources, which can vary widely among different devices. For example, commercially available LEDs can have a viewing angle as low as about 10 degrees and as high as about 180 degrees. This viewing angle affects the spatial range over which a single source can emit light, but it is closely tied with the overall brightness of the light source. Generally, the larger the viewing angle, the lower the brightness. Accordingly, the light sources having a viewing angle that provides a sufficient balance between brightness and light dispersion is thought to be desirable for us in the lighting fixture.

The intensity of each of multiple channels of lighting elements may be adjusted by a range of means, including pulse width modulation, two wire dimming, current modulation, or any means of duty cycle modulation.

The United States 8,400 hectares of greenhouses consume more than 0.1 quads of primary energy. Worldwide, the nearly 3 million hectares of greenhouses would consume more than 41 quads for the same energy intensity. The high cost of climate control in greenhouses result in a cost structure where horticultural yields dominate the end cost of produced foods.

The agricultural yields of corn grain increased by eight times between 1940 and 2010, altering world food productive capacity, production cost, and global health. Increasing horticultural yields have an outsized effect on production cost, enabling smaller sized greenhouses and/or lower energy costs per unit of product.

Studies of plant and vegetable growth established that daily photosynthetic photon flux (PPF) exposure is the most important attribute of the light environment to consider for consistent timing of crops. Research indicates that vegetative plant growth in greenhouses is nearly proportional to the daily solar PPF integral and seldom if ever reaches saturation.

LED lights are already used in greenhouses to increase yields and reduce energy use. LED deployment with spectrum specific illumination increased yields at Tagayo lettuce farm by 50% while reducing energy use by 40% relative to fluorescent lamps. Many approaches to increasing yields have focused on generating light tuned to crop-specific action spectra delivered with time profiles customized to plant maturation phase and vertical stacking for high volumetric density lighting; see above figure.

New paradigms in increasing crop yield are possible crop if areal spacing can be decreased. The top lighting typical for existing greenhouses emulates the natural conditions of sunlight, but it is possible to bypass this limitation. Leaf size is limited by the light levels, so top lighting encourages short, stocky plants. But it is possible to illuminate crops from both the top and sides below the top leaf canopy, enabling more production from an existing soil bed by targeting light delivery in a manner that is more volumetrically uniform than areally uniform.

Intra-canopy illumination could be cost prohibitive if it was achieved through spacing lamps more uniformly within the greenhouse production volume, since more electrical wiring and environmental packaging would be required, which reduce system reliability. However, light distribution infrastructure can replace electrical distribution infrastructure. Using simple planar and rod shaped plexiglass light guides, light can be distributed inexpensively over several inches with minimal losses from light engines physically located with similar frequency as conventional systems.

Light is delivered through a combination of conventional top lit light engines and new side lighting delivered through light guides. The guided light can be distributed through edge lit planar light guides, end illuminated rods or simple circular or more complex cross-sections.

Figure 41:
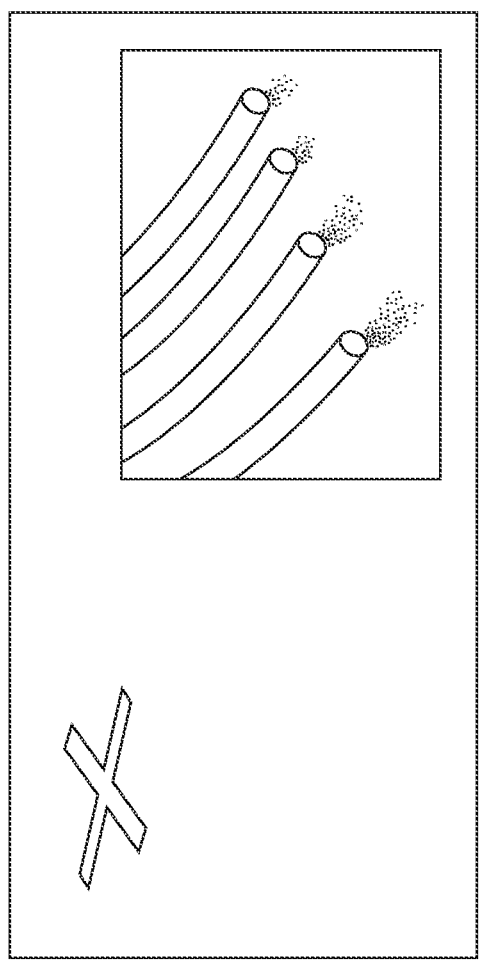
FIG. 41 shows a light guide that includes down conversion elements to tailor light output.

The light guide geometry can take a number of shapes. A shape with a smaller aspect ratio cross section, such as a cross or a circle, facilitates coupling to light engines, reduces impedance to the canopy, is more readily moved/removed for cleaning, harvesting, or crop examination, and require less material, lowering the system cost. The light guide may also include optional down conversion elements to further tailor the spectrum of light delivered to the crops; see FIG. 41.

Figure 42:
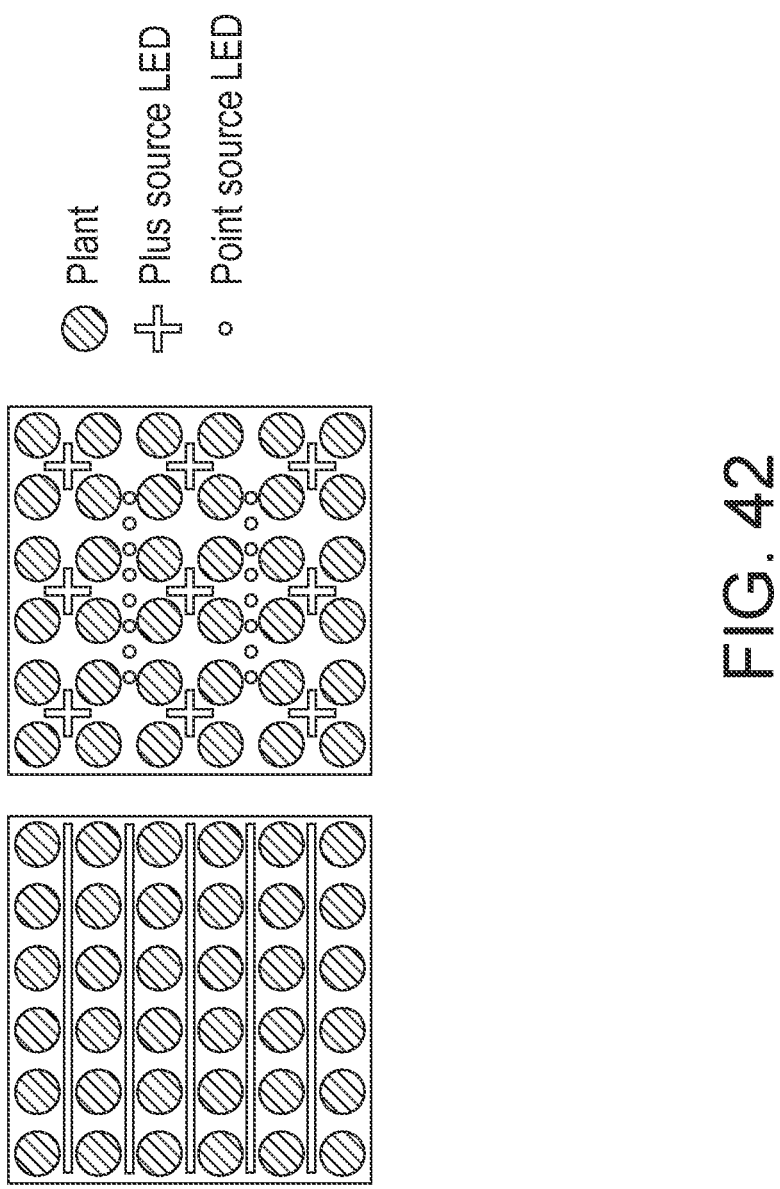
FIG. 42 shows embodiments of combinations of top and intra-canopy lighting elements.
Figure 43:
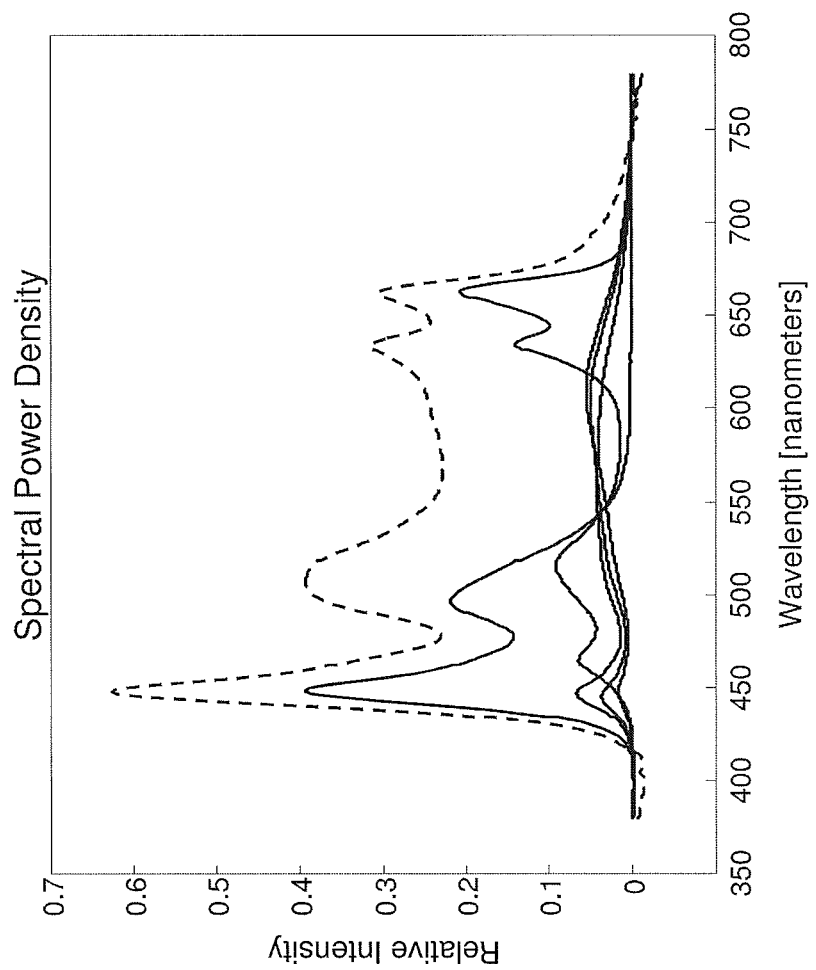
FIG. 43 is a graph that shows five exemplary independent spectra (solid lines) whose sum can be tuned to change the overall spectrum emerging from the fixture (dashed line).
Figure 44:
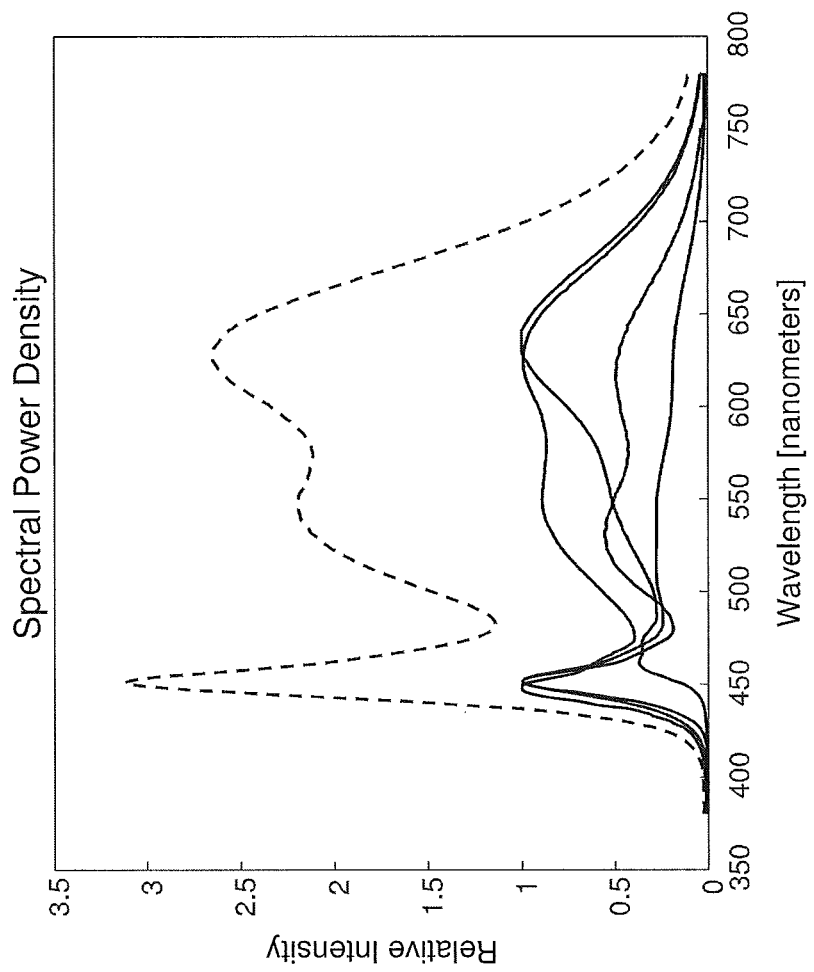
FIG. 44 is a graph that shows a second five exemplary independent spectra (solid lines) whose sum can be tuned to change the overall spectrum emerging from the fixture (dashed line).
Figures 45, 46:
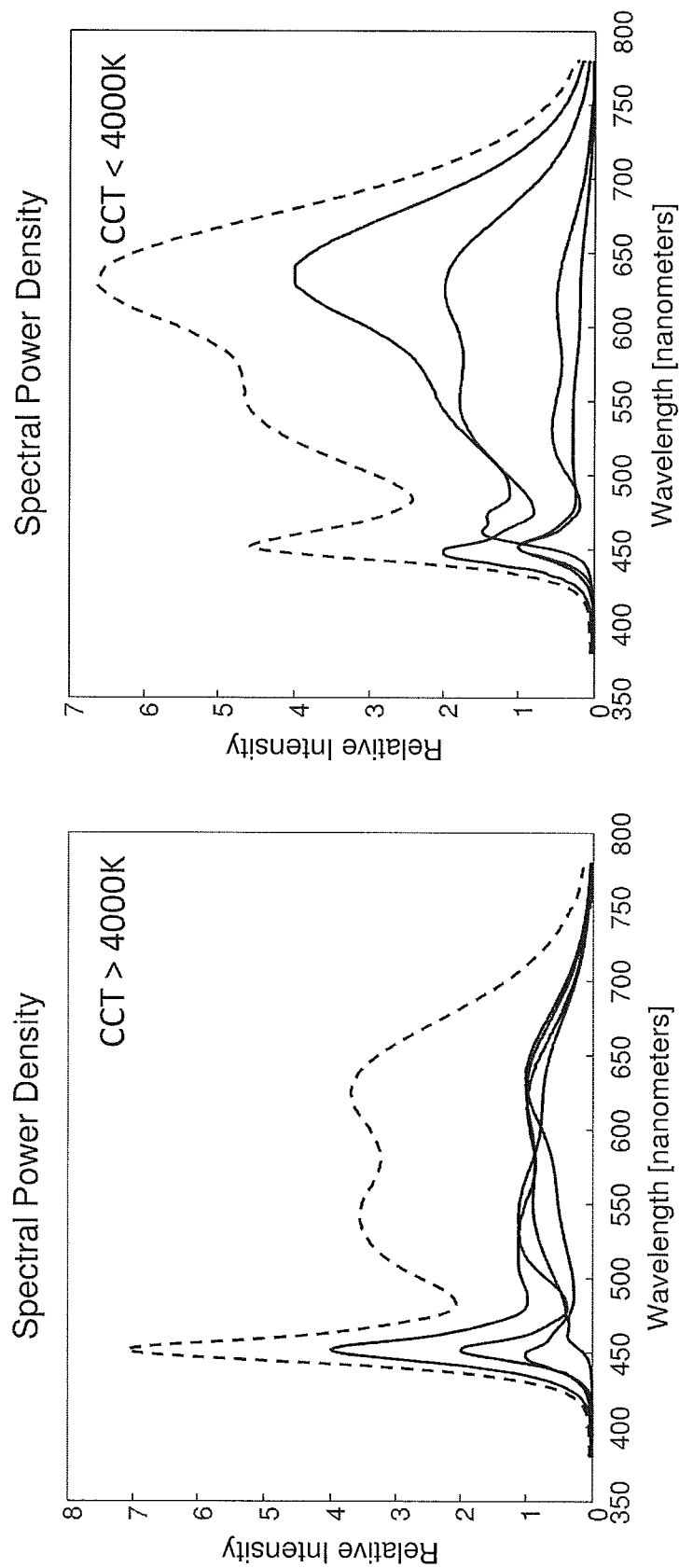
FIG. 45 is a graph that shows five exemplary independent spectra (solid lines) whose sum is tuned to generate a first distinct variant of daylight quality spectra of a first color temperature.
FIG. 46 is a graph that shows a second five exemplary independent spectra (solid lines) whose sum is tuned to generate a second distinct variant of daylight quality spectra of a second color temperature.

Top and intra-canopy lighting elements can be combined to adjust top and intracanopy lighting uniformity in a manner which may beneficially increase total crop yield. Two example configurations are shown in FIG. 42.

Unlike luminaires with decorative features, horticultural lighting does not require exceedingly high incoupling efficiencies from the light engine to the structured light guide, as light that is not coupled into the guide is available for direct absorption into the leaves of the crop of interest. Placing the light guides within the crop canopy but leaving an optical standoff between the light engine and the canopy has two benefits: 1.) less light guide is required, lowering system cost, and 2.) since the light which is eventually diffused within the leaf canopy via the structured light has traveled a shorter distance in the guide compared to the case if the light guide extended completely to the light engine, lower optical attenuation occurs, increasing efficiency.

The intra-canopy light diffusers can be combined with best practices in existing horticultural lighting, such as vertical stacking and time dynamic lighting tuned to crop specific action spectra.

Automotive cabin lighting serves both utility and decorative purposes in modern cars. Depending on the specifics of implementation, the result can both enhance or detract from the user experience. Various studies have shown that natural daylight illumination can have a strong impact human centric outcomes such as well-being, alertness, productivity, health outcomes, and consumer spending habits.

Light spectrum affects color reproduction. In particular, lighting which is the result of multiple light source with distinct spectra may reproduce color poorly, providing distractions which could limit a positive user experience or at worst negatively affect safety. During daytime periods, a fixed light spectrum will seldom if ever match exterior lighting conditions.

Providing color tunable interior cabin lighting in accent elements, overhead utility lamps, scuff plates, steering wheel lights and indicators, cup holders, dashboard indicators, storage compartments, and door integral lights may serve to reduce distraction and provide a more harmonious blend of interior and exterior. Color tunable white lighting can be implemented using LED packages with multiple addressable spectra, reducing the requirements for additional optical materials to homogenize light delivery.

Exterior lighting conditions change according to geolocation and time. Coordinating interior and exterior lighting conditions can be achieved using astronomical predictive models or direct color sensing using multispectral color sensors.

Embodiments of this invention is to utilize tunable LED lights to adjust dimming intensity and color of light delivered in an automotive interior cabin controlled by at least one of geolocation, time, and sensed light spectrum.

Automotive sunroofs add weight and capital cost to automobiles, but are often included do their desirable benefit to user experience. The additional weight also reduces fuel efficiency, increasing operational costs. The mechanically operated systems may also break down, increasing maintenance costs.

Embodiments of this disclosure includes the use of color tunable light delivered in a substantially homogenous and planar form with minimal weight using a variety of approaches known in the art, such as non-imaging diffusers and light guide optics. Integrating such components with color and dimming intensity tunable lights provides a user experience emulating a sunroof if matched to real time exterior daylight conditions. Unlike sunroofs, the system can weight substantially less and require less expensive components.

Embodiments include using time (automatically or manually set), and/or location (global position via GPS, automatically or manually set), and/or orientation (azimuth, automatically detected of manually set) to control the intensity and color of a light such as to provide lighting conditions related to the location of the sun at the corresponding inputs.

It will be further appreciated that the scope of the present disclosure is not limited to the above-described embodiments but rather is defined by the appended claims, and that these claims will encompass modifications and improvements to what has been described without departing from the spirit and scope thereof.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

The invention claimed is:

1. A lighting system configured for daylight emulation, comprising:
   a plurality of light sources for generating a daylight-emulating output light spectrum, a controller for dynamically controlling at least one of an intensity, a directionality, and a color temperature of the daylight-emulating output light spectrum to emulate a sun position based on at least one of a geo-location and a time of day and to further emulate one or more environmental conditions associated with an illuminated area of the lighting system using one or more algorithms comprised therein, the one or more algorithms comprising at least one or more tuning control algorithms or one or more lighting algorithms, and a networking facility that facilitates data communication between the controller and at least one external resource for identifying the one or more environmental conditions and the at least one of the geo-location and the time of day.

2. The lighting system of claim 1, wherein the external resource is accessed to determine the geo-location of the lighting system.

3. The lighting system of claim 1, further comprising a processing facility for modulating the output of the lighting system based on environmental sensor data, wherein the environmental sensor data is obtained using one or more sensors selected from a group consisting of a light sensor, a weather sensor, a barometer, a moisture sensor, a temperature sensor, and a heat flux sensor.

4. The lighting system of claim 3, wherein the environmental sensor data is obtained using one or more sensors selected from the group further consisting of an occupancy detection and tracking sensor.

5. The lighting system of claim 4, wherein the occupancy detection and tracking sensor comprises one or more of a smoke detection sensor, a temperature sensor, a weather data sensor, a sound collection sensor, and a motion detection sensor.

6. The lighting system of claim 1, wherein the one or more environmental conditions are received from a database through the networking facility.

7. The lighting system of claim 1, wherein the one or more environmental conditions are selected from a group consisting of an albedo condition, a reflectivity condition, and opacity condition, a color condition, a building material condition, and a shadow condition.

8. The lighting system of claim 1, wherein the one or more algorithms are further selected from one or more environmental sensor-based control algorithms, one or more display control algorithms, one or more virtualization algorithms, and one or more environmental condition control algorithms.

9. A lighting system configured for daylight emulation, comprising:

a plurality of light sources for generating a daylight-emulating output light spectrum, a controller for dynamically controlling at least one of an intensity, a directionality, and a color temperature of the daylight-emulating output light spectrum to emulate a sun position based on at least one of a geo-location and a time of day, and a networking facility that facilitates data communication between the controller and at least one external resource for the at least one of the geo-location and the time of day, wherein the controller is adapted to tune at least one of a bright spot, a shadow, and a reflection of the generated daylight-emulating output light spectrum on an illuminated area based on one or more environmental factors associated with the illuminated area using one or more algorithms comprised therein, the one or more algorithms comprising at least one or more tuning control algorithms or one or more lighting algorithms.

10. The lighting system of claim 9, wherein the tuning comprises managing a position of the at least one of the bright spot, the shadow, and the reflection of the generated daylight-emulating output light spectrum.

11. The lighting system of claim 9, wherein the one or more environmental factors are selected from a group consisting of a workspace location factor, a desktop location factor, a display screen location factor, a TV screen location factor, an art location factor, a mirror location factor, an eye-level location factor, and a reading location factor.

12. The lighting system of claim 9, wherein the one or more algorithms are further selected from one or more environmental sensor-based control algorithms, one or more display control algorithms, one or more virtualization algorithms, and one or more environmental condition control algorithms.

* * * * *